US011919533B2

(12) United States Patent
Kakeshita et al.

(10) Patent No.: US 11,919,533 B2
(45) Date of Patent: Mar. 5, 2024

(54) ALERT APPARATUS FOR HOST VEHICLE

(71) Applicant: TOYOTA JIDOSHA KABUSHIKI KAISHA, Toyota (JP)

(72) Inventors: Mafune Kakeshita, Toyota (JP); Chen Xi, Nagoya (JP); Kohei Morotomi, Nagoya (JP); Yuto Shimbo, Toyota (JP); Tasuku Usui, Susono (JP); Kenichi Shimizu, Susono (JP); Wataru Ike, Nagoya (JP); Tsunekazu Yasoshima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 17/464,867

(22) Filed: Sep. 2, 2021

(65) Prior Publication Data

US 2022/0073090 A1    Mar. 10, 2022

(30) Foreign Application Priority Data

Sep. 9, 2020  (JP) ................................. 2020-151278
Feb. 12, 2021 (JP) ................................. 2021-020694

(51) Int. Cl.
*B60W 50/14* (2020.01)
*B60W 30/095* (2012.01)
*G06V 20/58* (2022.01)

(52) U.S. Cl.
CPC .......... *B60W 50/14* (2013.01); *B60W 30/095* (2013.01); *G06V 20/58* (2022.01); *B60W 2050/143* (2013.01); *B60W 2420/42* (2013.01)

(58) Field of Classification Search
CPC ............... B60W 50/14; B60W 30/095; B60W 2050/143; B60W 2420/42; G06V 20/58
See application file for complete search history.

(56) References Cited

U.S. PATENT DOCUMENTS

2018/0268702 A1    9/2018  Morotomi et al.

FOREIGN PATENT DOCUMENTS

| JP | 2005008127    | * | 6/2003  |
| JP | 2004-280453 A |   | 10/2004 |
| JP | 2018-156253 A |   | 10/2018 |

OTHER PUBLICATIONS

U.S. Appl. No. 17/152,878, filed Jan. 24, 2020.

* cited by examiner

*Primary Examiner* — Michael D Lang
(74) *Attorney, Agent, or Firm* — Sughrue Mion, PLLC

(57) ABSTRACT

An alert apparatus starts alerting a driver of a host vehicle, when an oncoming vehicle, that is an other vehicle traveling in an oncoming lane with respect to a traveling lane in which the host vehicle is traveling so as to approach the host vehicle and that is predicted to pass through on a specific direction side with respect to a current position of the host vehicle, is present, a turn signal indicator of the host vehicle corresponding to the specific direction side is being operated, and it is likely that the host vehicle starts turning to the specific direction side.

17 Claims, 22 Drawing Sheets

ALERT APPARATUS FOR HOST VEHICLE

TECHNICAL FIELD

The present disclosure relates to an alert apparatus for a vehicle (host vehicle) configured to alert a driver of the host vehicle of a presence of an oncoming vehicle.

BACKGROUND

As disclosed in Japanese Patent Application Laid-Open (kokai) No. 2004-280453), one (hereinafter, referred to as a "conventional apparatus") of the alert apparatuses for a vehicle of this kind is configured to alert the driver of the host vehicle, when all of the following conditions are satisfied.
- condition A: the host vehicle has been stopped (is not moving).
- condition B: a right-turn signal indicator of the host vehicle is operating (blinking).
- condition C: a "time length from a present time point to a time point at which an oncoming vehicle reaches a predicted right-turn path (trajectory) of the host vehicle" is shorter than a predetermined time length.

The above-described alert (or the alert process) may be referred to as "an oncoming vehicle alert (an oncoming vehicle alert process)" and/or "an alert (an alert process)" for simplification.

SUMMARY

For example, the predicted right-turn path (or the predicted traveling path/trajectory) of the host vehicle may be able to be obtained/predicted based on a steering angle of the host vehicle at the present time point. In this configuration, the oncoming vehicle alert is not issued/generated before the driver of the host vehicle starts performing the steering operation for the right-turn.

It is preferable that the oncoming vehicle alert be started as soon as practicable (e.g., from an appropriate time point before the driver of the host vehicle starts performing the steering operation for the right-turn). On the other hand, it is preferable to avoid issuing/generating the unnecessary oncoming vehicle alert as much as possible.

In view of the above, one of the objectives of the present disclosure is to provide an "alert apparatus for a vehicle" that is capable of starting (issuing/generating) the alert to alert/inform the driver of a presence of an oncoming vehicle and is capable of decreasing a possibility that an unnecessary alert is issued.

An alert apparatus for a vehicle (hereinafter, referred to as a "present disclosure apparatus") for achieving the above-described objective comprises a surrounding sensor, turn signal indicators, an alerting device, and a control unit.

The surrounding sensor (a frontward camera 41) is configured to acquire "surrounding information" including information on an object that is present in a frontward area of (ahead of) the host vehicle and information on demarcation line on a road on which the host vehicle is traveling.

A state of the turn signal indicator (turn signal indicator 43) is changed from an operation stopped state (i.e., turned-off state) to an operating state (i.e., blinking state) by a predetermined operation of a driver of the host vehicle.

The alerting device (a display 46 and a speaker 47) is configured to (perform an alert process/operation to) alert/warn the driver of a presence of an other vehicle the driver should be cautious of (or should pay attention to).

The control unit (ECUs 21-29) controls the alerting device (refer to step 630 and step 640, or the like).

More specifically, the control unit is configured to determine whether an "oncoming vehicle" is present based on the surrounding information. The oncoming vehicle is an other vehicle that is traveling in an oncoming lane with respect to a traveling lane in which the host vehicle is traveling, and that is approaching (coming closer to) the host vehicle (from a frontward position of the host vehicle), and whose predicted traveling path is predicted to pass through on a specific direction side which is one of a rightward direction side with respect to a current position of the host vehicle and a leftward direction side with respect to the current position of the host vehicle.

The control unit is further configured to cause the alerting device to start alerting (the alert, or performing the alert process) (e.g., step 630), when it is determined that a predetermined specific condition becomes satisfied (e.g., step 645 shown in FIG. 6: Yes, and step 650: Yes, as shown in FIG. 6).

The specific condition may be a condition to be satisfied when one of the turn signal indicators corresponding to the specific direction side is in the operating state, it is determined that the oncoming vehicle is present, and it is predicted that the host vehicle is likely to start making a turn (or start turning) to the specific direction side.

The specific condition may be a condition to be satisfied when one of the turn signal indicators corresponding to the specific direction side is in the operating state, it is determined that the oncoming vehicle is present, and it is determined that the driver of the host vehicle should notice/recognize (be aware of) a presence of the oncoming vehicle before the host vehicle starts making a turn (or start turning) to the specific direction side.

The specific direction side is the rightward side (when the host vehicle is) in a left-side driving region (in a region where there is a traffic regulation to have a driver drive a vehicle on the left side of the road), and is the leftward side (when the host vehicle is) in a right-side driving region (in a region where there is a traffic regulation to have a driver drive a vehicle on the right side of the road). Namely, the specific direction side is a direction (side) to which the host vehicle makes a turn in such a manner that the host vehicle crosses the oncoming lane when making a right turn or a left turn. In a case where the host vehicle is traveling in the left-side driving region, there is a possibility that the host vehicle collides with the oncoming vehicle when the host vehicle makes a right turn (turn to the rightward direction side) in a situation where the predicted traveling path of the oncoming vehicle passes through the rightward direction side of the host vehicle. In view of this, the alert is started when the predetermined specific condition becomes satisfied, wherein the specific condition is a condition to be satisfied when it is predicted/inferred that the host vehicle is likely to turn to the specific direction side even before the host vehicle actually starts making a turn to the specific direction side.

In other words, the alert (the oncoming vehicle alert process) is started when the specific condition becomes satisfied, even if the driver of the host vehicle has not started operating the steering wheel to let the host vehicle turn to the rightward direction side (or to the right). Whereas, the alert (the oncoming vehicle alert process) is not started when the specific condition does not become satisfied. Therefore, the present disclosure apparatus can start the alert (to alert the driver of the presence of the oncoming vehicle that the driver should be aware/caution of) before the driver starts operating the steering wheel, and also can decrease a possibility that an unnecessary alert is performed.

In some embodiments of the present disclosure, the control unit is configured to determine whether or not a specific area condition is satisfied based on the surrounding information (e.g., step 645). The specific area condition is a condition to be satisfied when a specific demarcation line is not included in a specific area (e.g., a host vehicle right turn passing area) that is a part of an area through which the host vehicle passes when the host vehicle makes the turn to the specific direction side and has been determined in advance with respect to the host vehicle. The specific demarcation line (refer to Lt1, Lt2, Lt3, and Lt4) is a demarcation line on the specific direction side among a pair of (a left and a right) demarcation lines that define the traveling lane.

The control unit is further configured to:
 determine that the specific condition becomes satisfied when it is determined that the specific area condition is satisfied, so as to cause the alerting device to alert (e.g., refer to step 645: Yes, and step 630 from step 645).

In a case where the turn signal indicator(s) of the host vehicle corresponding to the specific direction side is in the operating state, and the specific demarcation line is not included in the specific area (i.e., when the specific area condition is satisfied), the host vehicle is likely to be about to start making a turn to the specific direction side at an intersection. Thus, in this case the alert is performed.

In some embodiments of the present disclosure,
the control unit is configured to:
 determine whether or not a ready-to-turn condition is satisfied based on the surrounding information; and
 determine that the specific condition becomes satisfied when it is determined that the ready-to-turn condition is satisfied.

The ready-to-turn condition is a condition to be satisfied when a specific demarcation line is included in the specific area (step 645: No), and a speed (running speed) of the host vehicle is lower than a predetermined first threshold speed (Vth1) (step 650: Yes).

In the meantime, there is also a case where a possibility that the host vehicle collides with the oncoming vehicle becomes high when the host vehicle makes a turn to the specific direction side at a place other than an intersection. In this case, it is also preferable that the alert be performed.

In the case where the host vehicle makes a turn to the specific direction side at a place other than an intersection, the specific demarcation line is often included in the specific area. In addition, in this case, the driver decreases the speed of the host vehicle before the driver starts letting the host vehicle turn to the specific direction side. Accordingly, In the case where the host vehicle makes a turn to the specific direction side at the place other than an intersection, the ready-to-turn condition is satisfied. Thus, the alert can be performed in the case where the host vehicle makes a turn to the specific direction side at the place other than an intersection.

There is also another case where the driver starts operating the turn signal indicator corresponding to the specific direction side, when the driver intends to change lanes from a leftmost lane in the left-side driving region to a lane (typically called a "passing lane" instead of the oncoming lane) located on the right side of that leftmost lane. In this case, since the speed of the host vehicle is often higher than the first threshold speed, the ready-to-turn condition is not satisfied. Therefore, in this case, the alert is not performed. Accordingly, a possibility that the unnecessary alert is performed during changing lanes can be decreased.

In some embodiments (e.g., a first modified embodiment) of the present disclosure,
the control unit is configured to:
 determine whether or not a preceding vehicle is present based on the surrounding information (step 820 shown in FIG. 8), wherein the preceding vehicle is an other vehicle that is present immediately ahead of the host vehicle;
 determine whether or not a speed of the preceding vehicle is higher than a predetermined preceding vehicle turning threshold speed (Vth2), when it is determined that the preceding vehicle is present (step 820 shown in FIG. 8); and
 determine that the specific condition becomes satisfied when it is determined that the speed of the preceding vehicle is higher than the preceding vehicle turning threshold speed (step 820: Yes).

For example, there is a case where the driver of the preceding vehicle makes a turn to the specific direction side at an intersection without noticing the presence of the oncoming vehicle. Alternatively, there is a case where the driver of the preceding vehicle tries to complete making the turn to the specific direction side at an intersection before the oncoming vehicle reaches the intersection. In each of these cases, there is a possibility that the driver of the host vehicle mistakenly believes that the oncoming vehicle is not present. In view of this, in some embodiments described above, it is determined that the specific condition becomes satisfied when it is determined that the speed of the preceding vehicle is higher than the preceding vehicle turning threshold speed, so that the alert is performed.

In some embodiments (e.g., a second modified embodiment) of the present disclosure,
the control unit is configured to:
 determine whether or not a preceding vehicle is present based on the surrounding information, wherein the preceding vehicle is an other vehicle present immediately ahead of the host vehicle;
 determine whether or not the preceding vehicle has started making a turn to the specific direction side based on the surrounding information, when it is determined that the preceding vehicle is present (step 1020 shown in FIG. 10); and
 determine that the specific condition becomes satisfied when it is determined that the preceding vehicle has started making the turn to the specific direction side (step 1020: Yes).

According to the above embodiment, it is determined that the specific condition becomes satisfied so that the alert is performed, (even) when the driver of the preceding vehicle makes a turn to the specific direction side at an intersection without noticing the presence of the oncoming vehicle or when the driver of the preceding vehicle tries to complete making the turn to the specific direction side at an intersection before the oncoming vehicle reaches the intersection.

In some embodiments (e.g., a third modified embodiment) of the present disclosure,
the control unit is configured to:
 determine whether or not "the oncoming lane in which the oncoming vehicle is traveling" and "the traveling lane in which the host vehicle is traveling" are adjacent to each other, based on the surrounding information (step 1245 shown in FIG. 12); and
 determine that the specific condition becomes satisfied when it is determined that the oncoming lane and the traveling lane are adjacent to each other (step 1245: Yes).

If the oncoming vehicle is traveling in the lane adjacent to the traveling lane on the specific direction side, there is a high possibility that the host vehicle crosses the lane in which the oncoming vehicle is traveling when the turn signal indicator(s) of the host vehicle corresponding to the specific direction side is (are) in the operating state. Namely, a case where the oncoming vehicle is traveling in the lane adjacent to the traveling lane on the specific direction side is the case where the driver of the host vehicle should notice the presence of the oncoming vehicle before the host vehicle starts turning to the specific direction side. In view of this, in the above-described embodiment, the specific condition is determined to be satisfied when it is determined that the "the oncoming lane in which the oncoming vehicle is traveling" and "the traveling lane in which the host vehicle is traveling" are adjacent to each other, so that the alert is performed.

In some embodiments (e.g., a third modified embodiment) of the present disclosure,
the control unit is configured to:
determine whether or not a lateral distance (|Dx|) that is a distance in a host vehicle width direction between the host vehicle and the oncoming vehicle is smaller than a predetermined first threshold distance (Dth1), based on the surrounding information (step 1250 shown in FIG. 12); and
determine that the specific condition becomes satisfied when it is determined that the lateral distance is smaller than the first threshold distance (step 1250: Yes).

When the lateral distance between the host vehicle and the oncoming vehicle is relatively small, and the turn signal indicator(s) of the host vehicle corresponding to the specific direction side is (are) in the operating state, there is a possibility that the host vehicle comes close to the oncoming vehicle immediately after the host vehicle starts turning to the specific direction side. Namely, a case where the lateral distance between the host vehicle and the oncoming vehicle is relatively small is the case where the driver of the host vehicle should notice the presence of the oncoming vehicle before the host vehicle starts turning to the specific direction side. In view of this, in the above-described embodiment, the specific condition is determined to be satisfied when it is determined that the lateral distance is smaller than the first threshold distance, so that the alert is performed.

In some embodiments (e.g., a fourth modified embodiment) of the present disclosure,
the control unit is configured to:
determine whether or not a crossing-vehicle is present based on the surrounding information, wherein the crossing-vehicle is an other vehicle which is different from the oncoming vehicle and whose predicted traveling path is predicted to intersect with the predicted path of the oncoming vehicle (step 1450 shown in FIG. 14); and
prohibit the alert when it is determined that a prohibition condition is satisfied, wherein the prohibition condition includes a condition to be satisfied when it is determined that the crossing-vehicle is present (step 1450: No).

In some embodiments (e.g., a fourth modified embodiment) of the present disclosure,
the control unit is configured to:
determine whether or not a crossing-vehicle is present based on the surrounding information, wherein the crossing-vehicle is an other vehicle which is different from the oncoming vehicle and whose predicted traveling path is predicted to intersect with the predicted path of the host vehicle (step 1450 shown in FIG. 14); and
prohibit the alert when it is determined that a prohibition condition is satisfied, wherein the prohibition condition includes a condition to be satisfied when it is determined that the crossing-vehicle is present (step 1450: No).

When the driver of the host vehicle has noticed the crossing-vehicle, there is a high possibility that the driver decreases the speed of (decelerates) the host vehicle. In view of this, in some of the embodiments described above, an execution of the alert is prohibited when the prohibition condition that includes the condition to be satisfied when it is determined that the crossing-vehicle is present becomes satisfied. Thereby, the possibility that the unnecessary operation is performed can be further reduced.

In some embodiments (e.g., a sixth modified embodiment) of the present disclosure,
the control unit is configured to:
determine whether or not a lateral distance (|Dx|) that is a distance in a host vehicle width direction between the host vehicle and the oncoming vehicle is equal to or greater than a lateral threshold distance (Dth3, Dth4) that becomes greater as a speed of the host vehicle becomes higher, based on the surrounding information (step 1950 and step 1955, shown in FIG. 19); and
prohibit the alert when it is determined that a prohibition condition is satisfied, wherein the prohibition condition includes a condition to be satisfied when it is determined that the lateral distance is equal to or greater than the lateral threshold distance (step 1950: No, step 1955: No).

A "time to reach an intersecting point that is a time length from a present time point to a time point when the host vehicle reaches the oncoming vehicle predicted traveling path" becomes longer, as the speed of the host vehicle becomes lower. In addition, the time to reach an intersecting point becomes longer, as the lateral distance (|Dx|) that is a distance in the host vehicle width direction between the host vehicle and the oncoming vehicle becomes longer. A possibility that the driver notices the presence of the oncoming vehicle before the host vehicle reaches the oncoming vehicle predicted traveling path becomes higher, as the time to reach an intersecting point becomes longer. In view of this, in the above-described embodiment, an execution of the alert is prohibited when the prohibition condition that includes the condition to be satisfied when it is determined that the lateral distance is equal to or longer than the lateral threshold distance becomes satisfied. Thereby, the possibility that the unnecessary operation is performed can be reduced.

In some embodiments where the lateral distance is compared with the lateral threshold distance to determine whether to prohibit the alert,
more specifically, the control unit is configured to:
determine whether or not the lateral distance that is the distance in the host vehicle width direction between the host vehicle and the oncoming vehicle is equal to or greater than a third threshold distance (Dth3) based on the surrounding information, when the speed of the host vehicle is equal to or lower than a fourth threshold speed (Vth4) (step 1945 and step 1950, shown in FIG. 19); and
prohibit the alert when it is determined that a prohibition condition is satisfied, wherein the prohibition condition includes a condition to be satisfied when it is determined that the speed of the host vehicle is equal to or lower than the fourth threshold speed and that the lateral distance is equal to or greater than the third threshold distance (step 1950: No).

Likewise, in some embodiments where the lateral distance is compared with the lateral threshold distance to determine whether to prohibit the alert, more specifically, the control unit is configured to:
  determine whether or not the lateral distance is equal to or greater than a "fourth threshold distance (Dth4) that is greater than the third threshold distance", based on the surrounding information, when the speed of the host vehicle is higher than the fourth threshold speed (Vth4) (step 1945 and step 1955, shown in FIG. 19); and
  prohibit the alert when it is determined that a prohibition condition is satisfied, wherein the prohibition condition includes a condition to be satisfied when it is determined that the speed of the host vehicle is higher than the fourth threshold speed and that the lateral distance is equal to or greater than the fourth threshold distance (step 1955: No).

Some embodiments (e.g., a seventh modified embodiment) of the present disclosure further include:
  a steering angle sensor (45) configured to detect a steering angle (θs) of a steering wheel of the host vehicle; and
  a brake pedal operation state sensor (48) configured to detect a brake pedal operation state of a brake pedal of the host vehicle.

Furthermore, in some embodiments, the control unit is configured to:
  determine whether or not a prohibition condition is satisfied, wherein the prohibition condition is a condition to be satisfied when at least all of the following conditions are satisfied; and
  prohibit the alert when it is determined that the prohibition condition is satisfied.

The detected steering angle (θs) is a value that causes the host vehicle to turn to a direction opposite to a direction for the host vehicle to cross the oncoming lane, or the detected steering angle (θs) is a value that causes the host vehicle to turn to the direction for the host vehicle to cross the oncoming lane and a magnitude of the detected steering angle is smaller than a threshold angle (θth) (step 2050 shown in FIG. 20: Yes).

The detected brake pedal operation state indicates that the brake pedal is operated (step 2055 shown in FIG. 20: Yes).

The speed of the host vehicle is equal to or lower than a fifth threshold speed (Vth5) (step 2060 shown in FIG. 20: Yes).

If the driver of the host vehicle has noticed the presence of the oncoming vehicle, the driver decreases the speed of (decelerate) the host vehicle before the driver starts letting the host vehicle turn to the specific direction side. Accordingly, when the brake pedal is operated, the driver is likely to have noticed the presence of the oncoming vehicle.

When the steering wheel is operated so as to cause the host vehicle to turn to the specific direction side in such a manner that the steering angle (θs) is greater than the threshold angle (θth), the driver is unlikely to have noticed the presence of the oncoming vehicle.

When the speed of the host vehicle is higher than the fifth threshold speed, the driver is unlikely to have noticed the presence of the oncoming vehicle.

Accordingly, in the above-described embodiment, a possibility that the alert is performed when the driver of the host vehicle is likely to have noticed the presence of the oncoming vehicle can be reduced.

In some embodiments (e.g., a fifth modified embodiment) of the present disclosure, the alert device includes a speaker (47) configured to generate a sound and a display (46) configured to display a figure/symbol.

In this case, the control unit is configured to:
  determine that a "vehicle that has been determined to be the oncoming vehicle" has stopped moving, when a longitudinal distance between the host vehicle and the "vehicle that has been determined to be the oncoming vehicle" is shorter than a predetermined second threshold distance and when an object moving speed of the "vehicle that has been determined to be the oncoming vehicle" is equal to or lower than a predetermined third threshold speed;
  retain/hold a stopped state history indicating that it is (or it has been) determined that the "vehicle that has been determined to be the oncoming vehicle" has stopped moving, when it is determined that the "vehicle that has been determined to be the oncoming vehicle" has stopped moving;
  cause both of the speaker and the display to operate to start alerting, if the stopped state history has not been retained, when it is determined that the specific condition becomes satisfied (step 1650: No, step 1630, and step 1632, all shown in FIG. 16); and
  cause the speaker to operate, without causing the display to operate, to start alerting if the stopped state history has been retained, when it is determined that the specific condition becomes satisfied (step 1650: Yes, and step 1632, all shown in FIG. 16).

If the oncoming vehicle (temporarily) stops moving, a time length for which the oncoming vehicle can be viewed by the driver of the host vehicle becomes longer, and thus, a possibility that the driver notices the oncoming vehicle becomes higher. In view of this, when the stopped state history has been retained, the alert using the speaker without using the display is performed. Consequently, a possibility that the driver feels bothered due to the alert using the display can be reduced.

In some embodiments (e.g., a fifth modified embodiment) of the present disclosure,
  the control unit is configured to:
    determine that a "vehicle that has been determined to be the oncoming vehicle" has stopped moving, when a longitudinal distance between the host vehicle and the "vehicle that has been determined to be the oncoming vehicle" is shorter than a predetermined second threshold distance and when an object moving speed of the "vehicle that has been determined to be the oncoming vehicle" is equal to or lower than a predetermined third threshold speed;
    retain a stopped state history indicating that it is (or has been) determined that the "vehicle that has been determined to be the oncoming vehicle" has stopped moving, when it is determined that the "vehicle that has been determined to be the oncoming vehicle" has stopped moving;
    cause the alerting device to start alerting if the stopped state history has not been retained, when it is determined that the specific condition becomes satisfied; and prohibit the alerting device from starting alerting if the stopped state history has been retained, when it is determined that the specific condition becomes satisfied.

In the above-described embodiment, the alert is prohibited, when the driver is highly likely to have noticed the oncoming vehicle due to a fact that the oncoming vehicle has stopped moving (namely, a fact that the stopped state history has been retained). Accordingly, in the above-described embodiment, a possibility that the alert is performed when the driver of the host vehicle is likely to have noticed the presence of the oncoming vehicle can be reduced.

In some embodiments (e.g., an eighth modified embodiment) of the present disclosure,
the control unit is configured to:
determine whether or not a predetermined first alert end condition is satisfied based on a parameter varying depending on a detected steering angle, wherein the first alert end condition is a condition to be satisfied when there is a high possibility that the host vehicle has stopped turning to the specific direction side (step 2210 shown in FIG. 22); and
cause the alerting device to stop alerting when it is determined that the first alert end condition is satisfied while the alert is being performed (step 2210 shown in FIG. 22: Yes, step 640 shown in FIG. 22).

The first alert end condition is, for example, a condition to be satisfied when the steering wheel is operated to a direction opposite to the specific direction at a rate greater than a predetermined threshold angle rate. When it is determined that the first alert end condition becomes satisfied based on a steering state, the alert is stopped/ended.

In some embodiments (e.g., an eighth modified embodiment) of the present disclosure,
the control unit is configured to cause the alerting device to stop alerting (step 2265: Yes and step 640, shown in FIG. 22) when a "state in which it is determined that the oncoming vehicle is not present" continues for a predetermined third threshold time while the alert is being performed (refer to step 2255 and step 2270, shown in FIG. 22).

A case may arise where it is temporarily determined that the oncoming vehicle is not present due to a temporal degradation in a detection accuracy of the surrounding sensor, even though the oncoming vehicle is actually present. In this case, a situation may arise where the alert is stopped/ended due to the erroneous determination that the oncoming vehicle is not present, and immediately thereafter, the alert is resumed due to a correct determination that the oncoming vehicle is present. When this happens, the driver may feel a sense of discomfort. In view of the above, in the above embodiment, the alert is continued being performed until the "state in which it is determined that the oncoming vehicle is not present" continues for the third threshold time. In other words, the alert is stopped/ended at a time point at which it becomes certain that the oncoming vehicle is not present.

In some embodiments of the present disclosure,
the control unit is configured to cause the alerting device to stop alerting, in at least one of a first case and a second case (step 635 shown in FIG. 6), wherein,
the first case is a case where the turn signal indicator corresponding to the specific direction side of the host vehicle has changed its state from the operating state to the operation stopped state while the alert is being performed (condition (C1)); and
the second case is a case where the host vehicle has stopped moving while the alert is being performed (condition (C3)).

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

<Configuration>

Figure 1:
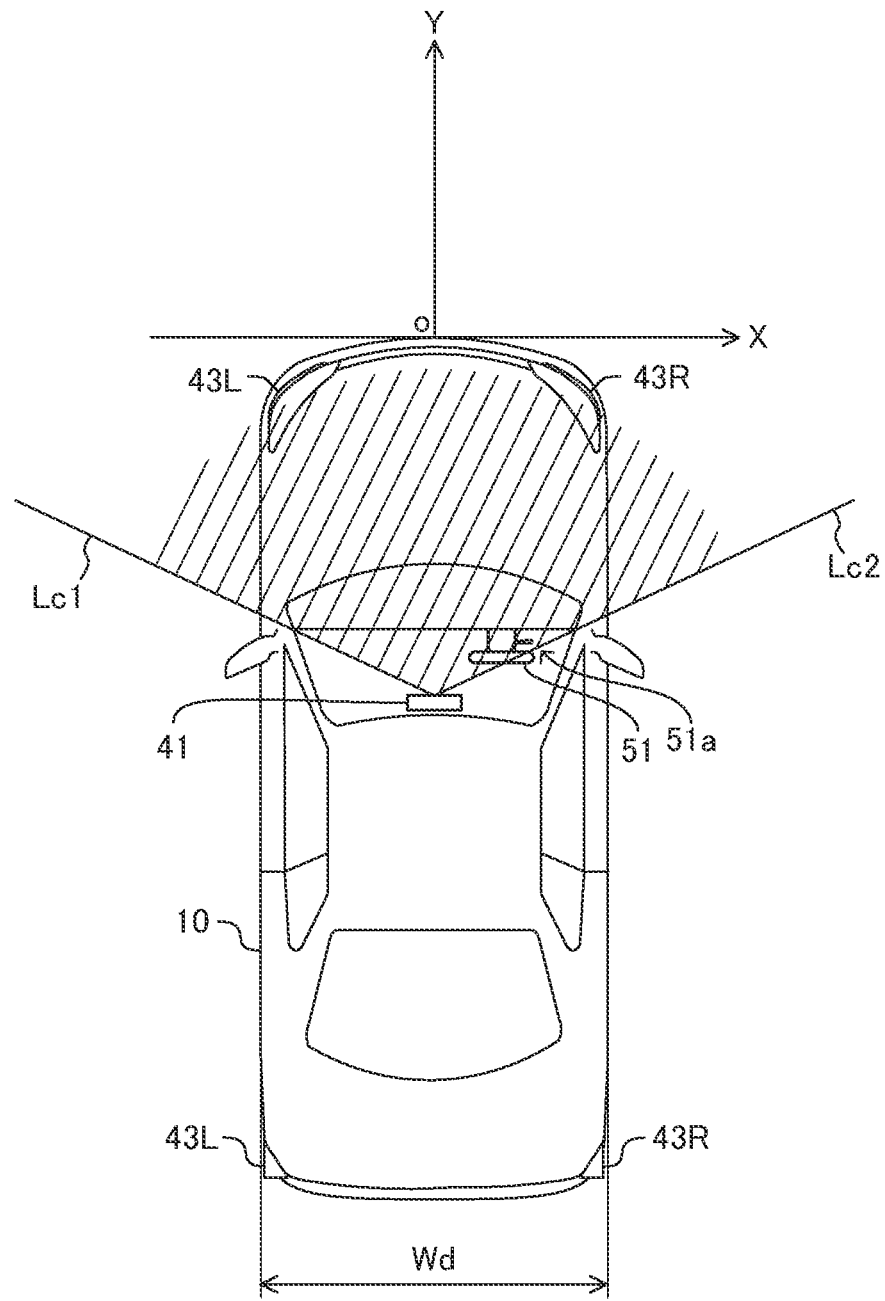
FIG. 1 is a schematic diagram of a vehicle (present host vehicle) in which an "alert apparatus for a host vehicle (present alert apparatus)" is installed.

An "alert apparatus for a vehicle" (hereinafter, referred to as a "present alert apparatus") according to an embodiment of the present disclosure will next be described with reference to the drawings. The present alert apparatus is applied to a vehicle (a host vehicle) 10 shown in FIG. 1. As understood from a block diagram of the present alert apparatus shown in FIG. 2, the present alert apparatus includes a vehicle control ECU (Electronic Control Unit) 21, which will be simply referred to as an "ECU 21". The ECU 21 may sometimes be referred to as a driving support/assist ECU.

The ECU 21 includes a micro-computer, as a major component, which is equipped with a CPU 31, a non-volatile memory 32, and a RAM 33. The CPU 31 performs data reading, numerical computation, computation result output, and so on by repeatedly executing predetermined programs (routines). The non-volatile memory 32 includes a ROM and a readable and writable flash memory. The non-volatile memory 32 has stored the programs executed by the CPU 31, lookup tables (maps) used by the CPU 31 during execution of the programs, and so on. The RAM 33 temporarily stores data read by the CPU.

The ECU 21 is connected to a front camera (forward camera) 41, a turn signal indicator lever sensor 42, turn signal indicator (direction indicator lumps) 43, a vehicle speed sensor 44, a steering angle sensor 45, a display 46, a speaker 47, and a brake pedal operation amount sensor (brake pedal operation state sensor) 48. The front camera 41 may be referred to as a "surrounding sensor", for convenience sake. The display 46 and the speaker 47 may collectively be referred to as an alerting device, for convenience sake.

(Configuration—Front Camera)

As shown in FIG. 1, the front camera 41 is disposed in the vicinity of an unillustrated rearview mirror attached on the cabin side of a front windshield of the vehicle 10. The front camera 41 obtains/captures a "frontward image" that represents an image in front of (ahead of) the vehicle 10 every time a predetermined time interval ΔTc (fixed value) elapses, and outputs/transmits data representing the frontward image (i.e., frontward image data) to the ECU 21. The angle of view (field of view, or a photographing area) of the front camera 41 in the lateral direction is equal to an angle formed between a straight line Lc1 and a straight line Lc2.

Hereinafter, the frontward image that was last obtained by the front camera 41 may be referred to as a "latest (or newest) image." In addition, the frontward image that was obtained just before the latest image was obtained (namely, the frontward image obtained the time interval ΔTc before the latest image was obtained) may be referred to as a "previous image."

It should be noted that, as shown in FIG. 1, the lateral (right-left) direction (i.e., a vehicle width direction) of the vehicle 10 is defined as an X axis, and the longitudinal (front-rear) direction of the vehicle 10 is defined as an Y axis. The lateral center of the front end of the vehicle 10 is the origin where X=0 and Y=0. The X coordinate assumes a positive value on the right hand with respect to the forward direction of the vehicle 10, and assumes a negative value on the left hand with respect to the forward direction of the vehicle 10. The Y coordinate assumes a positive value in the forward direction of the vehicle 10, and assumes a negative value in the backward direction of the vehicle 10.

When the ECU 21 receives the frontward image, it extracts (detects) an (3-D) object(s) including another vehicle(s) (an other vehicle(s)), and a pedestrian(s), contained in the frontward image, based on the frontward image. The ECU 21 also extracts (detects) a pair of demarcation lines (i.e., lane makers) that define a traveling lane in which the vehicle 10 is traveling. Hereinafter, the object detected based on the frontward image may be referred to as a "camera detected object." Information regarding the camera detected object and the traveling lane detected based on the frontward image may be referred to as "surrounding information", for convenience sake.

The process for detecting the camera object will next be specifically described. In order to extract an object from the frontward image, the ECU 21 searches for a "partial region of the frontward image" which is similar to any one of various templates (specifically, patterns of other vehicles, pedestrians, or the like) that have been stored in advance in the ECU 21. If the ECU 21 finds the "partial region of the frontward image similar to one of the templates (namely, if the "part of the frontward image" corresponding to the object is found), the ECU 21 extracts a contour (outline) of the "object contained in the frontward image" associated with that template. In this manner, the ECU 21 extracts the contour of the object included in the frontward image by pattern matching processing.

If the object is detected from the frontward image as described above, the ECU 21 obtains, as a type (kind) of the object, a type of the template which is determined to be similar to the object. In the present example, a type of the objects (i.e., the type of the templates stored in the ECU 21 in advance) includes an "other vehicle".

Furthermore, the ECU 21 obtains "a left end position (location) and a right end position" of the detected object with respect to the vehicle 10 (from the frontward image), according to a well-known method. Each of the left end position and the right end position of the detected is represented (expressed) by a combination of an X coordinate and a Y coordinate.

The ECU 21 obtains, as a longitudinal position Dy, a distance between the front end of the vehicle 10 and the object in a direction along the Y axis. More specifically, the ECU 21 obtains, as the longitudinal position Dy, the Y coordinate of the left end position of the object or the Y coordinate of the right end position of the object, whichever is smaller.

In addition, the ECU 21 obtains, as a lateral position Dx, the X coordinate of the object. More specifically, the ECU 21 obtains, as the lateral position Dx, an average value between the X coordinate of the left end position of the object and the X coordinate of the right end position of the object.

Here, when a type of the object is an "other vehicle" and a front surface of the object (i.e., a front end of the other vehicle) is included in the frontward image, the ECU 21 obtains/acquires a left end position of the front end of the other vehicle (i.e., a front end left corner of the other vehicle) with respect to the vehicle 10 and a right end position of the front end of the other vehicle (i.e., a front end right corner of the other vehicle) with respect to the vehicle 10. In a similar fashion, when a type of the object is an "other vehicle" and a rear surface of the object (i.e., a rear end of the other vehicle) is included in the frontward image, the ECU 21 obtains/acquires a left end position of the rear end of the other vehicle (i.e., a rear end left corner of the other vehicle) with respect to the vehicle 10 and a right end position of the rear end of the other vehicle (i.e., a rear end right corner of the other vehicle) with respect to the vehicle 10.

When the object detected from the latest image has also been detected from the previous image, the ECU 21 obtains/acquires a relative lateral speed Vx of the object, a relative longitudinal speed Vy of the object, and a running speed of the object (i.e., object moving speed) Vc, using the images.

The relative lateral speed Vx is indicative of a relative speed of the object with respect to the vehicle 10 in the X axis direction.

The relative longitudinal speed Vy is indicative of a relative speed of the object with respect to the vehicle 10 in the Y axis direction.

The object moving speed Vc is indicative of a magnitude of a moving speed of the object with respect to the ground (road surface).

More specifically, the ECU 21 obtains/acquires, as a lateral change amount ΔDx, a difference between "a lateral position Dx obtained from the latest image" and "a previous lateral position Dpx that is a lateral position Dx obtained from the previous image" (i.e., ΔDx=Dx−Dpx). Then, the ECU 21 obtains/acquires the relative lateral speed Vx by dividing the lateral change amount ΔDx by the time interval ΔTc (i.e., Vx=ΔDx/ΔTc).

Similarly, the ECU 21 obtains/acquires, as a longitudinal change amount ΔDy, a difference between "a longitudinal position Dy obtained from the latest image" and "a previous longitudinal position Dpy that is a longitudinal position Dy obtained from the previous image" (i.e., ΔDy=Dy−Dpy). Then, the ECU 21 obtains/acquires the relative longitudinal speed Vy by dividing the longitudinal change amount ΔDy by the time interval ΔTc (i.e., Vy=ΔDy/ΔTc).

Furthermore, the ECU 21 obtains/acquires, as an object longitudinal speed Vcy, a sum of the vehicle speed Vs indicative of the traveling speed of the vehicle 10 and the relative longitudinal speed Vy of the object (i.e., Vcy=Vs+Vy). Then, the ECU 21 obtains/acquires, as the object moving speed Vc, the square root of a sum of "the square of the object longitudinal speed Vcy" and "the square of the relative lateral speed Vx" (i.e., $Vc=(Vcy^2+Vx^2)^{1/2}$).

A detecting method will next be described, the method for detecting a pair of demarcation lines (more specifically, the left hand demarcation line and the right hand demarcation line) defining the traveling lane included in the frontward image. In the present example, each of the left hand demarcation line and the right hand demarcation line is a road marking represented by a continuous line or a broken line. They are either white or yellow. For example, the right hand lane is either a center line of the road or a line between the adjacent lanes. The right hand lane is referred to as a "specific demarcation line (or a specific demarcation line)".

The ECU 21 extracts/detects a boundary (demarcation line boundary) between a demarcation line extending forward with respect to the vehicle 10 and an area other than the demarcation line, based on color phases, luminosity values, and chromatic values of an area included in the frontward image, the area corresponding to a road surface (ground surface). The ECU 21 obtains/acquires a position of the left hand demarcation line with respect to the vehicle 10 and a position of the right hand demarcation line with respect to the vehicle 10, based on the extracted demarcation line boundaries.

The left hand demarcation line is represented by a set of a combination of "an arbitrary Y axis coordinate value" and "an X axis coordinate value of the left hand demarcation line, the X axis coordinate value corresponding to the arbitrary Y axis coordinate value". Similarly, the right hand demarcation line is represented by a set of a combination of "an arbitrary Y axis coordinate value" and "an X axis coordinate value of the right hand demarcation line, the X axis coordinate value corresponding to the arbitrary Y axis coordinate value".

In addition, the ECU 21 determines whether or not an adjacent right hand demarcation line has been detected. The adjacent right hand demarcation line is a demarcation line located/painted on the right side of the right hand demarcation line with respect to the vehicle 10. The adjacent right hand demarcation line defines, together with the right hand demarcation line, a lane adjacent to the traveling lane in the right hand of the traveling lane. The lane defined by (or between) the right hand demarcation line and the adjacent right hand demarcation line is referred to as an "adjacent right hand lane".

(Configuration: The Turn Signal Indicator Lever and the Turn Signal Lamps)

Figure 2:
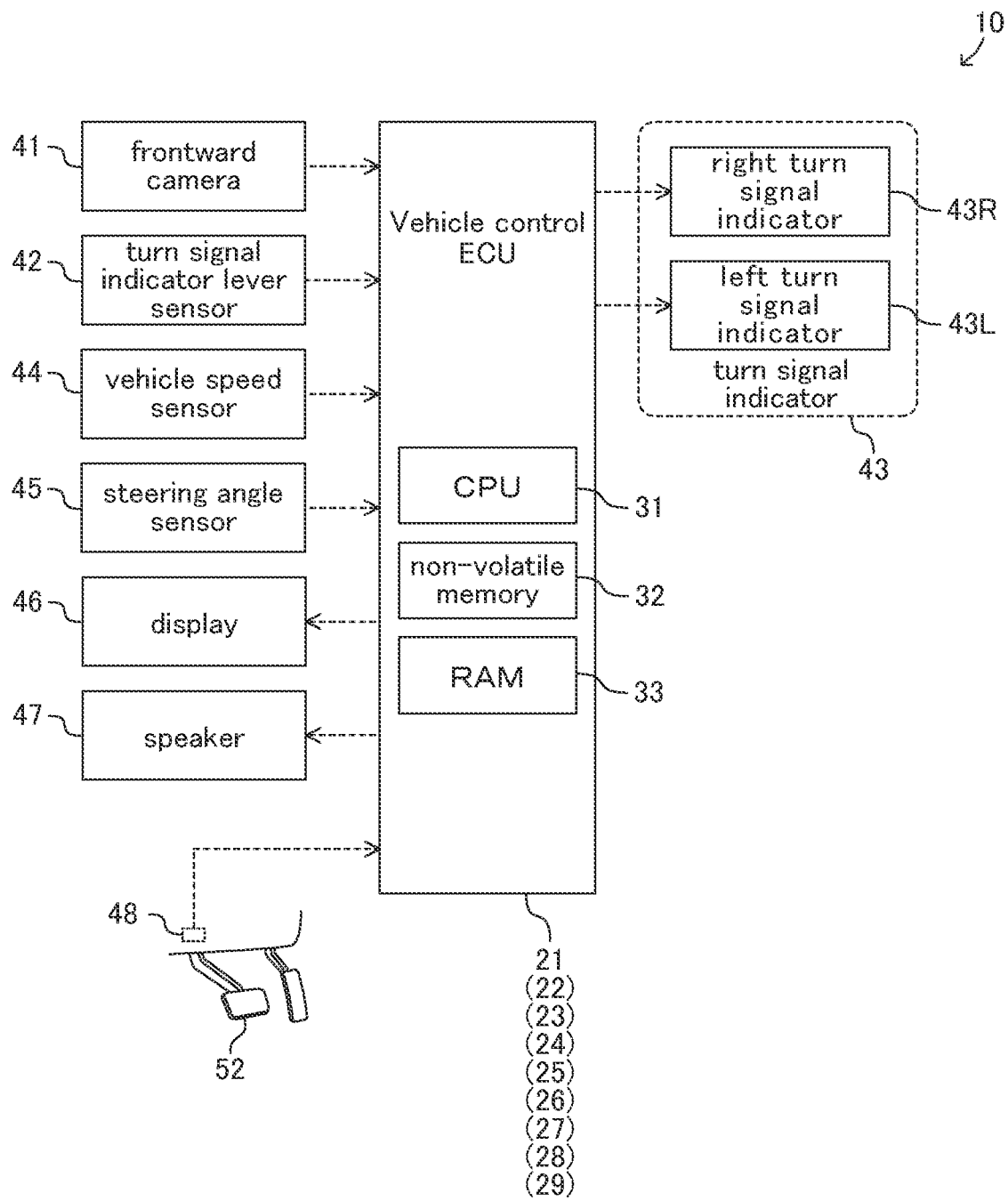
FIG. 2 is a block diagram of the present alert apparatus

A turn signal indicator lever sensor 42 shown in FIG. 2 is configured to detect a rotational position (specifically, a neutral position, a right hand position, and a left hand position) of the turn signal indicator lever 51*a* shown in FIG. 1, and to send/transmits a signal indicative of the detected rotational position of the turn signal indicator lever 51*a*. The turn signal indicator lever 51*a* is arranged at a steering column of the steering wheel 51 of the vehicle 10 so as to extend rightward with respect to the driver of the vehicle 10.

The turn signal indicator lever 51*a* is configured to be able to be rotated (tilted) by a certain angle, clockwise (in a right-hand turning direction) and counterclockwise (in a left-hand turning direction), around a supporting point serving as a rotational center that corresponds to a base part of the turn signal indicator lever 51a. The base part of the turn signal indicator lever 51a is connected to the steering column. When the turn signal indicator lever 51a has not been operated by the driver, the rotational position of the turn signal indicator lever 51a is the neutral position.

As shown in FIG. 2, the turn signal indicator(s) 43 include a right turn signal indicator 43R and a left turn signal indicator 43L. As shown in FIG. 1, the right turn signal indicator 43R includes turn signal lamps (yellow lamps) placed at the front end right corner of the vehicle 10 and at the rear end right corner of the vehicle 10. As shown in FIG. 1, the left turn signal indicator 43L includes turn signal lamps (yellow lamps) placed at the front end left corner of the vehicle 10 and at the rear end left corner of the vehicle 10.

The ECU 21 shown in FIG. 2 controls the turn signal indicator 43 in response to an operation state of the turn signal indicator lever 51a (i.e., the signal indicative of the rotational position of the turn signal indicator lever 51a that the ECU 21 receives from the turn signal indicator lever sensor 42). More specifically, when the rotational position of the turn signal indicator lever 51a is the right hand position (i.e., when the turn signal indicator lever 51a has been operated clockwise), the ECU 21 blinks the right turn signal indicator 43R. When the rotational position of the turn signal indicator lever 51a is the left hand position (i.e., when the turn signal indicator lever 51a has been operated counterclockwise), the ECU 21 blinks the left turn signal indicator 43L. When one of the left turn signal indicator 43L and the right turn signal indicator 43R is blinking, a state of the turn signal indicator that is blinking is referred to as a "operating state". When one of the left turn signal indicator 43L and the right turn signal indicator 43R is not blinking, a state of the turn signal indicator that is not blinking is referred to as an "operation stopped state (or an unoperating state)".

(Configuration: Miscellaneous)

The vehicle speed sensor 44 detects the vehicle speed Vs of the vehicle 10 and sends a signal indicative of the vehicle speed Vs to the ECU 21. The steering angle sensor 45 detects a steering angle θs that is a rotational angle of the steering wheel 51 and sends a signal indicative of the steering angle θs to the ECU 21.

When the steering wheel 51 is at a neutral position, the steering angle θs coincides with zero ("0"). The steering angle θs is positive (i.e., θs>0) when the steering wheel 51 has been rotated clockwise with respect to the neutral position. The steering angle θs is negative (i.e., θs<0) when the steering wheel 51 has been rotated counterclockwise with respect to the neutral position.

The display 46 is a liquid crystal display (LCD) arranged at a position within an unillustrated instrumental panel of the vehicle 10 so as to be visible to the driver of the vehicle 10. Figures including letters displayed on the display 46 are controlled by the ECU 21. The speaker 47 is disposed inside of a cabin of the vehicle 10. Alert (warning) sounds and audio messages generated from the speaker 47 are controlled by the ECU 21.

The brake pedal operation amount sensor 48 detects a brake pedal operation amount Bp (indicative of a brake pedal operation state) that is an operation amount of a brake pedal 52 operated by the driver to decrease the vehicle speed Vs, and sends a signal indicative of the brake pedal operation amount Bp to the ECU 21. When the brake pedal 52 has not been operated, the brake pedal operation amount Bp coincides with zero ("0"). The brake pedal operation amount Bp becomes greater as the operation amount of the brake pedal 52 becomes greater.

(Oncoming Vehicle Alert)

The oncoming vehicle alert (the process for issuing the oncoming vehicle alert) performed by the ECU 21 will next be described. In the following descriptions, it is assumed that the vehicle 10 is traveling in a region (i.e., a left-side driving region such as Japan and U.K.) where there is a traffic regulation to have a driver drive on the left side of the road. When the ECU 21 determines that the vehicle is highly likely to collide with an oncoming vehicle while the vehicle 10 is going to or about to make a right turn, the ECU 21 generates the oncoming vehicle alert (or performs the process for the oncoming vehicle alert). More specifically, in such a case, the ECU 21 causes the display 46 of the vehicle 10 and the speaker 47 of the vehicle 10 to perform an operation (i.e., alert operation) to alert the driver of the vehicle 10 of a presence of the oncoming vehicle. An oncoming vehicle is an "other vehicle" traveling on the oncoming (opposite) lane that is a lane opposite with respect to the traveling lane of the vehicle 10. The oncoming lane is a lane whose forwarding direction of a vehicle is opposite to a forwarding direction of a vehicle in the traveling lane in which the vehicle 10 is traveling.

The ECU 21 starts the oncoming vehicle alert (the process for the oncoming vehicle alert) when at least one of the following conditions becomes satisfied.

traveling path intersect alert (or notification) condition
first preceding (or prior) alert (or notification) condition
second preceding (or prior) alert (or notification) condition Each of the traveling path intersect alert condition, the first preceding alert condition, and the second preceding alert condition is sometimes referred to as a "specific condition", for convenience sake.

The right hand direction in the left-side driving region (i.e., a turning direction of the vehicle 10 that may cause the vehicle 10 to intersect with an oncoming-straight-through vehicle when the vehicle 10 is going to or about to turn) is sometimes referred to as a "specific direction", for convenience sake. For example, in the left-side driving region, the right hand direction is the specific direction.

<<The Traveling Path Intersect Alert Condition>>

The traveling path intersect alert condition becomes satisfied when all of the following conditions (A1) to (A4) are satisfied.

Condition (A1): to be satisfied when the right turn signal indicator 43R is in the operating state (is blinking).
Condition (A2): to be satisfied when the oncoming vehicle is present.
Condition (A3): to be satisfied when a host vehicle predicted traveling path (route) of the vehicle 10 and an oncoming vehicle predicted traveling path (route) of the oncoming vehicle intersect with each other.
Condition (A4): to be satisfied when a time (or a time length) to reach an intersecting point Tc is equal to or shorter than a first threshold time Tth1 (i.e., Tc≤Tth).

Figure 3:
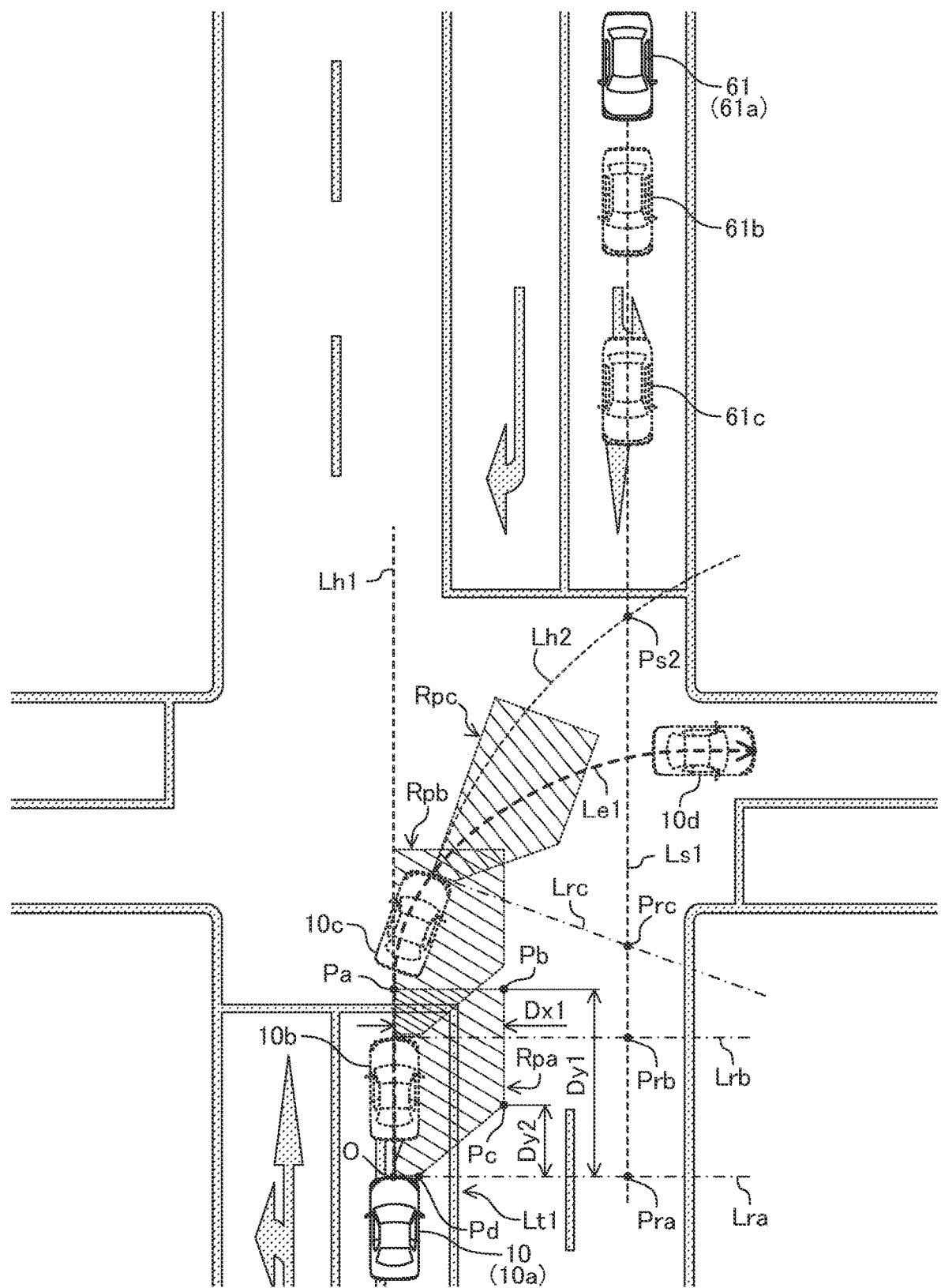
FIG. 3 is a plan view of an intersection in a case where an oncoming vehicle alert is performed/executed by the present alert apparatus, based on a traveling path intersect alert condition or a first preceding alert condition.

Each of the conditions (A1) to (A4) will be described with reference to FIG. 3. In FIG. 3, a current/present position of the vehicle 10 is represented by a vehicle position 10a. In this example, the driver of the vehicle 10 is about to (or intends to) make a right turn at an intersection. More specifically, the driver intends to move the vehicle 10 from the vehicle position 10a to a vehicle position 10d through a vehicle position 10b and a vehicle position 10c. The broken line Le1 represents a traveling path of the vehicle 10 intended by the driver (more precisely, a moving path of a center part of the front end of the vehicle 10).

As described later, the driver of the vehicle 10 is alerted to the presence of an other vehicle 61 through the oncoming vehicle alert (process), before the vehicle 10 reaches the vehicle position 10d. Therefore, there is a high possibility that the driver stops the vehicle 10 at a time point at which the vehicle 10 is in the vicinity of the vehicle position 10c.

In a period where the vehicle 10 moves from the vehicle position 10a to the vehicle position 10b, the steering angle θs is kept at 0 (zero) degree. After the vehicle 10 passes the vehicle position 10b, the steering angle θs starts increasing, and thereby the vehicle 10 starts making the right turn. Thereafter, the steering angle θs starts decreasing. The steering angle θs becomes 0 (zero) degree when the vehicle 10 reaches the vehicle position 10d.

The driver of the vehicle 10 starts operating (blinking) the right turn signal indicator 43R when the vehicle 10 reaches the vehicle position 10a. Thus, the condition (A1) becomes satisfied when the vehicle 10 reaches the vehicle position 10a.

The other vehicle 61 shown in FIG. 3 is an other vehicle detected based on the frontward image (that is, a camera detected object whose object type is a "vehicle"). A position of the other vehicle 61 at the time point at which the vehicle 10 is at the vehicle position 10a is represented by an other vehicle position 61a. A position of the other vehicle 61 at the time point at which the vehicle 10 is at the vehicle position 10b is represented by an other vehicle position 61b. A position of the other vehicle 61 at the time point at which the vehicle 10 is at the vehicle position 10c is represented by an other vehicle position 61c.

<<<Condition for Determining that an Other Vehicle is an Oncoming Vehicle>>>

In the present example, an oncoming vehicle is a camera detected object that satisfies all of the following conditions (a) to (e). In other words, the condition (A2) is satisfied when all of the following conditions (a) to (e) are satisfied. That is, when all of the following conditions (a) to (e) are satisfied, it is determined that the oncoming vehicle is present.

Condition (a): to be satisfied when a camera object is present and its type is a vehicle.
Condition (b): to be satisfied when the longitudinal position Dy of that camera detected object is positive (i.e., Dy>0).
Condition (c): to be satisfied when the relative longitudinal speed Vy of that camera detected object is negative (i.e., Vy<0).
Condition (d): to be satisfied when the object moving speed Vc of that camera detected object is equal to or higher than a predetermined other vehicle threshold speed Vcth (i.e., Vc≥Vcth).
Condition (e): to be satisfied when it is predicted that that camera detected object will pass in the right hand side of the current position of the vehicle 10.

In the example shown, the condition (a) is satisfied because the other vehicle 61 is a camera object whose type is a vehicle.

As understood from the other vehicle positions 61a to 61c, the other vehicle 61 is ahead of the vehicle 10 in a period in which the vehicle 10 moves from the vehicle position 10a to the vehicle position 10c. Thus, in the period in which the vehicle 10 moves from the vehicle position 10a to the vehicle position 10c, the condition (b) is satisfied because the longitudinal position Dy of the other vehicle 61 is positive.

In addition, the other vehicle 61 is approaching the vehicle 10 in the longitudinal direction of the vehicle 10 in the period in which the vehicle 10 moves from the vehicle position 10a to the vehicle position 10c. Thus, in the period in which the vehicle 10 moves from the vehicle position 10a to the vehicle position 10c, the condition (c) is satisfied because the relative longitudinal speed Vy of the other vehicle 61 is negative.

The other vehicle threshold speed Vcth used in the condition (c) has been set in advance at a value in the vicinity of a minimum value among vehicle speeds of a vehicle passing straight through an intersection. In the example above, the vehicle 61 is about to pass straight through the intersection, and therefore, the object moving speed Vc of the other vehicle 61 is higher than the other vehicle threshold speed Vcth so that the condition (d) is satisfied.

As for the condition (e), the ECU 21 determines that the condition (e) is satisfied when the oncoming vehicle predicted traveling path of that camera detected object intersects with a "right hand half-line" of the vehicle 10. The oncoming vehicle predicted traveling path is predicted/obtained based on "the position (i.e., the lateral position Dx and the longitudinal position Dy) and the speed (i.e., the relative lateral speed Vx and the relative longitudinal speed Vy)" of the camera detected object under the assumption that the speed of the camera detected object remains unchanged.

In FIG. 3, the oncoming vehicle predicted traveling path predicted when the other vehicle 61 is at the other vehicle position 61a is represented by a broken line Ls1. In the present example, the other vehicle 61 is running straight. Therefore, the oncoming vehicle predicted traveling path predicted when the other vehicle 61 is at the other vehicle position 61b is represented by a part of the broken line Ls1 that is lower (or is closer to the bottom of the paper) than the other vehicle position 61b on the paper illustrating FIG. 3. Similarly, the oncoming vehicle predicted traveling path predicted when the other vehicle 61 is at the other vehicle position 61c is represented by a part of the broken line Ls1 that is lower (or is closer to the bottom of the paper) than the other vehicle position 61c on the paper illustrating FIG. 3.

The right hand half-line of the vehicle 10 is a half-line extending from the center part (i.e., the origin of the X-Y coordinate) of the front end of the vehicle 10 rightward in the vehicle width direction of the vehicle 10 (i.e., X axis direction). In FIG. 3, the right hand half-line of the vehicle 10 obtained when the vehicle 10 is at the vehicle position 10a is represented by a dash-dot-dash line Lra. The right hand half-line of the vehicle 10 obtained when the vehicle 10 is at the vehicle position 10b is represented by a dash-dot-dash line Lrb. The right hand half-line of the vehicle 10 obtained when the vehicle 10 is at the vehicle position 10c is represented by a dash-dot-dash line Lrc.

The broken line Ls1 (namely, the oncoming vehicle predicted traveling path of the other vehicle 61) and the dash-dot-dash line Lra intersect with each other at a point Pra. Similarly, the broken line Ls1 and the dash-dot-dash line Lrb intersect with each other at a point Prb, and the broken line Ls1 and the dash-dot-dash line Lrc intersect with each other at a point Prc. Accordingly, the condition (e) is satisfied in the period in which the vehicle 10 moves from the vehicle position 10a to the vehicle position 10c.

As described above, the other vehicle 61 satisfies all of the conditions (a) to (e) in the period in which the vehicle 10 moves from the vehicle position 10a to the vehicle position 10c, and therefore, the condition (A2) is satisfied in this period.

The condition (A3) will next be described in detail. The host vehicle predicted traveling path is a path (route, course)

on/along which the vehicle 10 is predicted to travel, and is acquired, based on the current/present steering angle θs under the assumption that that steering angle θs remains unchanged. The host vehicle predicted traveling path acquired when the vehicle 10 is at the vehicle position 10a is represented by a broken line Lh1. As described above, the broken line Lh1 is a straight line since the steering angle θs detected when the vehicle 10 is at the vehicle position 10a is zero ("0") degree. The host vehicle predicted traveling path acquired when the vehicle 10 is at the vehicle position 10b is represented by a part of the broken line Lh1 that is upper (or is closer to the top of the paper) than the vehicle position 10b on the paper illustrating FIG. 3.

As understood from FIG. 3, the host vehicle predicted traveling path (represented by the broken line Lh1) acquired when the vehicle 10 is at the vehicle position 10a and the oncoming vehicle predicted traveling path (represented by the broken line Ls1) of the other vehicle 61 (at the time point at which the other vehicle 61 is at the other vehicle position 61a) do not intersect with each other. Similarly, the host vehicle predicted traveling path (represented by the broken line Lh1) acquired when the vehicle 10 is at the vehicle position 10b and the oncoming vehicle predicted traveling path (represented by the broken line Ls1) of the other vehicle 61 (at the time point at which the other vehicle 61 is at the other vehicle position 61b) do not intersect with each other. Accordingly, in a period in which the vehicle 10 moves from the vehicle position 10a to the vehicle position 10b, the condition (A3) is not satisfied, and thus, the traveling path intersect alert condition is not satisfied.

Whereas, the host vehicle predicted traveling path acquired when the vehicle 10 has reached the vehicle position 10c is represented by a broken line Lh2. At this time point, the steering angle θs is positive (es>0), and therefore, the host vehicle predicted traveling path of the vehicle 10 curves to the right as understood from the broken line Lh2.

The broken line Lh2 and the broken line LS1 intersect with each other at a point Ps2. Thus, when the vehicle is at the vehicle position 10c, the condition (A3) is satisfied.

The condition (A4) will next be described in detail. The time to reach an intersecting point Tc is a time length from a present time point to a time point at which the vehicle 10 reaches an intersecting point (in the present example, the point Ps2) at which the host vehicle predicted traveling path and the oncoming vehicle predicted traveling path intersect with each other. The ECU 21 obtains the time to reach an intersecting point Tc through calculation by dividing a "distance along the host vehicle predicted traveling path from (the present position of) the vehicle 10 to the intersecting point at which the host vehicle predicted traveling path and the oncoming vehicle predicted traveling path intersect with each other" by the "vehicle speed Vs". In the present example, the time to reach an intersecting point Tc becomes equal to the first threshold time Tth1 when the vehicle 10 reaches the vehicle position 10c. Namely, the condition (A4) becomes satisfied when the vehicle 10 reaches the vehicle position 10c.

Accordingly, at the time point at which the vehicle 10 reaches the vehicle position 10c, all of the conditions (A1) to (A4) become satisfied, and thus, the traveling path intersect alert condition becomes satisfied.

<<The First Preceding Alert Condition>>

The first preceding alert condition is a condition to be satisfied when the above-described conditions (A1) and (A2) are satisfied and a condition (B3a) described below is satisfied. Namely, the first preceding alert condition becomes satisfied when all of the following conditions are satisfied.

Condition (A1): to be satisfied when the right turn signal indicator 43R is in the operating state (is blinking).

Condition (A2): to be satisfied when the oncoming vehicle is present.

Condition (B3a): to be satisfied when the right hand demarcation line is not included in a "host vehicle right turn passing area" of the vehicle 10. The "host vehicle right turn passing area" of the vehicle 10 will be described later. It should be noted that the condition (B3a) is sometimes referred to as a "specific area condition", for convenience sake. The condition (B3a) is a condition to be satisfied when it is predicted/determined that the host vehicle (vehicle 10) is highly likely to start making a turn to the specific direction.

The "host vehicle right turn passing area" of the vehicle 10 is an area located in the vicinity of and in front of the vehicle 10, and located diagonally to the right from the vehicle 10. More specifically, the "host vehicle right turn passing area" of the vehicle 10 is the area of a pentagon having vertexes specified by the center (the origin O) of the front end of the vehicle 10, a point Pa, a point Pb, a point Pc, and a point Pd. The coordinate values of the points Pa, Pb, Pc, and Pd are Pa(0, Dy1), Pb(Dx1, Dy1), Pc(Dx1, Dy2), and Pd(Wd/2, 0), respectively. The host vehicle right turn passing area incudes a part of an area through which the vehicle 10 passes when the vehicle 10 makes the right turn (i.e., turns to the specific direction). The host vehicle right turn passing area has been determined in advance with respect to the vehicle 10, and is sometimes referred to as a "specific area".

Each of the distances Dx1, Dy1, and Dy2 is a fixed value (constant) and has been determined in advance in such a manner that the host vehicle right turn passing area is set at an "area through which the vehicle 10 is likely to pass when the vehicle 10 makes the right turn (i.e., turns to the specific direction)". A vehicle width Wd that defines the point Pd is a length of the vehicle 10 in the vehicle width direction of the vehicle 10 (refer to FIG. 1). It should be noted the following inequality expressions are satisfied.

$$Dy1 > Dy2 > 0, \text{ and } Dx1 > Wd/2 > 0$$

For example, when the vehicle 10 is at the vehicle position 10a, the host vehicle right turn passing area is represented by an area Rpa. This area Rpa includes/covers a right hand demarcation line Lt1. Thus, at this time point, the condition (B3a) is not satisfied.

The host vehicle right turn passing area of when the vehicle 10 is at the vehicle position 10b is represented by an area Rpb, and the host vehicle right turn passing area of when the vehicle 10 is at the vehicle position 10c is represented by an area Rpc. The right hand demarcation line Lt1 is not included in the area Rpb. Also, the right hand demarcation line Lt1 is not included in the area Rpc. In this manner, from/after a time point at which the vehicle 10 reaches the vehicle position 10b, the right hand demarcation line Lt1 is no longer included in the host vehicle right turn passing area, and thus, the condition (B3a) is satisfied. In the example shown in FIG. 3, when the vehicle 10 reaches the vehicle position 10b, the conditions (A1), (A2), and (B3a) are satisfied, and thus, the first preceding alert condition is satisfied.

In the above-described manner, the first preceding alert condition becomes satisfied at the time point at which the vehicle 10 reaches the vehicle position 10b that is prior to (before) the time point at which the traveling path intersect alert condition becomes satisfied (i.e., the time point at which the vehicle 10 reaches the vehicle point 10c). Accordingly, in the present example, the oncoming vehicle alert is started at an earlier time point.

<<The Second Preceding Alert Condition>>

The second preceding alert condition is a condition to be satisfied when the above-described conditions (A1) and (A2) are satisfied and both of "a condition (B3b) and a condition (B4)" described below are satisfied. Namely, the second preceding alert condition becomes satisfied when all of the following conditions are satisfied.

Condition (A1): to be satisfied when the right turn signal indicator 43R is in the operating state (is blinking).

Condition (A2): to be satisfied when the oncoming vehicle is present.

Condition (B3b): to be satisfied when the right hand demarcation line is included in the host vehicle right turn passing area of the vehicle 10.

Condition (B4): to be satisfied when the vehicle speed Vs is lower than a first threshold speed Vth1 (i.e., Vs<Vth1). The first threshold speed Vth1 has been set in advance at a value in the vicinity of a maximum value (referred to as a "maximum value immediately before a right-left turn") among vehicle speeds typically observed when the vehicle starts turning to the right (or to the left).

It should be noted that a case where both of the conditions (B3b) and (B4) become satisfied is expressed as a case where a "ready-to-turn condition" becomes satisfied. The ready-to-turn condition is a condition to be satisfied when it is predicted/determined that the host vehicle (vehicle 10) is highly likely to start making a turn to the specific direction.

The second preceding alert condition will next be described in detail with reference to FIG. 4. In an example shown in FIG. 4, a current/present position of the vehicle 10 is represented by a vehicle position 10e. In this example, the driver of the vehicle 10 is about to (or intends to) make the vehicle 10 enter into a parking lot Rs after crossing (passing through) an oncoming lane. More specifically, the driver intends to move the vehicle 10 from the vehicle position 10e to a vehicle position 10i through vehicle positions 10f to 10h. The broken line Le2 represents a traveling path of the vehicle 10 intended by the driver. Whether or not each of the traveling path intersect alert condition, the first preceding alert condition, and the second preceding alert condition is satisfied in this example will next be described.

The driver of the vehicle 10 starts operating (blinking) the right turn signal indicator 43R when the vehicle 10 reaches the vehicle position 10f. Thus, the condition (A1) becomes satisfied when the vehicle 10 reaches the vehicle position 10f.

Figure 4:
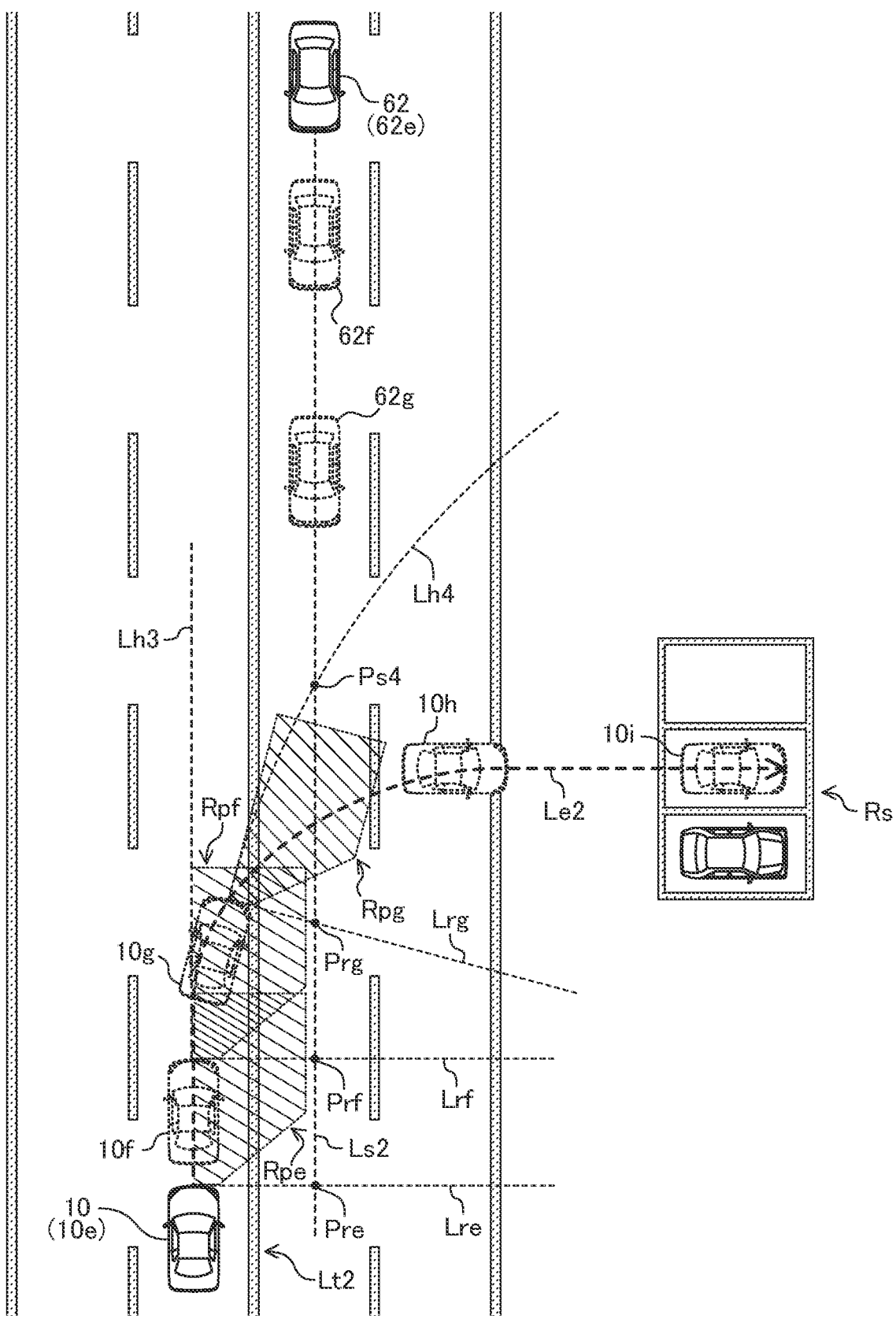
FIG. 4 is a plan view of a road in a case where an oncoming vehicle alert is performed/executed by the present alert apparatus, based on the traveling path intersect alert condition or a second preceding alert condition.

An other vehicle 62 shown in FIG. 4 is an other vehicle detected based on the frontward image (that is, a camera detected object whose object type is a "vehicle"). Therefore, the other vehicle 62 satisfies the above-described condition (a).

A position of the other vehicle 62 at the time point at which the vehicle 10 is at the vehicle position 10e is represented by an other vehicle position 62e. A position of the other vehicle 62 at the time point at which the vehicle 10 is at the vehicle position 10f is represented by an other vehicle position 62f. A position of the other vehicle 62 at the time point at which the vehicle 10 is at the vehicle position 10g is represented by an other vehicle position 62g.

An oncoming vehicle predicted traveling path predicted when the other vehicle 62 is at the other vehicle position 62e is represented by a broken line Ls2. In this example, the object moving speed Vc of the other vehicle 62 is higher than the other vehicle threshold speed Vcth. Therefore, the other vehicle 62 satisfies the above-described condition (b).

In this example, the other vehicle 62 is running straight. Therefore, the oncoming vehicle predicted traveling path predicted when the other vehicle 62 is at the other vehicle position 62f is represented by a part of the broken line Ls2 that is lower (or is closer to the bottom of the paper) than the other vehicle position 62f on the paper illustrating FIG. 4. Similarly, the oncoming vehicle predicted traveling path predicted when the other vehicle 62 is at the other vehicle position 62g is represented by a part of the broken line Ls2 that is lower (or is closer to the bottom of the paper) than the other vehicle position 62g on the paper illustrating FIG. 4.

As understood from FIG. 4, in a period in which the vehicle 10 moves from the vehicle position 10e to the vehicle position 10g, the longitudinal position Dy of the other vehicle 62 is positive and the relative longitudinal speed Vy of the other vehicle 62 is negative (i.e., Dy>0 and Vy<0). Thus, in this period, the other vehicle 62 satisfies the above-described conditions (b) and (c).

The right hand half-line of the vehicle 10 obtained when the vehicle 10 is at the vehicle position 10e is represented by a dash-dot-dash line Lre. The right hand half-line of the vehicle 10 obtained when the vehicle 10 is at the vehicle position 10f is represented by a dash-dot-dash line Lrf. The right hand half-line of the vehicle 10 obtained when the vehicle 10 is at the vehicle position 10g is represented by a dash-dot-dash line Lrg.

The broken line Ls2 (namely, the oncoming vehicle predicted traveling path of the other vehicle 62) and the dash-dot-dash line Lre intersect with each other at a point Pre. Similarly, the broken line Ls2 and the dash-dot-dash line Lrf intersect with each other at a point Prf, and the broken line Ls2 and the dash-dot-dash line Lrg intersect with each other at a point Prg. Accordingly, the condition (e) is satisfied in the period in which the vehicle 10 moves from the vehicle position 10e to the vehicle position 10g.

As understood from the above, the other vehicle 62 satisfies all of the conditions (a) to (e) in the period in which the vehicle 10 moves from the vehicle position 10e to the vehicle position 10g, and therefore, the condition (A2) is satisfied in this period. In other words, it is determined that the other vehicle 62 is the oncoming vehicle.

The host vehicle predicted traveling path acquired when the vehicle 10 is at the vehicle position 10f is represented a broken line Lh3. The broken line Ls2 (i.e., the oncoming vehicle predicted traveling path of the other vehicle 62) and the broken line Lh3 do not intersect with each other. Accordingly, the condition (A3) is not satisfied when the vehicle 10 is at the vehicle position 10f.

The host vehicle predicted traveling path acquired when the vehicle 10 is at the vehicle position 10g is represented a broken line Lh4. The broken line Ls2 and the broken line Lh4 intersect with each other at a point Ps4. Accordingly, the condition (A3) is satisfied when the vehicle 10 is at the vehicle position 10g.

In addition, the time to reach an intersecting point Tc of when the vehicle 10 is at the vehicle position 10g is equal to the first threshold time Tth1. Thus, the condition (A4) becomes satisfied when the vehicle 10 reaches the vehicle position 10g.

Accordingly, at the time point at which the vehicle 10 reaches the vehicle position 10g, all of the conditions (A1) to (A4) becomes satisfied, and thus, the traveling path intersect alert condition becomes satisfied.

Next, descriptions will be given as to whether or not the first preceding alert condition is satisfied. When the vehicle 10 is at the vehicle position 10e, the host vehicle right turn passing area of the vehicle 10 is represented by an area Rpe. Similarly, when the vehicle 10 is at the vehicle position 10f, the host vehicle right turn passing area of the vehicle 10 is represented by an area Rpf. When the vehicle 10 is at the vehicle position 10g, the host vehicle right turn passing area of the vehicle 10 is represented by an area Rpg.

As understood from FIG. 4, a demarcation line Lt2 that is the right hand demarcation line is included in each of the area Rpe, the area Rpf, and the area Rpg. Therefore, in a period in which the vehicle 10 moves from the vehicle position 10e to the vehicle position 10g, the condition (B3a) is not satisfied, and thus, the first preceding alert condition is not satisfied.

Next, descriptions will be given as to whether or not the second preceding alert condition is satisfied. As described above, the demarcation line Lt2 that is the right hand demarcation line is included in each of the area Rpe, the area Rpf, and the area Rpg. Therefore, in the period in which the vehicle 10 moves from the vehicle position 10e to the vehicle position 10g, the condition (B3b) is satisfied.

As described above, the first threshold speed Vth1 has been set at the "maximum value immediately before a right-left turn", and the driver of the vehicle 10 has the intention to make a right turn. Therefore, in the period in which the vehicle 10 moves from the vehicle position 10e to the vehicle position 10g, the vehicle speed Vs is lower than the first threshold speed Vth1, and thus, the condition (B4) is satisfied.

As described above, the driver of the vehicle 10 starts operating (blinking) the right turn signal indicator 43R when the vehicle 10 reaches the vehicle position 10f. Thus, the condition (A1) becomes satisfied when the vehicle 10 reaches the vehicle position 10f. Accordingly, the second preceding alert condition becomes satisfied when the vehicle 10 reaches the vehicle position 10f.

In the above-described manner, the second preceding alert condition becomes satisfied at the time point at which the vehicle 10 reaches the vehicle position 10f that is prior to (before) the time point at which the traveling path intersect alert condition becomes satisfied (i.e., the time point at which the vehicle 10 reaches the vehicle point 10g). Accordingly, in the present example, the oncoming vehicle alert is started at an earlier time point.

Figure 5:
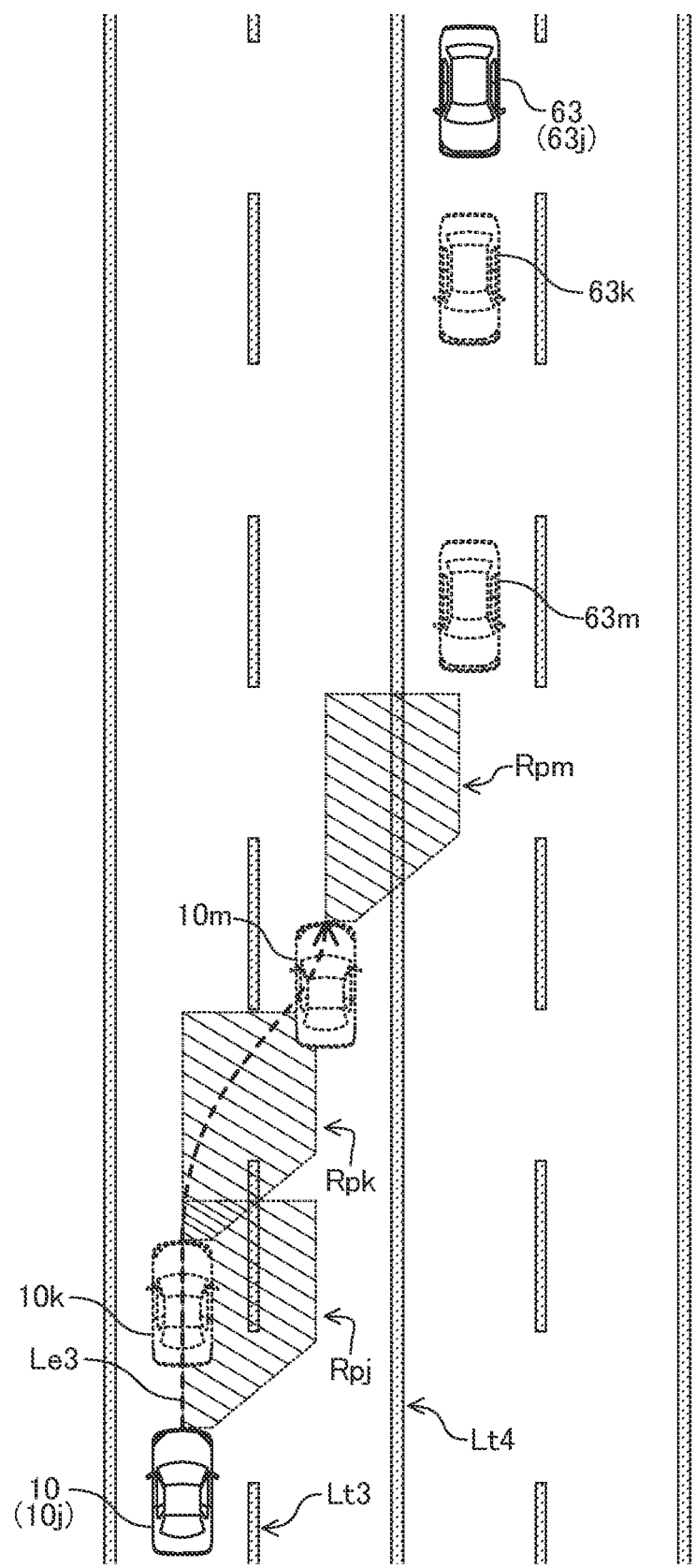
FIG. 5 is a plan view of a road in a case where the second preceding alert condition does not become satisfied.

Next, descriptions will be given on the reason why the second preceding alert condition includes the condition (B4) with reference to FIG. 5. In FIG. 5, a current/present position of the vehicle 10 is represented by a vehicle position 10j. In this example, the driver of the vehicle 10 is about to (or intends to) change lanes from the traveling lane to a lane adjacent to the traveling lane in the right hand. The lane adjacent to the traveling lane in the right hand is a lane having a predetermined traveling direction that is the same as the traveling direction of the traveling lane, and is generally referred to a "passing lane" or an "adjacent lane". More specifically, the driver intends to move the vehicle 10 from the vehicle position 10j to a vehicle position 10m through vehicle position 10k. A broken line Le3 represents a traveling path of the vehicle 10 intended by the driver.

The driver of the vehicle 10 starts operating (blinking) the right turn signal indicator 43R when the vehicle 10 reaches the vehicle position 10k. Thus, the condition (A1) becomes satisfied when the vehicle 10 reaches the vehicle position 10k. It should be noted that the driver of the vehicle 10 ends/stops operating (blinking) the right turn signal indicator 43R when the vehicle 10 reaches the vehicle position 10m (i.e., when the lane change is completed).

An other vehicle 63 shown in FIG. 5 is an other vehicle detected based on the frontward image (that is, a camera detected object whose object type is a "vehicle").

A position of the other vehicle 63 at the time point at which the vehicle 10 is at the vehicle position 10j is represented by an other vehicle position 63j. A position of the other vehicle 63 at the time point at which the vehicle 10 is at the vehicle position 10k is represented by an other vehicle position 63k. A position of the other vehicle 63 at the time point at which the vehicle 10 is at the vehicle position 10m is represented by an other vehicle position 63m.

Although a detailed description is omitted, in the period in which the vehicle 10 moves from the vehicle position 10j to the vehicle position 10m, the other vehicle 63 satisfies a condition for being an oncoming vehicle (namely, the conditions (a) to (e)), and thus, the condition (A2) is satisfied. Whereas, in the period in which the vehicle 10 moves from the vehicle position 10j to the vehicle position 10m, neither the condition (A3) nor the condition (A4) is satisfied. Therefore, in this period, the condition (A2) is not satisfied and the condition (A4) is not satisfied, and thus, the traveling path intersect alert condition is not satisfied.

The host vehicle right turn passing area of when the vehicle 10 is at the vehicle position 10j is represented by an area Rpj. Similarly, the host vehicle right turn passing area of when the vehicle 10 is at the vehicle position 10k is represented by an area Rpk, and the host vehicle right turn passing area of when the vehicle 10 is at the vehicle position 10m is represented by an area Rpm.

A right hand demarcation line of when the vehicle 10 is at the vehicle position 10j is a demarcation line Lt3. A right hand demarcation line of the adjacent lane is a demarcation line Lt4. As understood from FIG. 5, the demarcation line Lt3 is included in each of the area Rpj and the area Rpk. The demarcation line Lt4 is included in the area Rpm. Therefore, in the period in which the vehicle 10 moves from the vehicle position 10j to the vehicle position 10m, the condition (B3a) is not satisfied, and thus, the first preceding alert condition is not satisfied.

Whereas, the condition (B3b) is satisfied in the period in which the vehicle 10 moves from the vehicle position 10j to the vehicle position 10m. In addition, in the period in which the vehicle 10 moves from the vehicle position 10j to the vehicle position 10m, the vehicle speed Vs is higher than the first threshold speed Vth1, and thus, the condition (B4) is not satisfied. That is, the vehicle speed Vs of when the vehicle 10 is changing lanes as shown in FIG. 5 is highly likely to be higher than the vehicle speed Vs of when the vehicle 10 is making the right turn as shown in FIG. 4. Accordingly, while the vehicle 10 is changing lanes, the vehicle speed Vs is higher than the first threshold speed Vth1, and thus, the condition (B4) is not satisfied, and therefore, the second preceding alert condition is not satisfied.

In the above-described manner, in the period in which the vehicle 10 moves from the vehicle position 10j to the vehicle position 10m, none of the traveling path intersect alert condition, the first preceding alert condition, and the second preceding alert condition is satisfied so that the oncoming vehicle alert is not performed. In other words, for instance, even when the right turn signal indicator 43R is being operated (blinking) and the oncoming vehicle is present when the driver is changing lanes (i.e., even when the conditions (A1), (A2), and (B3b) are all satisfied), the condition (B4) is not satisfied unless the driver of the vehicle 10 decreases the vehicle speed Vs (in order to make a right turn). Therefore, when the lane change is being performed, the second preceding alert condition is not satisfied, and thus, the oncoming vehicle alert is not performed.

<Specific Operation>

The CPU 31 (hereinafter, simply referred to as the "CPU") of the ECU 21 executes an "oncoming vehicle alert determination routine" shown by a flowchart of FIG. 6, every time a predetermined time elapses.

Figure 6:
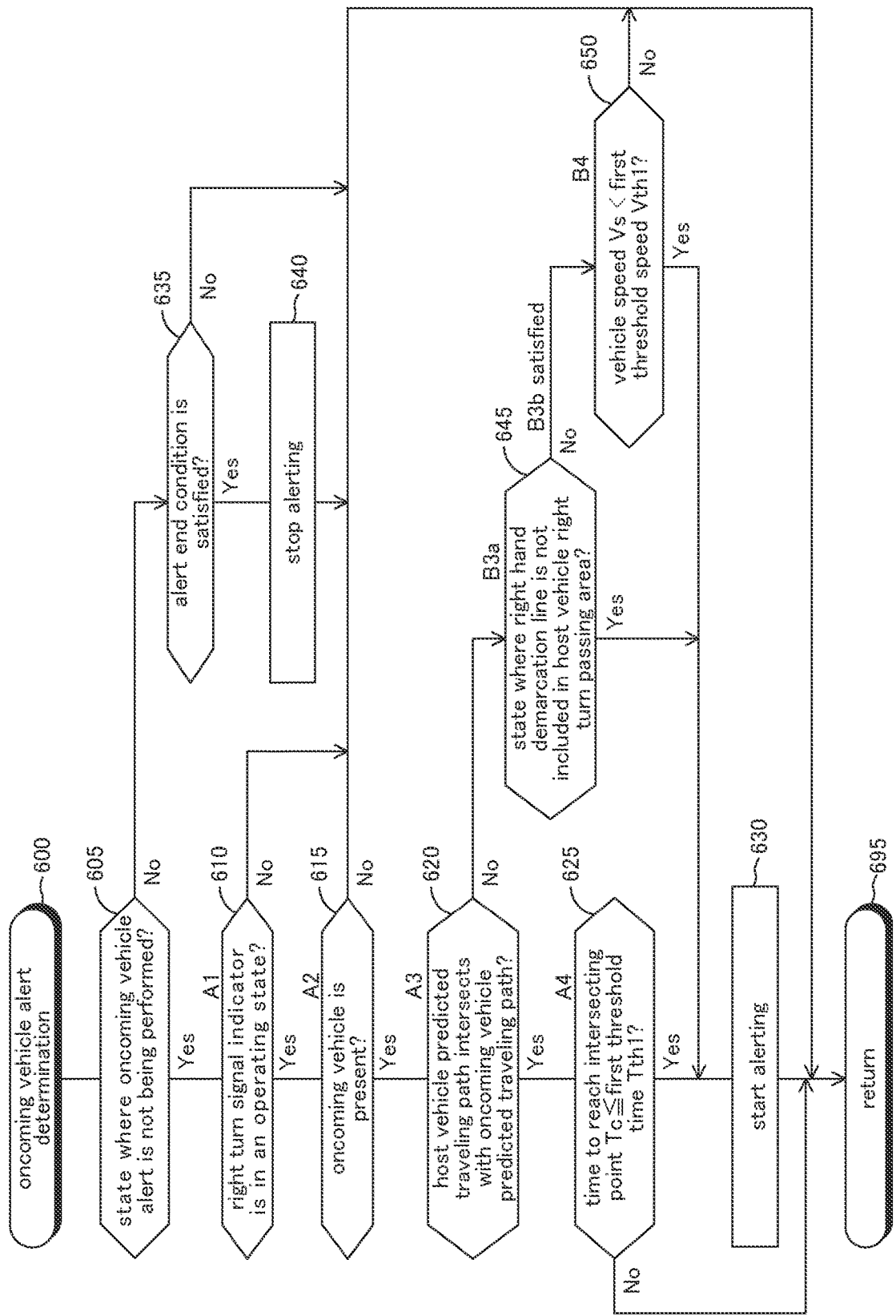
FIG. 6 is a flowchart showing an oncoming vehicle alert determination routine executed by the present alert apparatus.

Therefore, when an appropriate time comes, the CPU starts processing from step 600 shown in FIG. 6, and proceeds to step 605. At step 605, the CPU determines whether or not a current/present state is a state in which the oncoming vehicle alert is not being performed. Hereinafter, the oncoming vehicle alert may sometimes be simply referred to as an "alert". In other words, at step 605, the CPU determines whether or not an "alert using the display 46 and the speaker 47" is not being issued/generated.

(Case A)

Here, it is assumed that the CPU executes the present routine for the first time immediately after a state arises where the traveling path intersect alert condition becomes satisfied while the alert is not being performed.

Under the above assumption for the case A, since the alert is not being performed, the CPU makes a "Yes" determination at step 605 and proceeds to step 610 so as to determine whether or not the right turn signal indicator 43R is in the operating state (or is blinking/being operated). In other words, the CPU determines whether or not the condition (A1) is satisfied.

According to the above-described assumption for the case A, the right turn signal indicator 43R is being operated. Therefore, the CPU makes a "Yes" determination at step 610 and proceeds to step 615. At step 615, the CPU determines whether or not the oncoming vehicle is present. In other words, the CPU determines whether or not the condition (A2) is satisfied.

According to the above-described assumption for the case A, the oncoming vehicle is present. Thus, the CPU makes a "Yes" determination at step 615 and proceeds to step 620. At step 620, the CPU determines whether or not the host vehicle predicted traveling path and the oncoming vehicle predicted traveling path intersect with each other. In other words, the CPU determines whether or not the condition (A3) is satisfied.

According to the above-described assumption for the case A, the host vehicle predicted traveling path and the oncoming vehicle predicted traveling path intersect with each other. Thus, the CPU makes a "Yes" determination at step 620 and proceeds to step 625. At step 625, the CPU determines whether or not the time to reach the intersecting point Tc is equal to or shorter than the first threshold time Tth1. In other words, the CPU determines whether or not the condition (A4) is satisfied.

According to the above-described assumption for the case A, the time to reach the intersecting point Tc is equal to or shorter than the first threshold time Tth1. Thus, the CPU makes a "Yes" determination at step 625 and proceeds to step 630. At step 630, the CPU starts performing (or, issuing, generating) the alert.

More specifically, at step 630, the CPU makes the display 46 display a symbol (oncoming vehicle alert symbol/mark) that indicates/expresses that the vehicle 10 is likely to collide with the oncoming vehicle. In addition, at step 630, the CPU makes the speaker 47 generate a warning/alerting sound (oncoming vehicle alert sound) that indicates/expresses that the vehicle 10 is likely to collide with the oncoming vehicle. Thereafter, the CPU proceeds to step 695 so as to terminate the present routine.

(Case B)

Here, it is assumed that the CPU executes the present routine for the first time immediately after a state arises where the first preceding alert condition becomes satisfied while the alert is not being performed. For example, this case corresponds to a case where the CPU executes the present routine for the first time immediately after the vehicle 10 has reached the vehicle position 10b in the example shown in FIG. 3.

Under the above assumption for the case B, since the both of the conditions (A1) and (A2) are satisfied, the CPU makes a "Yes" determination at each of step 610 and step 615, and proceeds to step 620. According to the above assumption for the case B, the traveling path intersect alert condition has not been satisfied (i.e., the condition (A3) has not been satisfied). Therefore, the CPU makes a "No" determination at step 620 and proceeds to step 645. At step 645, the CPU determines whether or not a current/present state is a state in which the right hand demarcation line is not included in the host vehicle right turn passing area. In other words, the CPU determines whether or not the condition (B3a) is satisfied at step 645. It can be said that, at step 645, the CPU determines whether or not a current/present state is a state in which the condition (B3b) is not satisfied.

According to the above-described assumption for the case B, the first preceding alert condition is satisfied (i.e., the condition (B3a) is satisfied). Thus, the CPU makes a "Yes" determination at step 645 and proceeds to step 630 so as to start performing the alert.

(Case C)

Here, it is assumed that the CPU executes the present routine for the first time immediately after a state arises where the second preceding alert condition becomes satisfied while the alert is not being performed. For example, this case corresponds to a case where the CPU executes the present routine for the first time immediately after the vehicle 10 has reached the vehicle position 10f in the example shown in FIG. 4.

Under the above assumption for the case C, the both of the conditions (A1) and (A2) are satisfied, whereas neither the condition (A3) nor the condition (B3a) is satisfied. Therefore, the CPU makes a "Yes" determination at each of step 610 and step 615, and makes a "No" determination at each of step 630 and step 645, so as to proceed to step 650.

At step 650, the CPU determines whether or not the vehicle speed Vs is lower than the first threshold speed Vth1. In other words, the CPU determines whether or not the condition (B4) is satisfied. According to the above-described assumption for the case C, the vehicle speed Vs is lower than the first threshold speed Vth1. Thus, the CPU makes a "Yes" determination at step 650 so as to start performing the alert at step 630.

(Case D)

Here, it is assumed that an alert end condition is not satisfied while the alert is being performed. The alert end condition is a condition to be satisfied when the alert should be stopped. The alert end condition will be described later in detail.

Under the above assumption for the case D, the alert has been being performed. Therefore, the CPU makes a "No" determination at each of step 605 and proceeds to step 635. At step 635, the CPU determines whether or not the alert end condition is satisfied. According to the above-described assumption for the case C, the alert end condition is not satisfied. Thus, the CPU makes a "No" determination at step 635 and proceeds directly to step 695. In this manner, the alert continues being performed in a period from a time point at which the alert is started to a time point at which the alert end condition becomes satisfied.

(Case E)

Here, it is assumed that the CPU executes the present routine for the first time immediately after the alert end condition has become satisfied while the alert is being performed.

<<The Alert End Condition>>

The alert end condition becomes satisfied when at least one of the following conditions (C1) to (C3) is satisfied.

Condition (C1): to be satisfied when the right turn signal indicator 43R is ended its operation (i.e., when the right turn signal indicator 43R has changed its states from the operating state to the operation stopped state).

Condition (C2): to be satisfied when the oncoming vehicle is no longer present.

Condition (C3): to be satisfied when the vehicle 10 has stopped moving (i.e., when the vehicle speed Vs has changed/decreased to zero ("0")).

For example, when the other vehicle (i.e., the oncoming vehicle) slows down so that the object moving speed Vc becomes lower than the other vehicle threshold speed Vcth, the condition (d) becomes unsatisfied. In this case, the other vehicle is no longer determined to be the oncoming vehicle. Thus, the condition (C2) becomes satisfied so that the alert end condition becomes satisfied. Alternatively, for example, when the driver of the vehicle 10 has noticed the oncoming vehicle so that the driver has had the vehicle 10 stop moving (i.e., when the vehicle speed Vs has changed to zero ("0")), the condition (C3) becomes satisfied, and thus, the alert end condition becomes satisfied.

According to the above-described assumption for the case E, the alert end condition has been satisfied, and thus, the CPU makes a "Yes" determination at step 635, and proceeds to step 640 so as to end/finish/stop the alert. More specifically, at step 640, the CPU makes the display 46 stop displaying the oncoming vehicle alert symbol. In addition, at step 640, the CPU makes the speaker 47 stop generating the oncoming vehicle alert sound. Thereafter, the CPU directly proceeds to step 695.

(Other Cases)

When the condition (A1) is not satisfied while the alert is not being performed, the CPU makes a "No" determination at step 610 and directly proceeds to step 695.

While the alert is not being performed, when the condition (A1) is satisfied, but the condition (A2) is not satisfied, the CPU makes a "No" determination at step 615 and directly proceeds to step 695.

While the alert is not being performed, when the conditions (A1) to (A3) are satisfied, but the condition (A4) is not satisfied, the CPU makes a "No" determination at step 625 and directly proceeds to step 695.

While the alert is not being performed, when the conditions (A1), (A2) and (B3b) are satisfied, but the condition (B4) is not satisfied, the CPU makes a "No" determination at step 650 and directly proceeds to step 695.

As has been described above, the present alert apparatus including the ECU 21 executes (starts to perform) the oncoming vehicle alert at the time point at which either one of the first preceding alert condition and the second preceding alert condition has become satisfied, even when the traveling path intersect alert condition has not become satisfied (i.e., even when the host vehicle predicted traveling path predicted based on the steering angle θs of the vehicle 10 and the oncoming vehicle predicted traveling path of the oncoming vehicle do not intersect with each other). Therefore, the present alert apparatus can starts executing the oncoming vehicle alert at an earlier time point. In addition, as described with reference to the example shown in FIG. 5, the present alert apparatus does not execute the oncoming vehicle alert, when the vehicle is changing lanes to the right (but when the driver does not intend to make a right turn). Thus, the unnecessary oncoming vehicle alert is not performed.

(First Modified Example of the Present Alert Apparatus)

A first modified example (hereinafter, sometimes referred to as a "first modified apparatus") of the present alert apparatus will next be described. The above-described present alert apparatus starts performing the oncoming vehicle alert, when at least one of the traveling path intersect alert condition, the first preceding alert condition, and the second preceding alert condition becomes satisfied. Whereas, the first modified apparatus starts performing the oncoming vehicle alert, when at least one of the traveling path intersect alert condition and a "third preceding alert condition" becomes satisfied. Whether or not the third preceding alert condition is satisfied is determined based on a state of a preceding vehicle that is an other vehicle running immediately ahead of the vehicle 10. The main difference between the first modified apparatus and the present alert apparatus will next be described.

<<The Third Preceding Alert Condition>>

The third preceding alert condition is a condition to be satisfied when the above-described conditions (A1) and (A2) are satisfied and a condition (D3) described below is satisfied. Namely, the third preceding alert condition becomes satisfied when all of the following conditions are satisfied.

Condition (A1): to be satisfied when the right turn signal indicator 43R is in the operating state (is blinking).

Condition (A2): to be satisfied when the oncoming vehicle is present.

Condition (D3): to be satisfied when the object moving speed Vc of the preceding vehicle is higher than a predetermined second threshold speed Vth2 (i.e., Vc≥Vth2). The second threshold speed Vth2 has been set in advance at a value in the vicinity of a minimum value among vehicle speeds typically observed when the vehicle is turning to the right. The second threshold speed Vth2 may sometimes be referred to as a "preceding vehicle turning threshold speed". It can be determined that the preceding vehicle starts making a turn to the right (turn to the specific direction), when the object moving speed Vc of the preceding vehicle has become a value higher than the second threshold speed Vth2 from a value lower than the second threshold speed Vth2. The condition (D3) is a condition to be satisfied when it is predicted/determined that there is a high possibility that the host vehicle (vehicle 10) starts making a turn to the specific direction.

Figure 7:
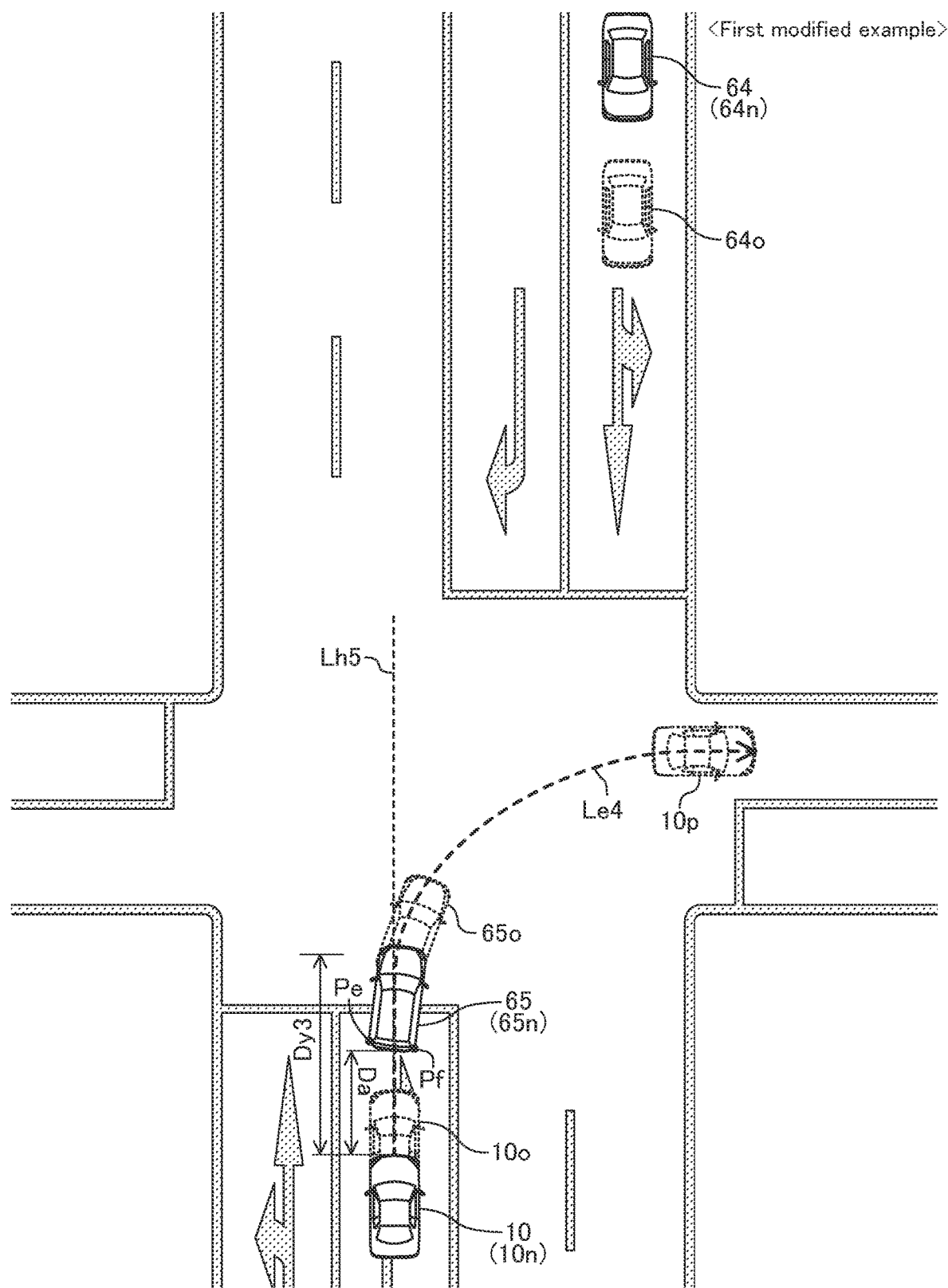
FIG. 7 is a plan view of an intersection in a case where an oncoming vehicle alert is performed/executed by an alert apparatus (first modified apparatus) according to a first modified example of the present alert apparatus, based on a third preceding alert condition.

The third preceding alert condition will next be described in detail with reference to FIG. 7. In FIG. 7, a current/present position of the vehicle 10 is represented by a vehicle position 10n. In this example, the driver of the vehicle 10 is about to (or intends to) make a right turn at an intersection. More specifically, the driver intends to move the vehicle 10 from the vehicle position 10n to a vehicle position 10p through a vehicle position 10o. The broken line Le4 represents a traveling path of the vehicle 10 intended by the driver.

The host vehicle predicted traveling path acquired when the vehicle 10 is at the vehicle position 10n is represented a broken line Lh5. The host vehicle predicted traveling path acquired when the vehicle 10 is at the vehicle position 10o is represented by a part of the broken line Lh5 that is upper (or is closer to the top of the paper) than the vehicle position 10o on the paper illustrating FIG. 7.

An other vehicle 64 shown in FIG. 7 is an other vehicle detected based on the frontward image (that is, a camera detected object whose object type is a "vehicle"). A position of the other vehicle 64 at the time point at which the vehicle 10 is at the vehicle position 10n is represented by an other vehicle position 64n. A position of the other vehicle 64 at the time point at which the vehicle 10 is at the vehicle position 10o is represented by an other vehicle position 64o.

The driver of the vehicle 10 starts operating (blinking) the right turn signal indicator 43R when the vehicle 10 reaches the vehicle position 10o. Thus, the condition (A1) becomes satisfied when the vehicle 10 reaches the vehicle position 10o.

Although a detailed description is omitted, at least in a period in which the vehicle 10 moves from the vehicle position 10n to the vehicle position 10o, the other vehicle 64 satisfies the condition for being an oncoming vehicle, and thus, the condition (A2) is satisfied. Whereas, the condition (A3) and the condition (A4) become satisfied after the vehicle 10 passes the vehicle position 10o. In other words, at the time point at which the vehicle 10 reaches the vehicle position 10o, neither the condition (A3) nor the condition (A4) is satisfied. In this example, at a some time point after the vehicle 10 reaches the vehicle position 10o, the condition (A3) and the condition (A4) become satisfied, and thus, the traveling path intersect alert condition becomes satisfied.

An other vehicle 65 shown in FIG. 7 is a camera detected object detected based on the frontward image. A position of the other vehicle 65 at the time point at which the vehicle 10 is at the vehicle position 10n is represented by an other vehicle position 65n. A position of the other vehicle 65 at the time point at which the vehicle 10 is at the vehicle position 10o is represented by an other vehicle position 65o.

A vehicle control ECU 22 (hereinafter, sometimes simply referred to as an "ECU 22") of the first modified apparatus determines that the other vehicle 65 is a preceding vehicle in the period in which the vehicle 10 moves from the vehicle position 10n to the vehicle position 10o, as described below in detail.

<<<Condition for Determining that an Object is a Preceding Vehicle (Condition for being a Preceding Vehicle)>>>

More specifically, a camera detected object that satisfies the above-described conditions (a) and (b), as well as conditions (f) and (g) described below is determined to be a preceding vehicle. In other words, it is determined that the preceding vehicle is present, when all of the conditions (a), (b), (f) and (g) are satisfied.

Condition (a): to be satisfied when a camera object is present and its type is a vehicle.
Condition (b): to be satisfied when the longitudinal position Dy of that camera detected object is positive (i.e., Dy>0).
Condition (f): to be satisfied when the longitudinal position Dy of that camera detected object is smaller than a predetermined distance Dy3 (i.e., Dy<Dy3).
Condition (g): to be satisfied when a left end position of that camera detected object is on the left side of the host vehicle predicted traveling path and a right end position of that camera detected object is on the right side of the host vehicle predicted traveling path.

The condition (a) is satisfied, because the other vehicle 65 is the camera detected object whose object type is a "vehicle". In the period in which the vehicle 10 moves from the vehicle position 10n to the vehicle position 10o, the other vehicle 65 is ahead of the vehicle 10, and thus, the longitudinal position Dy is positive so that the condition (b) is satisfied.

As understood from FIG. 7, the longitudinal position Dy of the other vehicle 65 is a distance Da at the time point at which vehicle 10 is at the vehicle position 10n. The distance Da is smaller than the distance Dy3 (i.e., Da<Dy3). Therefore, the condition (f) is satisfied.

At this time point (at which vehicle 10 is at the vehicle position 10n), the left end position of the other vehicle 65 is at a point Pe, and the right end position of the other vehicle 65 is at a point Pf. The point Pe (i.e., the left end position) is on the left side of the broken line Lh5 (i.e., the host vehicle predicted traveling path), and the point Pf (i.e., the right end position) is on the right side of the broken line Lh5. Therefore, the condition (g) is satisfied.

In this example, it is assumed that both of the condition (f) and the condition (g) are satisfied, in the period in which the vehicle 10 moves from the vehicle position 10n to the vehicle position 10o. Thus, all of the conditions (a), (b), (f), and (g) are satisfied in the period in which the vehicle 10 moves from the vehicle position 10n to the vehicle position 10o. Accordingly, in this period, the other vehicle satisfies the condition for being a preceding vehicle.

In addition, in the period in which the vehicle 10 moves from the vehicle position 10n to the vehicle position 10o, the object moving speed Vc of the vehicle 65 (i.e., the preceding vehicle) is higher than the second threshold speed Vth2, and thus, the condition (D) is satisfied.

For example, when a driver of the other vehicle 65 has not noticed the oncoming vehicle (i.e., the vehicle 64, in this example) and tries to make a right turn, the object moving speed Vc of the vehicle 65 may be higher than the second threshold speed Vth2. Alternatively, when the driver of the other vehicle 65 tries to complete making the right turn before the other vehicle 64 reaches the intersection, the object moving speed Vc of the vehicle 65 may become higher than the second threshold speed Vth2. In each of these cases, there is a possibility that the driver of the vehicle 10 mistakenly believes that the oncoming vehicle is not present and starts making a right turn following the other vehicle 65. In order to prevent these situations, the oncoming vehicle alert is performed when the conditions (A1) and the condition (A2) as well as the condition (D3) become satisfied.

Accordingly, under these situations, the third preceding alert condition becomes satisfied, when the right turn signal indicator 43R starts to be operated at the time point at which the vehicle 10 reaches the vehicle position 10o (i.e., when the condition (A1) becomes satisfied). In this manner, the third preceding alert condition becomes satisfied so that the oncoming vehicle alert is started at the time point at which the vehicle 10 reaches the vehicle position 10o, before the traveling path intersect alert condition becomes satisfied.

<Specific Operation of the First Modified Apparatus>

The CPU 31 (hereinafter, also simply referred to as the "CPU") of the ECU 22 executes an "oncoming vehicle alert determination routine" shown by a flowchart of FIG. 8 in place of the "oncoming vehicle alert determination routine" shown by the flowchart of FIG. 6, every time a predetermined time elapses. It should be noted that the step reference (step number) given to the step shown in FIG. 6 is given to a step in the following descriptions, when the step in the following descriptions is for executing the same process as the step shown in FIG. 6.

Figure 8:
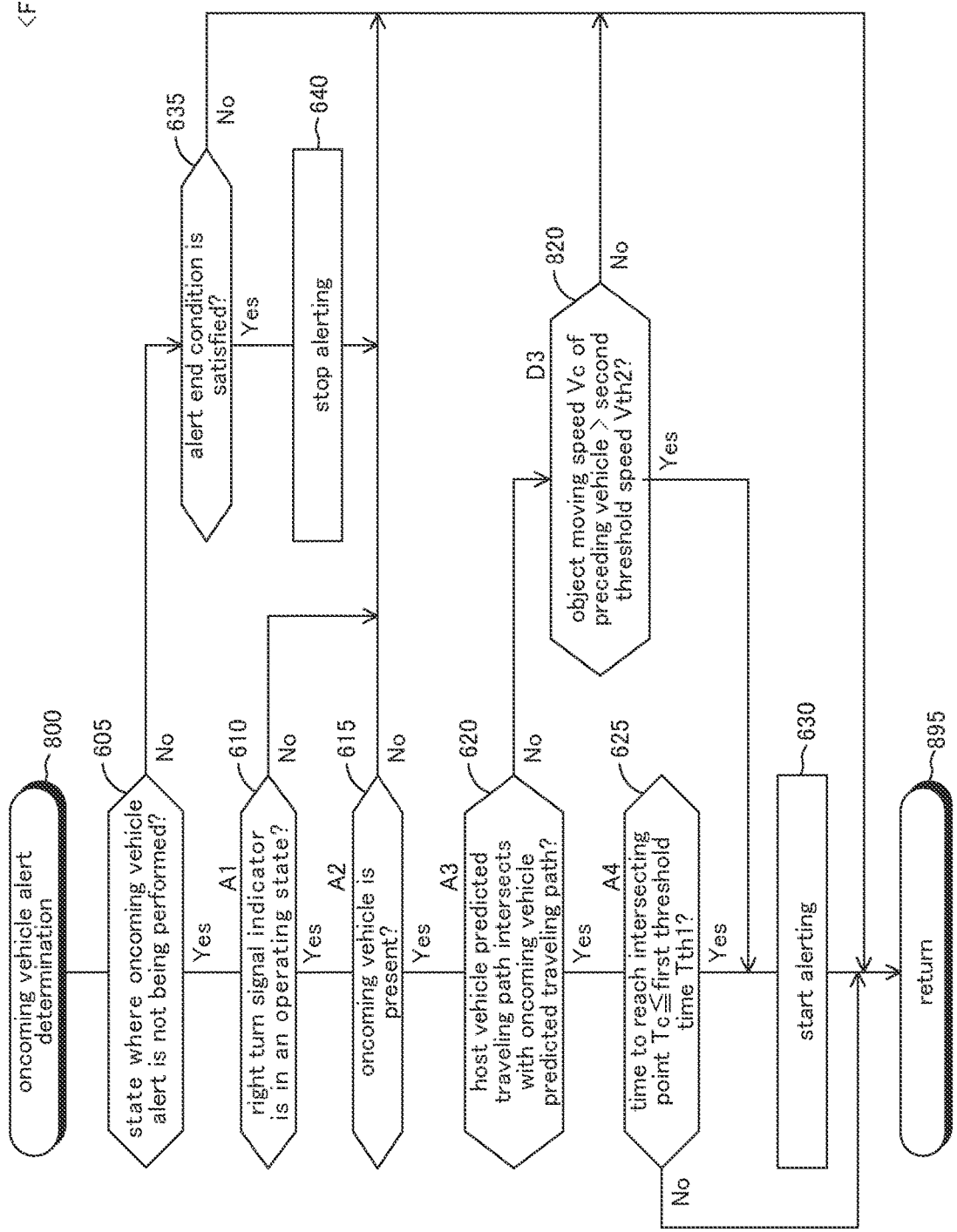
FIG. 8 is a flowchart showing an oncoming vehicle alert determination routine executed by the first modified apparatus.

When an appropriate time comes, the CPU starts processing from step 800 shown in FIG. 8, and executes processes of steps following step 605. If the CPU makes a "No" determination at step 620 (i.e., when the condition (A3) is not satisfied while the conditions (A1) and (A2) are satisfied), the CPU proceeds to step 820.

At step 820, the CPU determines whether or not a preceding vehicle is present, and whether or not the object moving speed Vc of the preceding vehicle is higher than the second threshold speed Vth2 (i.e., preceding vehicle turning threshold speed) if the preceding vehicle is determined to be present. Namely, at step 820, the CPU determines whether or not the condition (D3) is satisfied.

If the preceding vehicle is present and the object moving speed Vc of that preceding vehicle is higher than the second threshold speed Vth2 (namely, if the condition (D3) is satisfied), the CPU makes a "Yes" determination at step 820 and proceeds to step 630 so as to start the alert. In this case, it is said that the alert is executed because the third preceding alert condition is satisfied. Thereafter, the CPU proceeds to step 895 so as to terminate the present routine.

Whereas, when the preceding vehicle is not present or when the object moving speed Vc of the preceding vehicle is equal to or lower than the second threshold speed Vth2 (namely, if the condition (D3) is not satisfied even though the condition (A1) and the condition (A2) are both satisfied), the CPU makes a "No" determination at step 820 and directly proceeds to step 895.

As has been described above, the first modified apparatus determines whether to execute the oncoming vehicle alert based on (the state of) the preceding vehicle. Namely, the first modified apparatus can perform the oncoming vehicle alert at the time point at which the third preceding alert condition becomes satisfied even when the traveling path intersect alert condition has not become satisfied. Therefore, the first modified apparatus can starts executing the oncoming vehicle alert at an earlier time point, and also can avoid the unnecessary oncoming vehicle alert. It should be noted that the CPU 31 of the ECU 22 may be configured to determine whether or not the preceding vehicle has started turning to the right (turning to the specific direction) based on (history of) the frontward image, and be configured to determine that the condition (D3) becomes satisfied when the CPU 31 determines that the preceding vehicle has started turning to the right.

(Second Modified Example of the Present Alert Apparatus)

A second modified example (hereinafter, sometimes referred to as a "second modified apparatus") of the present alert apparatus will next be described. The above-described first modified apparatus starts performing the oncoming vehicle alert, when at least one of the traveling path intersect alert condition and the third preceding alert condition becomes satisfied. Whereas, the second modified apparatus starts performing the oncoming vehicle alert, when at least one of the traveling path intersect alert condition and a "fourth preceding alert condition" becomes satisfied. The main difference between the second modified apparatus and the present alert apparatus (or the second modified apparatus) will next be described.

<<The Fourth Preceding Alert Condition>>

The fourth preceding alert condition is a condition to be satisfied when the above-described conditions (A1) and (A2) are satisfied and a condition (E3) described below is satisfied. The preceding vehicle is the camera detected object that satisfies all of the above-described conditions (a), (b), (f) and (g).

Condition (A1): to be satisfied when the right turn signal indicator 43R is in the operating state (is blinking).

Condition (A2): to be satisfied when the oncoming vehicle is present.

Condition (E3): to be satisfied when the other vehicle that has been determined to be the preceding vehicle has started turning to the right. The condition (E3) is a condition to be satisfied when it is predicted/determined that the host vehicle (vehicle 10) is highly likely to start making a turn to the specific direction.

Figure 9:
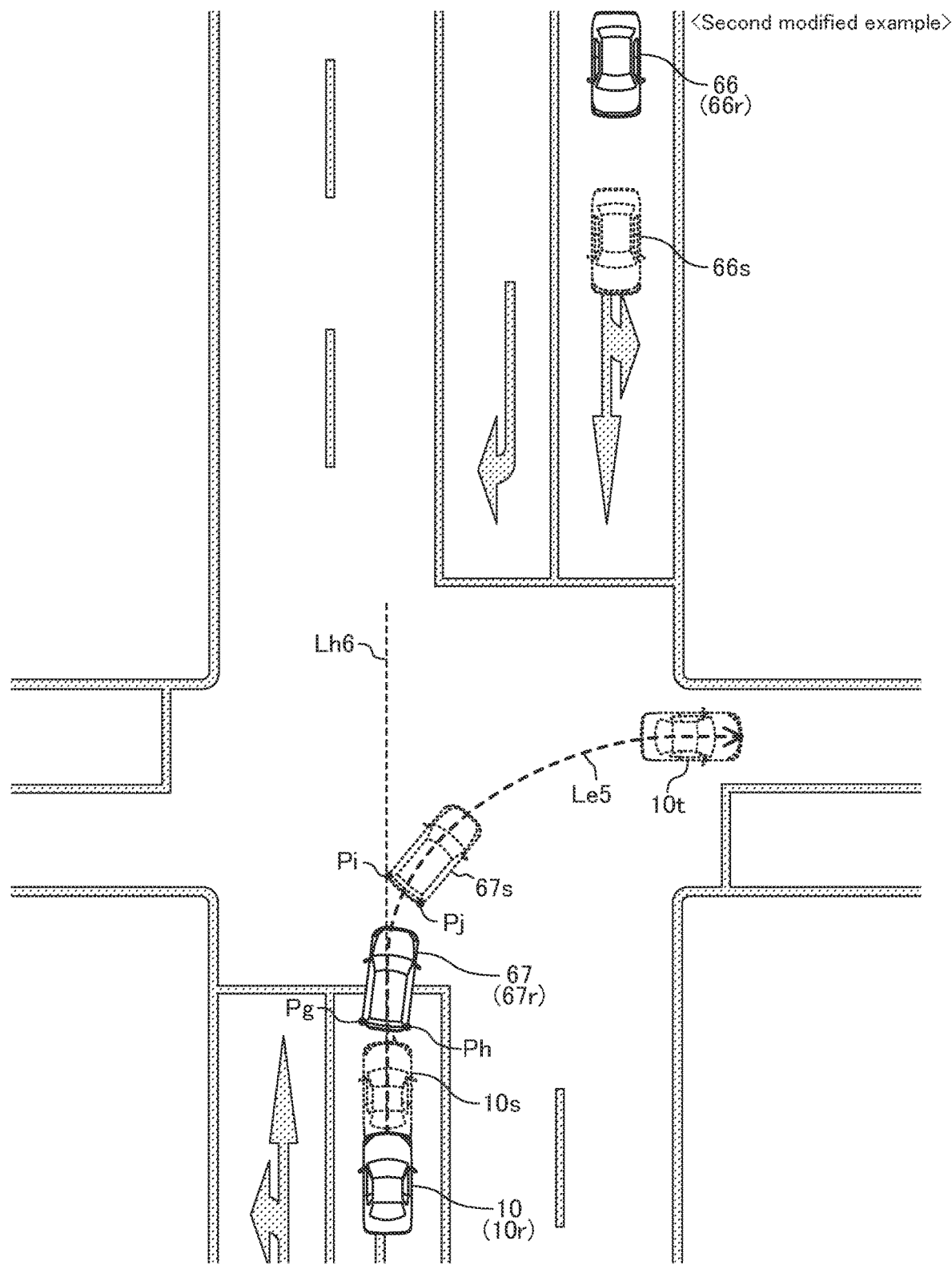
FIG. 9 is a plan view of an intersection in a case where an oncoming vehicle alert is performed/executed by an alert apparatus (second modified apparatus) according to a second modified example of the present alert apparatus, based on a fourth preceding alert condition.

The fourth preceding alert condition will next be described in detail with reference to FIG. 9. In FIG. 9, a current/present position of the vehicle 10 is represented by a vehicle position 10*r*. In this example, the driver of the vehicle 10 is about to (or intends to) make a right turn at an intersection. More specifically, the driver intends to move the vehicle 10 from the vehicle position 10*r* to a vehicle position 10*t* through a vehicle position 10*s*. The broken line Le5 represents a traveling path of the vehicle 10 intended by the driver.

The host vehicle predicted traveling path acquired when the vehicle 10 is at the vehicle position 10*r* is represented a broken line Lh6. The host vehicle predicted traveling path acquired when the vehicle 10 is at the vehicle position 10*s* is represented by a part of the broken line Lh6 that is upper (or is closer to the top of the paper) than the vehicle position 10*s* on the paper illustrating FIG. 9.

An other vehicle 66 shown in FIG. 9 is an other vehicle detected based on the frontward image (that is, a camera detected object whose object type is a "vehicle"). A position of the other vehicle 66 at the time point at which the vehicle 10 is at the vehicle position 10*r* is represented by an other vehicle position 66*r*. A position of the other vehicle 66 at the time point at which the vehicle 10 is at the vehicle position 10*s* is represented by an other vehicle position 66*s*.

The driver of the vehicle 10 starts operating (blinking) the right turn signal indicator 43R when the vehicle 10 reaches the vehicle position 10*r*. Thus, the condition (A1) becomes satisfied when the vehicle 10 reaches the vehicle position 10*r*.

Although a detailed description is omitted, at least in a period in which the vehicle 10 moves from the vehicle position 10*r* to the vehicle position 10*s*, the other vehicle 66 satisfies the condition for being an oncoming vehicle, and thus, the condition (A2) is satisfied. Whereas, the condition (A3) and the condition (A4) become satisfied after the vehicle 10 passes the vehicle position 10*s*. In other words, at the time point at which the vehicle 10 reaches the vehicle position 10*s*, neither the condition (A3) nor the condition (A4) is satisfied. In this example, at a some time point after the vehicle 10 reaches the vehicle position 10*s*, the condition (A3) and the condition (A4) become satisfied, and thus, the traveling path intersect alert condition becomes satisfied.

The condition (E3) will next be described in detail with reference to an other vehicle 67 shown FIG. 9. There is a possibility that a driver of the other vehicle (i.e., preceding vehicle) 67 makes a right turn without noticing the other vehicle (i.e., oncoming vehicle) 66. Alternatively, there is a possibility that the driver of the other vehicle 67 tries to complete making the right turn before the other vehicle 66 reaches the intersection. In each of these cases, there is a possibility that the driver of the vehicle 10 mistakenly believes that the oncoming vehicle (i.e., the other vehicle 66) is not present. In view of the above, the second modified apparatus starts executing the oncoming vehicle alert, when the condition (E3) becomes satisfied (i.e., when the preceding vehicle starts making the right turn) while the conditions (A1) and the condition (A2) are satisfied.

The other vehicle 67 is a camera detected object detected based on the frontward image. A position of the other vehicle 67 at the time point at which the vehicle 10 is at the vehicle position 10r is represented by an other vehicle position 67r. A position of the other vehicle 67 at the time point at which the vehicle 10 is at the vehicle position 10s is represented by an other vehicle position 67s.

Although a detailed description is omitted, in a period in which the vehicle 10 moves from the vehicle position 10r to the vehicle position 10s, the other vehicle 67 satisfies the conditions (a), (b), and (f).

At the time point at which the other vehicle 67 is at the other vehicle position 67r, a left end position of the other vehicle 67 is represented by a point Pg, and a right end position of the other vehicle 67 is represented by a point Ph. At the time point at which the other vehicle 67 is at the other vehicle position 67s, a left end position of the other vehicle 67 is represented by a point Pi, and a right end position of the other vehicle 67 is represented by a point Pj.

As understood from FIG. 9, at the time point at which the other vehicle 67 is at the other vehicle position 67r, the point Pg that is the left end position of the other vehicle 67 is on the left side of the broken line Lh6 (that is the host vehicle predicted traveling path of the vehicle 10 at the time point at which the vehicle 10 is at the vehicle position 10r), and the point Ph that is the right end position of the other vehicle 67 is on the right side of the broken line Lh6. Therefore, at the time point at which the vehicle 10 is at the vehicle position 10r, the condition (g) is satisfied, and thus, it is determined that the other vehicle 67 is the preceding vehicle.

Whereas, at the time point at which the other vehicle 67 is at the other vehicle position 67s, the point Pi that is the left end position of the other vehicle 67 and the point Pj that is the right end position of the other vehicle 67 are both on the right side of the broken line Lh6 (that is the host vehicle predicted traveling path of the vehicle 10 at the time point at which the vehicle 10 is at the vehicle position 10s). In other words, the other vehicle position 67s is a position of the other vehicle 67 immediately after a time point at which the left end position of the other vehicle 67 has changed from a position on the left side of the broken line Lh6 to a position on the right side of the broken line Lh6. In this manner, at the time point at which the vehicle 10 reaches the vehicle point 10s, the preceding vehicle (the other vehicle 67) has moved in an area that is on the right side of the host vehicle predicted traveling path of the vehicle 10 (the broken line Lh6) with respect to the vehicle 10. In other words, at this time point, the other vehicle that has been determined to be the preceding vehicle has started turning to the right, and thus, the condition (E3) becomes satisfied.

Accordingly, at the time point at which the vehicle 10 reaches the vehicle point 10s, the condition (E3) becomes satisfied in addition to the conditions (A1) and (A2), and therefore, the fourth preceding alert condition becomes satisfied before the traveling path intersect alert condition becomes satisfied.

<Specific Operation of the Second Modified Apparatus>

The CPU 31 (hereinafter, also simply referred to as the "CPU") of the vehicle control ECU 23 executes an "oncoming vehicle alert determination routine" shown by a flowchart of FIG. 10 in place of the "oncoming vehicle alert determination routine" shown by the flowchart of FIG. 6, every time a predetermined time elapses.

Figure 10:
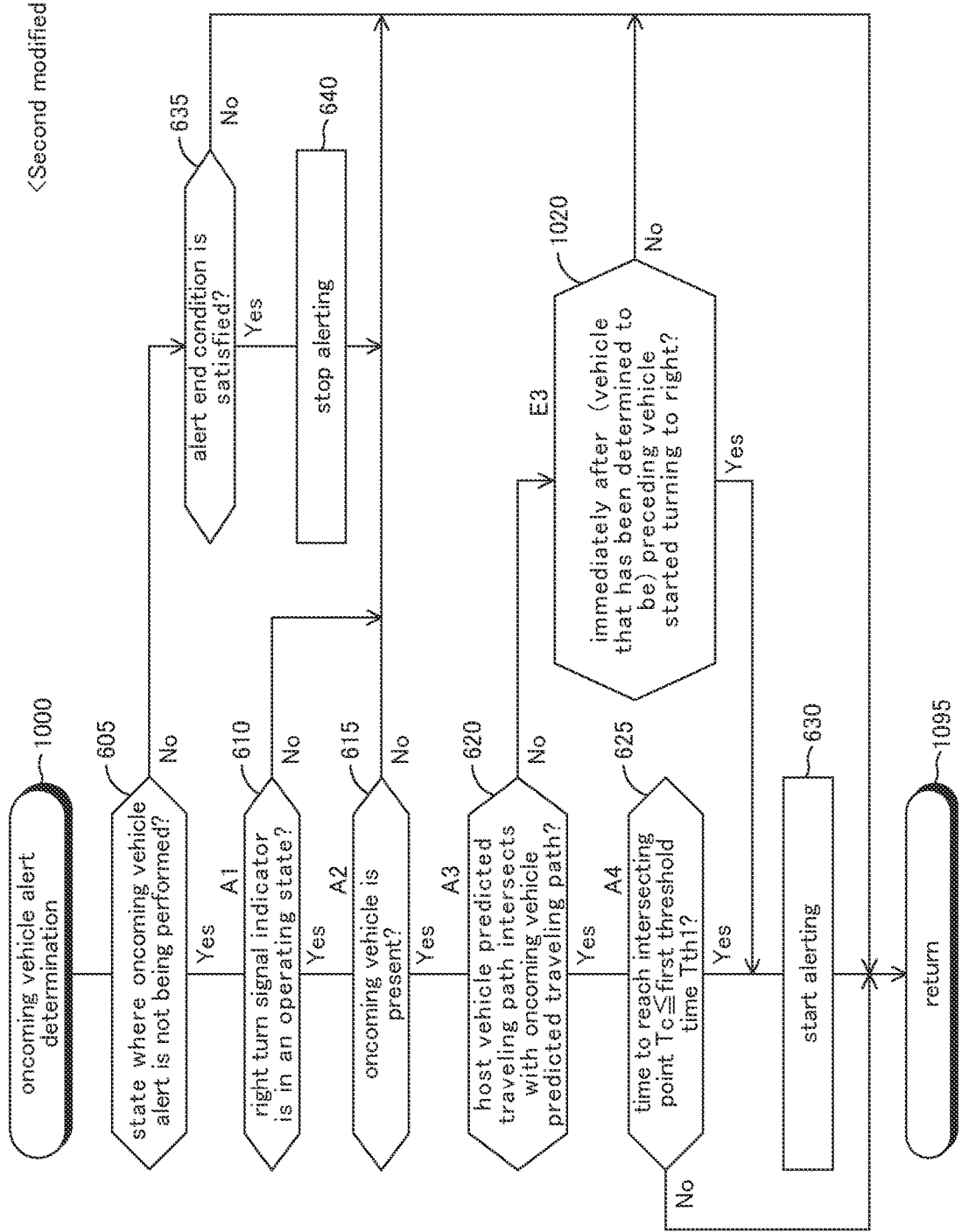
FIG. 10 is a flowchart showing an oncoming vehicle alert determination routine executed by the second modified apparatus.

Therefore, when an appropriate time comes, the CPU starts processing from step 1000 shown in FIG. 10, and executes processes of steps following step 605. If the CPU makes a "No" determination at step 620 (i.e., when the condition (A3) is not satisfied while the conditions (A1) and (A2) are satisfied), the CPU proceeds to step 1020.

At step 1020, the CPU determines whether or not it was (or had been) determined that a preceding vehicle was (or had been) present at a time point just before the present routine currently was started. In addition, if it was (or had been) determined that a preceding vehicle was (or had been) present at a time point just before the present routine currently was started, the CPU determines whether or not the CPU is executing the present routine for the first time immediately after the preceding vehicle started turning to the right. In other words, the CPU determines whether or not the CPU executes the present routine for the first time immediately after the condition (E3) became satisfied (namely, the CPU determines whether or not the condition (E3) is satisfied).

When the condition (E3) is satisfied, the CPU makes a "Yes" determination at step 1020 and proceeds to step 630 so as to start the alert. In this case, it is said that the alert is executed because the fourth preceding alert condition is satisfied. Thereafter, the CPU proceeds to step 1095 so as to terminate the present routine.

Whereas, when the preceding vehicle has not started making the right turn (i.e., when the condition (E3) is not satisfied), the CPU makes a "No" determination at step 1020 and directly proceeds to step 1095.

As has been described above, the second modified apparatus determines whether to execute the oncoming vehicle alert based on (the state of) the preceding vehicle. Accordingly, the second modified apparatus can perform the oncoming vehicle alert at the time point at which the fourth preceding alert condition becomes satisfied even when the traveling path intersect alert condition has not become satisfied.

Therefore, the second modified apparatus can starts executing the oncoming vehicle alert at an earlier time point, and also can avoid the unnecessary oncoming vehicle alert.

(Third Modified Example of the Present Alert Apparatus)

A third modified example (hereinafter, sometimes referred to as a "third modified apparatus") of the present alert apparatus starts performing the oncoming vehicle alert, when at least one of the traveling path intersect alert condition, a fifth preceding alert condition, and a sixth preceding alert condition becomes satisfied.

<<The Fifth Preceding Alert Condition>>

A fifth preceding alert condition is a condition to be satisfied when the above-described conditions (A1) and (A2) are satisfied and a condition (F3) described below is satisfied. In other words, the fifth preceding alert condition becomes satisfied, when all of the following conditions are satisfied.

Condition (A1): to be satisfied when the right turn signal indicator 43R is in the operating state (is blinking).

Condition (A2): to be satisfied when the oncoming vehicle is present.

Condition (F3): to be satisfied when the oncoming vehicle is traveling in the adjacent right hand lane. In other words, the condition (F3) is satisfied when the oncoming vehicle lane that is a lane in which the oncoming vehicle is running and the traveling lane in which the vehicle 10 is running are adjacent to each other. The condition (F3) is a condition to be satisfied when the driver of the host vehicle (vehicle 10) should be aware of the presence of the oncoming vehicle before the host vehicle starts turning to the specific direction.

<<The Sixth Preceding Alert Condition>>

The fourth preceding alert condition is a condition to be satisfied when the above-described conditions (A1) and (A2) are satisfied and a condition (F4) described below is satisfied. In other words, the sixth preceding alert condition becomes satisfied, when all of the following conditions are satisfied.

Condition (A1): to be satisfied when the right turn signal indicator 43R is in the operating state (is blinking).

Condition (A2): to be satisfied when the oncoming vehicle is present.

Condition (F4): to be satisfied when the magnitude (lateral distance |Dx|) of the lateral position Dx of the oncoming vehicle is smaller/shorter than a predetermined first threshold distance Dth1 (i.e., |Dx|<Dth1). The first threshold distance Dth1 has been set at a value larger (longer) than a typical width of the traveling lane by a small margin. The condition (F4) is also a condition to be satisfied when the driver of the host vehicle (vehicle 10) should be aware of the presence of the oncoming vehicle before the host vehicle starts turning to the specific direction.

Figure 11:
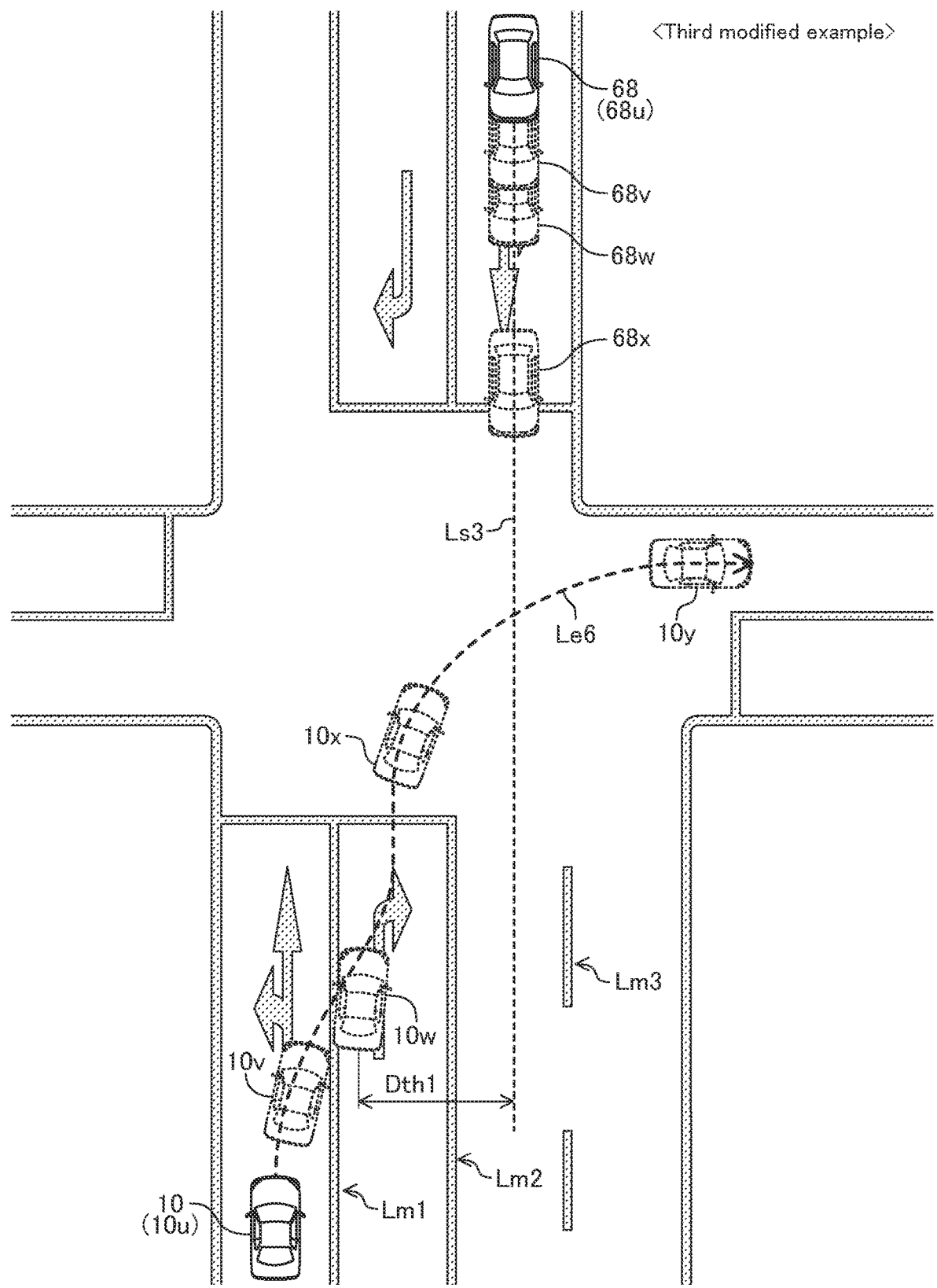
FIG. 11 is a plan view of an intersection in a case where an oncoming vehicle alert is performed/executed by an alert apparatus (third modified apparatus) according to a third modified example of the present alert apparatus, based on a fifth preceding alert condition or a sixth preceding alert condition.

The fifth preceding alert condition and the sixth preceding alert condition will next be described in detail with reference to FIG. 11. In FIG. 11, a current/present position of the vehicle 10 is represented by a vehicle position 10u. In this example, the driver of the vehicle 10 is about to (or intends to) change lanes from an original lane to a lane adjacent to the original lane in the right hand of the original lane, and thereafter, to make a right turn at an intersection. More specifically, the driver intends to move the vehicle 10 from the vehicle position 10u to a vehicle position 10y through vehicle positions 10v to 10x. The broken line Le6 represents a traveling path of the vehicle 10 intended by the driver.

The other vehicle 68 shown in FIG. 11 is an other vehicle detected based on the frontward image (that is, a camera detected object whose object type is a "vehicle"). A position of the other vehicle 68 at the time point at which the vehicle 10 is at the vehicle position 10u is represented by an other vehicle position 68u. A position of the other vehicle 68 at the time point at which the vehicle 10 is at the vehicle position 10w is represented by an other vehicle position 68w. A position of the other vehicle 68 at the time point at which the vehicle 10 is at the vehicle position 10x is represented by an other vehicle position 68x.

The oncoming vehicle predicted traveling path predicted when the other vehicle 68 is at the other vehicle position 68u is represented by a broken line Ls3. In the present example, the other vehicle 68 is running straight.

The driver of the vehicle 10 starts operating (blinking) the right turn signal indicator 43R when the vehicle 10 reaches the vehicle position 10u. Thus, the condition (A1) becomes satisfied when the vehicle 10 reaches the vehicle position 10u.

Although a detailed description is omitted, at least in a period in which the vehicle 10 moves from the vehicle position 10u to the vehicle position 10x, the other vehicle 68 satisfies the condition for being an oncoming vehicle (namely, the conditions (a) to (e)), and thus, the condition (A2) is satisfied. In addition, at a time point after the vehicle 10 reaches the vehicle position 10x, the condition (A3) and the condition (A4) become satisfied, and thus, the traveling path intersect alert condition becomes satisfied.

Next, descriptions will be given as to whether or not the fifth preceding alert condition is satisfied. The vehicle control ECU 24 of the third modified apparatus determines that the condition (F3) is satisfied when it determines that the condition (A2) is satisfied (i.e., the oncoming vehicle is present) and that an in-between lane described later is not present. In other words, the ECU 24 determines that the oncoming vehicle is traveling in the adjacent right hand lane, when the ECU 24 determines that the oncoming vehicle is present and the in-between lane is not present.

The in-between lane is a lane (another lane) located between the oncoming lane in which the oncoming vehicle is running/traveling and the traveling lane in which the vehicle 10 is running/traveling. The ECU 24 determines that the in-between lane is present, when both of a condition (x1) below and a condition (x2) below are satisfied.

Condition (x1): to be satisfied when both of the right hand demarcation line and the adjacent right hand demarcation line have been detected.

Condition (x2): to be satisfied when the oncoming vehicle predicted traveling path (i.e., the broken line Ls3, in the example shown in FIG. 11) is on the right side of the adjacent right hand demarcation line with respect to the vehicle 10.

In the example shown in FIG. 11, when the vehicle 10 is at the vehicle position 10u, a demarcation line Lm1 is detected as the right hand demarcation line and a demarcation line Lm2 is detected as the adjacent right hand demarcation line, and thus, a lane defined by the demarcation line Lm1 and the demarcation line Lm2 is present. In addition, the oncoming vehicle predicted traveling path (i.e., the broken line Ls3) is on the right side of the adjacent right hand demarcation line (i.e., the demarcation line Lm2) with respect to the vehicle 10. Accordingly, in this case, since the condition (x1) and the condition (x2) are both satisfied, and thus, the ECU 24 determines that the in-between lane is present. Therefore, the ECU 24 determines that the condition (F3) is not satisfied at this time point.

Thereafter, when the vehicle 10 reaches the vehicle position 10v, the demarcation line Lm2 is detected as the right hand demarcation line and a demarcation line Lm3 is detected as the adjacent right hand demarcation line. In this case, the broken line Ls3 (i.e., the oncoming vehicle predicted traveling path) is on the left side of the demarcation line Lm3 with respect to the vehicle 10. Therefore, since the in-between lane is not present (in other words, the other vehicle 68 is running/traveling in the adjacent right hand lane), the ECU 24 determines that the condition (F3) is satisfied. As a result, the ECU 24 determines that the fifth preceding alert condition is satisfied.

Next, descriptions will be given as to whether or not the sixth preceding alert condition is satisfied. When the vehicle 10 is at the vehicle position 10u, the other vehicle 68 is at the other vehicle position 68u, and the magnitude |Dx| of the lateral position Dx of the other vehicle 68 is greater than the first threshold distance Dth1. Thus, at this time point, the condition (F4) is not satisfied.

Thereafter, in a period in which the vehicle 10 is changing lanes from the traveling (original) lane to a lane (i.e., the lane defined by the demarcation lines Lm1 and Lm2) that is adjacent to the traveling lane in the right hand, the magnitude |Dx| of the lateral position Dx of the other vehicle 68 becomes smaller. Then, when the vehicle 10 reaches the vehicle position 10w, the magnitude |Dx| of the lateral position Dx of the other vehicle 68 is smaller than the first threshold distance Dth1. Therefore, when the vehicle 10 reaches the vehicle position 10w, the sixth preceding alert condition becomes satisfied since the condition (F4) becomes satisfied.

<Specific Operation of the Third Modified Apparatus>

The CPU 31 (hereinafter, also simply referred to as the "CPU") of the vehicle control ECU 24 of the third modified apparatus executes an "oncoming vehicle alert determination routine" shown by a flowchart of FIG. 12 in place of the "oncoming vehicle alert determination routine" shown by the flowchart of FIG. 6, every time a predetermined time elapses.

Figure 12:
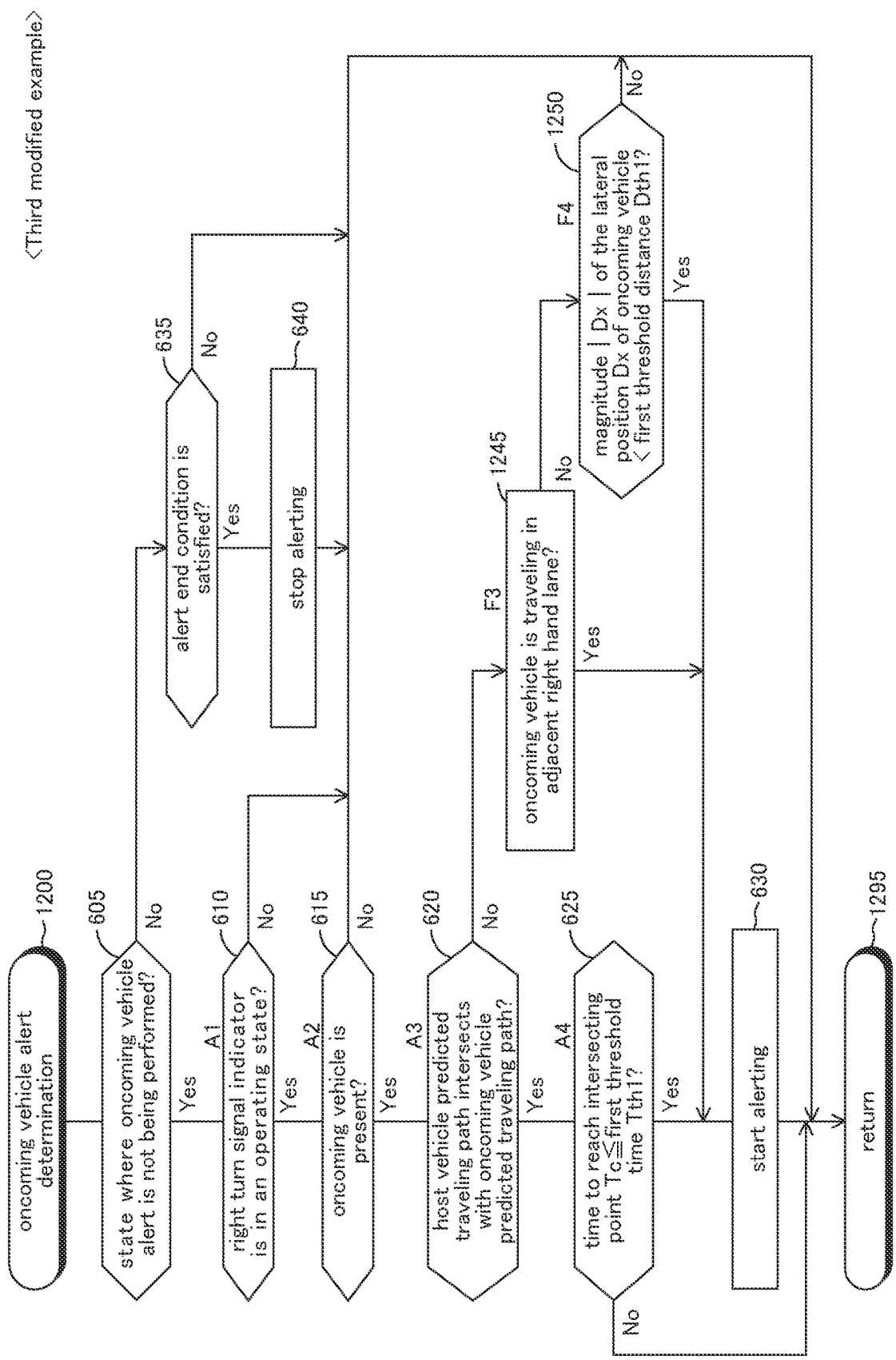
FIG. 12 is a flowchart showing an oncoming vehicle alert determination routine executed by the third modified apparatus.

Therefore, when an appropriate time comes, the CPU starts processing from step 1200 shown in FIG. 12, and executes processes of steps following step 605. If the CPU makes a "No" determination at step 620 (i.e., when the condition (A3) is not satisfied while the conditions (A1) and (A2) are satisfied), the CPU proceeds to step 1245.

At step 1245, the CPU determines whether or not the oncoming vehicle is traveling in the adjacent right hand lane. Namely, the CPU determines whether or not the condition (F3) is satisfied.

When the oncoming vehicle is traveling in the adjacent right hand lane (namely, when the condition (F3) is satisfied), the CPU makes a "Yes" determination at step 1245 and proceeds to step 630 so as to start the alert.

Whereas, when the oncoming vehicle is not traveling in the adjacent right hand lane (namely, when the condition (F3) is not satisfied), the CPU makes a "No" determination at step 1245 and proceeds to step 1250. At step 1250, the CPU determines whether or not the lateral distance |Dx| that is the magnitude of the lateral position Dx of the oncoming vehicle is smaller/shorter than the first threshold distance Dth1. Namely, the CPU determines whether or not the condition (F4) is satisfied.

When the lateral distance |Dx| that is the magnitude of the lateral position Dx of the oncoming vehicle is smaller/shorter than the first threshold distance Dth1 (namely, when the condition (F4) is satisfied), the CPU makes a "Yes" determination at step 1250 and proceeds to step 630. Whereas, when the lateral distance |Dx| is equal to or greater/longer than the first threshold distance Dth1 (namely, when the condition (F4) is not satisfied), the CPU makes a "No" determination at step 1250 and directly proceeds to step 1295 to terminate the present routine.

As has been described above, the third modified apparatus can start executing the oncoming vehicle alert when the oncoming vehicle is traveling in the adjacent right hand lane. Therefore, the third modified apparatus can starts performing the oncoming vehicle alert at an appropriate time point.

(Fourth Modified Example of the Present Alert Apparatus)

A fourth modified example (hereinafter, sometimes referred to as a "fourth modified apparatus") starts performing the oncoming vehicle alert, when at least one of the traveling path intersect alert condition and a seventh preceding alert condition becomes satisfied.

<<The Seventh Preceding Alert Condition>>

The seventh preceding alert condition is a condition to be satisfied when the "above-described conditions (A1), (A2) and (B3a)" and a condition (G4) described below are all satisfied. In other words, the seventh preceding alert condition becomes satisfied, when the above-described first preceding alert condition is satisfied, and further, the condition (G4) is satisfied. Namely, the seventh preceding alert condition becomes satisfied when all of the following conditions are satisfied.

Condition (A1): to be satisfied when the right turn signal indicator 43R is in the operating state (is blinking).

Condition (A2): to be satisfied when the oncoming vehicle is present.

Condition (B3a): to be satisfied when the right hand demarcation line is not included in the "host vehicle right turn passing area" of the vehicle 10.

Condition (G4): to be satisfied when a crossing-vehicle (cutting-across vehicle) described later is not present.

Figure 13:
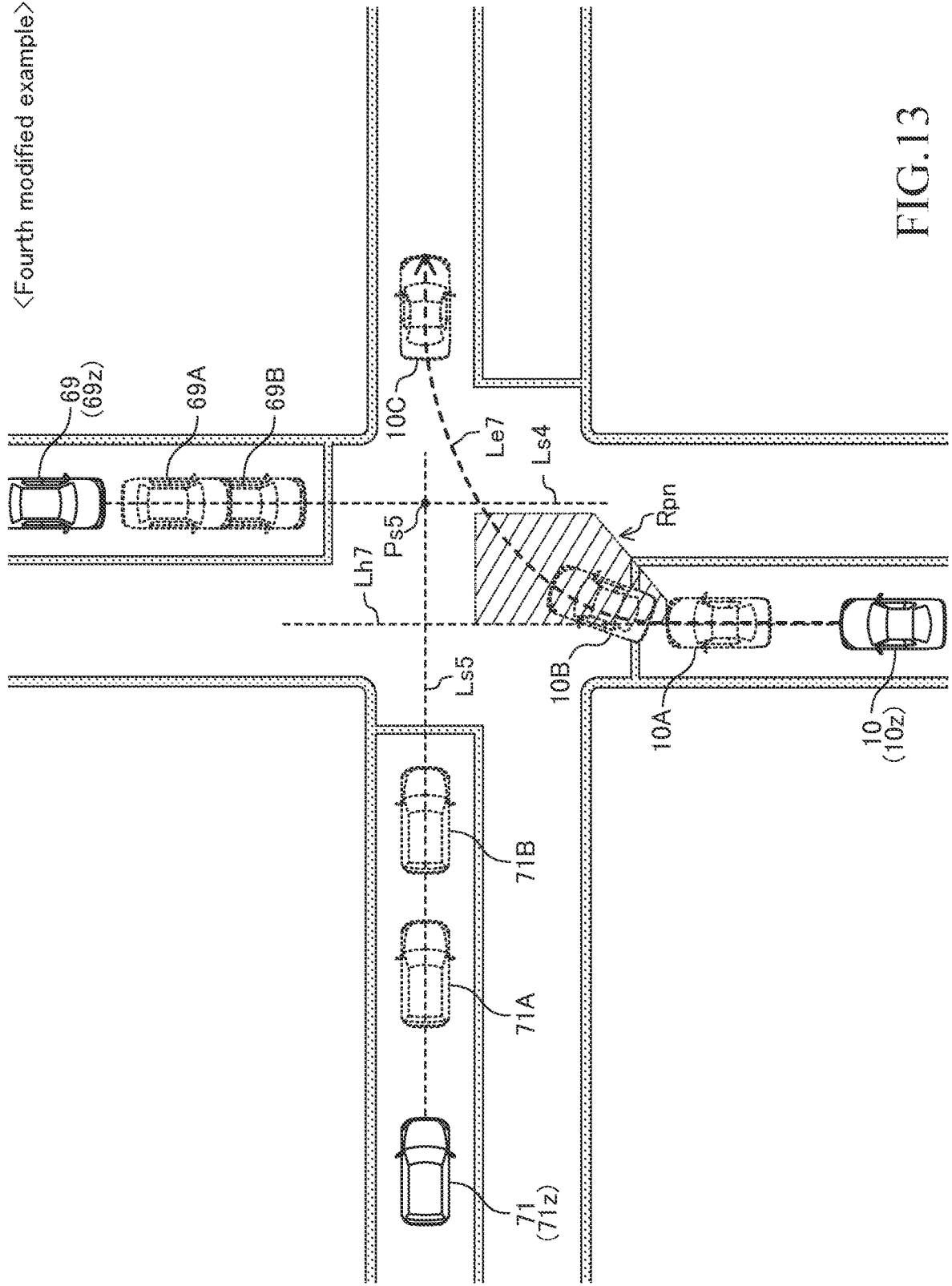
FIG. 13 is a plan view of an intersection in a case where an oncoming vehicle alert is performed/executed by an alert apparatus (fourth modified apparatus) according to a fourth modified example of the present alert apparatus, based on a seventh preceding alert condition.

The seventh preceding alert condition will next be described in detail with reference to FIG. 13. In FIG. 13, a current/present position of the vehicle 10 is represented by a vehicle position 10z. In this example, the driver of the vehicle 10 is about to (or intends to) make a right turn at an intersection. More specifically, the driver intends to move the vehicle 10 from the vehicle position 10z to a vehicle position 10C through a vehicle position 10A and a vehicle position 10B. The broken line Le7 represents a traveling path of the vehicle 10 intended by the driver.

An other vehicle 69 shown in FIG. 13 is an other vehicle detected based on the frontward image (that is, a camera detected object whose object type is a "vehicle"). A position of the other vehicle 69 at the time point at which the vehicle 10 is at the vehicle position 10z is represented by an other vehicle position 69z. A position of the other vehicle 69 at the time point at which the vehicle 10 is at the vehicle position 10A is represented by an other vehicle position 69A. A position of the other vehicle 69 at the time point at which the vehicle 10 is at the vehicle position 10B is represented by an other vehicle position 69B.

The oncoming vehicle predicted traveling path predicted when the other vehicle 69 is at the other vehicle position 69z is represented by a broken line Ls4. In the present example, the other vehicle 69 is running straight.

The driver of the vehicle 10 starts operating (blinking) the right turn signal indicator 43R when the vehicle 10 reaches the vehicle position 10z. Thus, the condition (A1) becomes satisfied when the vehicle 10 reaches the vehicle position 10z.

Although a detailed description is omitted, at least in a period in which the vehicle 10 moves from the vehicle position 10z to the vehicle position 10B, the other vehicle 69 satisfies the condition for being an oncoming vehicle (namely, the conditions (a) to (e)), and thus, the condition (A2) is satisfied. Whereas, the condition (A3) and the condition (A4) become satisfied after the vehicle 10 passes the vehicle position 10A. In other words, at the time point at which the vehicle 10 reaches the vehicle position 10A, neither the condition (A3) nor the condition (A4) is satisfied. In this example, in a period in which the vehicle 10 is moving from the vehicle position 10A to the vehicle position 10B, the condition (A3) and the condition (A4) become satisfied, and thus, the traveling path intersect alert condition becomes satisfied.

When and after the vehicle 10 reaches the vehicle position 10A, a right hand demarcation line is no longer included in an area Rpn that is the host vehicle right turn passing area of the vehicle 10. Therefore, the condition (B3a) becomes satisfied at the time point at which the vehicle 10 reaches the vehicle position 10A.

An other vehicle 71 shown in FIG. 13 is an other vehicle detected based on the frontward image (that is, a camera detected object whose object type is a "vehicle"). A position of the other vehicle 71 at the time point at which the vehicle 10 is at the vehicle position 10z is represented by an other vehicle position 71z. A position of the other vehicle 71 at the time point at which the vehicle 10 is at the vehicle position 10A is represented by an other vehicle position 71A. A position of the other vehicle 71 at the time point at which the vehicle 10 is at the vehicle position 10B is represented by an other vehicle position 71B.

A vehicle control ECU 25 (hereinafter, sometimes simply referred to as an "ECU 25") of the fourth modified apparatus determines that the other vehicle 71 is the crossing-vehicle at least in a period in which the vehicle 10 moves from the vehicle position 10z to the vehicle position 10B.

More specifically, the crossing-vehicle is defined as a camera detected object that satisfies the above-described condition (a) as well as the following conditions (h), and (i). In other words, when all of the "conditions (a), (h), and (i)" described below are satisfied, the ECU 25 determines that the crossing-vehicle is present, and thus, determines that the condition (G4) is not satisfied. It should be noted that a condition satisfied when the crossing-vehicle is present may sometimes be referred to as a "prohibition condition".

Condition (a): to be satisfied when a camera object is present and its type is a vehicle.

Condition (h): to be satisfied when the camera object that causes the condition (a) to be satisfied is an object (other vehicle) that is different than the oncoming vehicle, and a "crossing-vehicle predicted traveling path of that camera object different than the oncoming vehicle" and the "oncoming vehicle predicted traveling path of the oncoming vehicle" intersect with each other.

Condition (i): to be satisfied when an intersecting time Tr described later is equal to or smaller/shorter than a second threshold time Tth2 (i.e., Tr≤Tth2).

The other vehicle 71 is the camera detected object whose object type is a "vehicle", and thus, the condition (a) is satisfied. The condition (h) will next be described in detail. The crossing-vehicle predicted traveling path is a predicted traveling path of that camera object (i.e., the other vehicle 71). The crossing-vehicle predicted traveling path is predicted/obtained based on "the position (i.e., the lateral position Dx and the longitudinal position Dy) and the speed (i.e., the relative lateral speed Vx and the relative longitudinal speed Vy)" of that camera detected object under the assumption that the speed of that camera detected object remains unchanged.

In FIG. 13, the crossing-vehicle predicted traveling path predicted when the other vehicle 71 is at the other vehicle position 71z is represented by a broken line Ls5. In the present example, the other vehicle 71 is running straight. Therefore, the crossing-vehicle predicted traveling path predicted when the other vehicle 71 is at the other vehicle position 71A is represented by a part of the broken line Ls5 that is on the right side of the other vehicle position 71A on the paper illustrating FIG. 13. Similarly, the crossing-vehicle predicted traveling path predicted when the other vehicle 71 is at the other vehicle position 71B is represented by a part of the broken line Ls5 that is on the right side of the other vehicle position 71B on the paper illustrating FIG. 13.

As understood from FIG. 13, the broken line Ls4 and the broken line Ls5 intersect with each other at a point Ps5. In other words, at least in a period in which the vehicle 10 is running from the vehicle position 10z to the vehicle position 10B, the crossing-vehicle predicted traveling path of the other vehicle 71 and the oncoming vehicle predicted traveling path of the other vehicle 61 intersect with each other. Therefore, in this period, the condition (h) is satisfied.

Next, the condition (i) will be described in detail. The intersecting time Tr is a time length from a present time point to a time point when the camera detected object having the crossing-vehicle predicted traveling path as its predicted traveling path reaches (intersects with) the oncoming vehicle predicted traveling path. The intersecting time Tr obtained when the vehicle 10 is at the vehicle position 10z is equal to a time length required for the other vehicle 71 to move (run/travel) from the other vehicle position 71z to the point Ps5. In the present example shown in FIG. 13, The intersecting time Tr obtained when the vehicle 10 is at the vehicle position 10z coincides with the second threshold time Tth2. Therefore, at least in the period in which the vehicle 10 is running from the vehicle position 10z to the vehicle position 10B, the condition (i) is satisfied.

In this manner, at least in the period in which the vehicle 10 is running from the vehicle position 10z to the vehicle position 10B, the other vehicle 71 satisfies the condition for being a crossing-vehicle (i.e., all of the conditions (a), (h), and (i)), and thus, the condition (G4) is not satisfied. Accordingly, in this period, the seventh preceding alert condition is not satisfied. Consequently, the ECU 25 starts performing the alert when the vehicle 10 reaches the vehicle position 10B (i.e., when the traveling path intersect alert condition becomes satisfied).

<Specific Operation of the Fourth Modified Apparatus>

The CPU 31 (hereinafter, also simply referred to as the "CPU") of the ECU 25 of the fourth modified apparatus executes an "oncoming vehicle alert determination routine" shown by a flowchart of FIG. 14 in place of the "oncoming vehicle alert determination routine" shown by the flowchart of FIG. 6, every time a predetermined time elapses.

Figure 14:
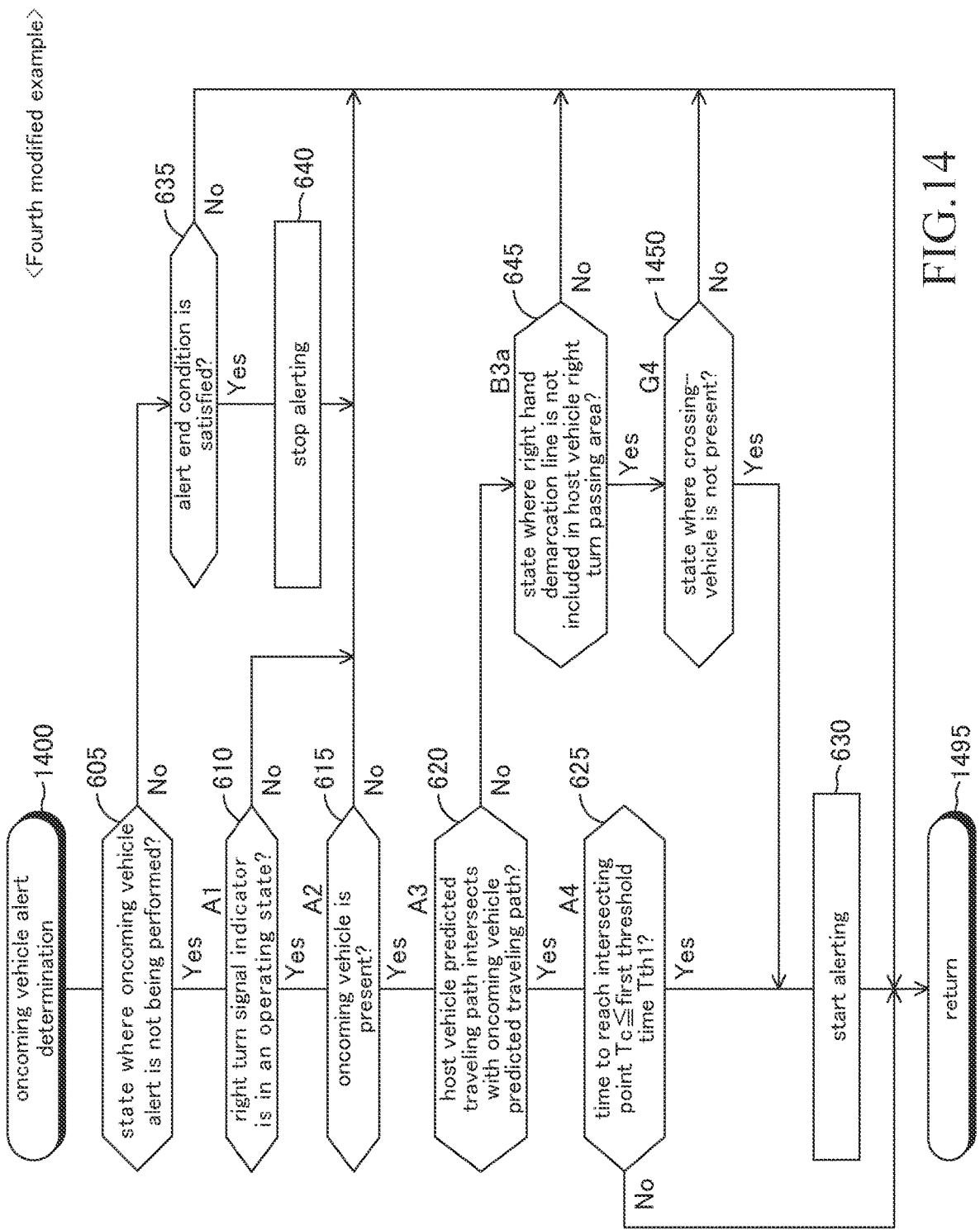
FIG. 14 is a flowchart showing an oncoming vehicle alert determination routine executed by the fourth modified apparatus.

Therefore, when an appropriate time comes, the CPU starts processing from step 1400 shown in FIG. 14, and executes processes of steps following step 605. If the CPU makes a "No" determination at step 620 (i.e., when the condition (A3) is not satisfied while the conditions (A1) and (A2) are satisfied), the CPU proceeds to step 645.

When the CPU makes a "Yes" determination at step 645 (i.e., when the condition (B3a) is satisfied), the CPU proceed to step 1450 so as to determine whether or not a present state is a state in which the crossing-vehicle is not present. Namely, at step 1450, the CPU determines whether or not the condition (G4) is satisfied.

If the present state is the state in which the crossing-vehicle is not present (i.e., if the condition (G4) is satisfied), the CPU makes a "Yes" determination at step 1450, and proceeds to step 630 so as to perform the alert since the seventh preceding alert condition is satisfied.

Whereas, if the present state is the state in which the crossing-vehicle is present, the CPU makes a "No" determination at step 1450, and proceeds to step 1495 so as to terminate the present routine.

It should be noted that, when the condition used at step 645 is not satisfied (i.e. when the condition (B3a) is not satisfied), the CPU makes a "No" determination at step 645, and directly proceeds to step 1495.

As has been described above, the fourth modified apparatus determines whether or not the prohibition condition is satisfied based on whether or not the crossing-vehicle is present. Therefore, the fourth modified apparatus can avoid the unnecessary oncoming vehicle alert.

(Fifth Modified Example of the Present Alert Apparatus)

A fifth modified example (hereinafter, sometimes referred to as a "fifth modified apparatus") performs the oncoming vehicle alert, when at least one of the traveling path intersect alert condition and the first preceding alert condition.

When the first preceding alert condition becomes satisfied, a vehicle control ECU 26 of the fifth modified apparatus executes, as the oncoming vehicle alert, both of a first alert (process) described below and a second alert (process) described below, if a "stopped state history (record)" regarding the oncoming vehicle is not present (or has not been retained/held).

Whereas, when the first preceding alert condition becomes satisfied, the vehicle control ECU 26 of the fifth modified apparatus executes, as the oncoming vehicle alert, only of the second alert, if the "stopped state history" regarding the oncoming vehicle is present (or has been retained/held).

The first alert is an alert that is executed using the display 46, without using the speaker 47. The second alert is an alert that is executed using the speaker 47, without using the display 46. The process for performing both of the first alert and the second alert is the same as the process performed by the above-described ECU 21. In other words, it can be said that the above-described ECU 21 is configured to execute both of the first alert and the second alert, when at least one of the traveling path intersect alert condition, the first preceding alert condition, and the second preceding alert condition.

As described above, when the first preceding alert condition becomes satisfied, the ECU 26 executes the second alert using the speaker 47 without using the display 46, if the "stopped state history" regarding the oncoming vehicle is present. Whereas, when the first preceding alert condition becomes satisfied, the ECU 26 executes the first alert and the second alert, using both of the speaker 47 and the display 46, if the "stopped state history" regarding the oncoming vehicle is not present.

The stopped state history will next be described in detail. The ECU 26 determines that the oncoming vehicle has stopped (or stopped moving), when the object moving speed Vc of that oncoming vehicle is equal to or lower than a predetermined third threshold speed Vth3 while the longitudinal position Dy of that oncoming vehicle is smaller than a predetermined threshold distance Dth2. In the fifth modified example, the third threshold speed Vth3 is set at zero ("0"). When the ECU 26 determines that the oncoming vehicle has stopped, the ECU 25 retains/holds the stopped state history indicating that that oncoming vehicle has stopped from the time point at which the ECU 26 determines that the oncoming vehicle has stopped.

Figure 15:
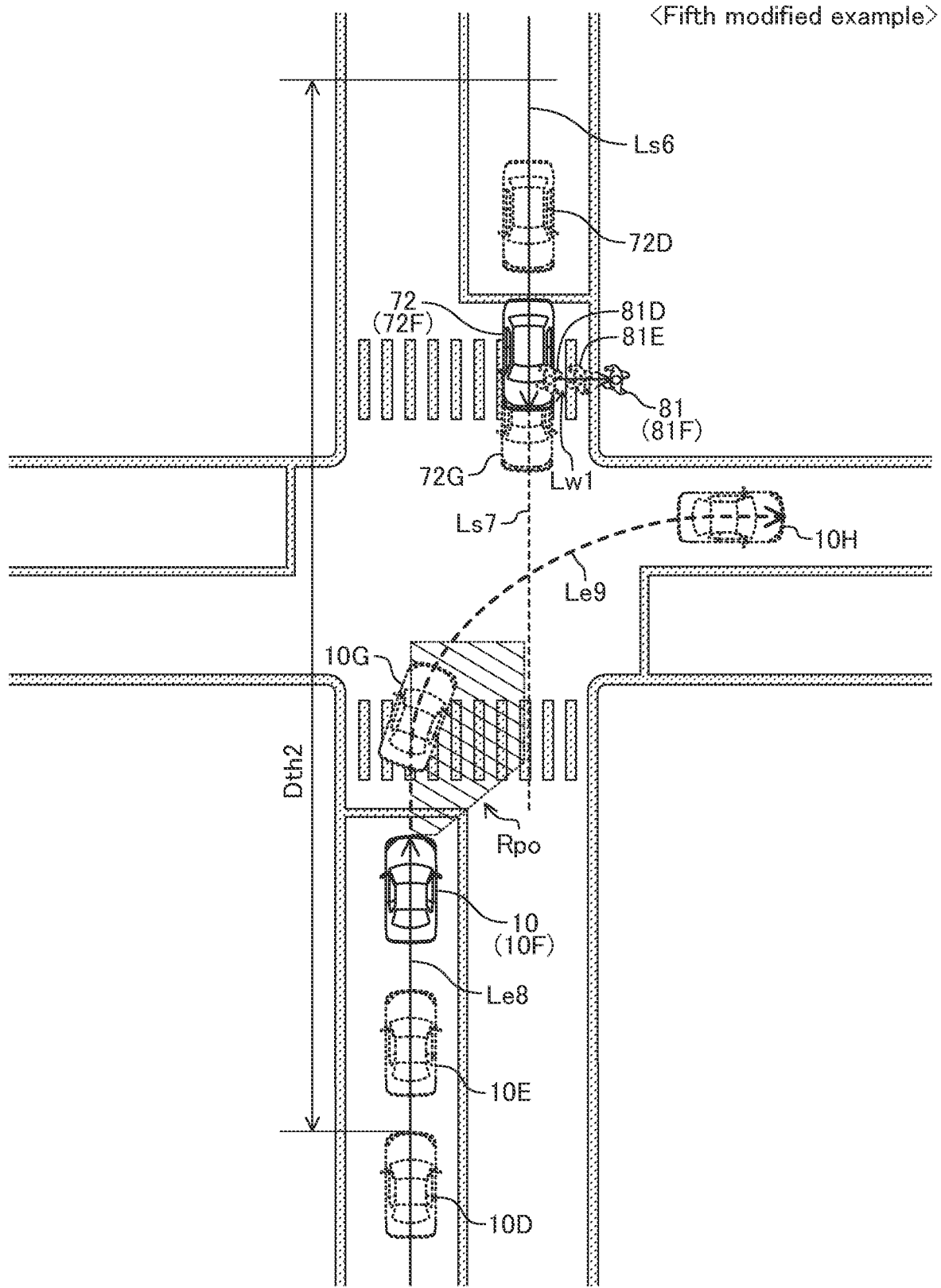
FIG. 15 is a plan view of an intersection in a case where an oncoming vehicle alert is performed/executed by an alert apparatus (fifth modified apparatus) according to a fifth modified example of the present alert apparatus, based on a stopped state history (record) regarding an oncoming vehicle.

An example of the oncoming vehicle that causes the ECU 26 to retain the stopped state history will next be described with reference to FIG. 15. In FIG. 15, a current/present position of the vehicle 10 is represented by a vehicle position 10F. The vehicle 10 has reached the vehicle position 10F through vehicle positions 10D and 10E. A solid line Le8 indicates a path along which the vehicle 10 has already traveled.

The driver of the vehicle 10 started operating (blinking) the right turn signal indicator 43R when the vehicle 10 reached the vehicle position 10E. Thus, the condition (A1) became satisfied when the vehicle 10 reached the vehicle position 10E. Therefore, the condition (A1) has been satisfied since the vehicle 10 reached the vehicle position 10E.

In this example, the driver of the vehicle 10 is about to (or intends to) make a right turn at an intersection with no traffic light. More specifically, the driver intends to move the vehicle 10 from the vehicle position 10F to a vehicle position 10H through a vehicle position 10G. The broken line Le9 represents a traveling path of the vehicle 10 intended by the driver.

A pedestrian 81 shown in FIG. 15 has just completed crossing a road through a crosswalk. A current/present position of the pedestrian 81 is represented by a pedestrian position 81F. A position of the pedestrian 81 at a time point at which the vehicle 10 is at the vehicle position 10D is represented by a pedestrian position 81D. A position of the pedestrian 81 at a time point at which the vehicle 10 is at the vehicle position 10E is represented by a pedestrian position 81E. A solid line Lw1 represents a path along which the pedestrian 81 has already walked.

An other vehicle 72 shown in FIG. 15 is an other vehicle detected based on the frontward image (that is, a camera detected object whose object type is a "vehicle"), and is recognized/determined as an oncoming vehicle. A position of the other vehicle 72 in a period in which the vehicle 10 travels/moves from the vehicle position 10D to the vehicle position 10E is represented by an other vehicle position 72D. More specifically, in the period in which the vehicle 10 traveled from the vehicle position 10D to the vehicle position 10E, the other vehicle 72 continued stopping (or did not move) at the other vehicle position 72D because the pedestrian 81 was waking on the crosswalk that was in front of the other vehicle 72.

After the pedestrian 81 completed crossing the road, the other vehicle 72 resumed running/moving. A position of the other vehicle 72 at the time point at which the vehicle 10 is at the vehicle position 10F is represented by an other vehicle position 72F. A solid line Ls6 represents a path along which the other vehicle 72 has already traveled/moved.

A position of the other vehicle 72 at the time point at which the vehicle 10 is at the vehicle position 10G is represented by an other vehicle position 72G. An oncoming vehicle predicted traveling path predicted when the other vehicle 72 is at the other vehicle position 72F is represented by a broken line Ls7. In the present example, the other vehicle 72 is moving straight. Therefore, the oncoming vehicle predicted traveling path predicted when the other vehicle 72 is at the other vehicle position 72G is represented by a part of the broken line Ls7 that is lower (or is closer to the bottom of the paper) than the other vehicle position 72G on the paper illustrating FIG. 15.

In the present example, stopped state history has been retained (or is present) when and after the other vehicle 72 reached the other vehicle position 72D. More specifically, at the time point at which the vehicle 10 reached the vehicle position 10D (i.e., the time point at which the other vehicle 72 reached the other vehicle position 72D), the object moving speed Vc of the other vehicle 72 coincided with the third threshold speed Vth3 (=0) and the longitudinal position Dy of the other vehicle 72 is smaller than the threshold distance Dth2. Thus, the ECU 26 determined that the other vehicle 72 that is the oncoming vehicle stopped (stopped moving) at the time point at which the vehicle 10 reached the vehicle position 10D. Accordingly, the stopped state history remains (or is present) at the time point at which the vehicle 10 reached the vehicle position 10E, although the other vehicle 72 resumed moving at the time point at which the vehicle 10 reached the vehicle position 10E.

Although a detailed description is omitted, at least in the period in which the vehicle 10 moves from the vehicle position 10F to the vehicle position 10G, the other vehicle 72 satisfies the condition for being an oncoming vehicle (namely, the conditions (a) to (e)), and thus, the condition (A2) is satisfied. Whereas, at the time point at which the vehicle 10 reaches the vehicle position 10F, neither the condition (A3) nor the condition (A4) is satisfied. It should be noted that at a time point after the vehicle 10 reaches the vehicle position 10G, the condition (A3) and the condition (A4) become satisfied, and thus, the traveling path intersect alert condition becomes satisfied.

When and after the vehicle 10 reaches the vehicle position 10F, a right hand demarcation line is no longer included in an area Rpo that is the host vehicle right turn passing area of the vehicle 10. Therefore, at the time point at which the vehicle 10 reaches the vehicle position 10F, the condition (B3a) becomes satisfied, and thus, the first preceding alert condition becomes satisfied.

As described above, when the first preceding alert condition becomes satisfied, the vehicle control ECU 26 of the fifth modified apparatus executes, as the oncoming vehicle alert, only of the second alert, if the "stopped state history" regarding the oncoming vehicle is present (or has been retained/held). Accordingly, since the "stopped state history" regarding the oncoming vehicle (i.e., the other vehicle 72) is present in the present example described above, the ECU 26 starts executing the second alert (i.e., the alert using the speaker 47) when the first preceding alert condition becomes satisfied at the time point at which the vehicle 10 reaches the vehicle position 10F. Thereafter, when the vehicle 10 reaches the vehicle position 10G (i.e., the traveling path intersect alert condition becomes satisfied), the ECU 26 starts executing the first alert. Namely, the ECU 26 performs the first alert using the display 46 in addition to the second alert.

Whereas, if the stopped state history regarding the other vehicle 72 is not present at the time point at which the vehicle 10 reaches the vehicle position 10F, the ECU 26 starts performing both of the first alert and the second alert at the time point at which the vehicle 10 reaches the vehicle position 10F.

<Specific Operation of the Fifth Modified Apparatus>

The CPU 31 (hereinafter, also simply referred to as the "CPU") of the vehicle control ECU 26 of the fifth modified apparatus executes an "oncoming vehicle alert determination routine" shown by a flowchart of FIG. 16 in place of the "oncoming vehicle alert determination routine" shown by the flowchart of FIG. 6, every time a predetermined time elapses.

Figure 16:
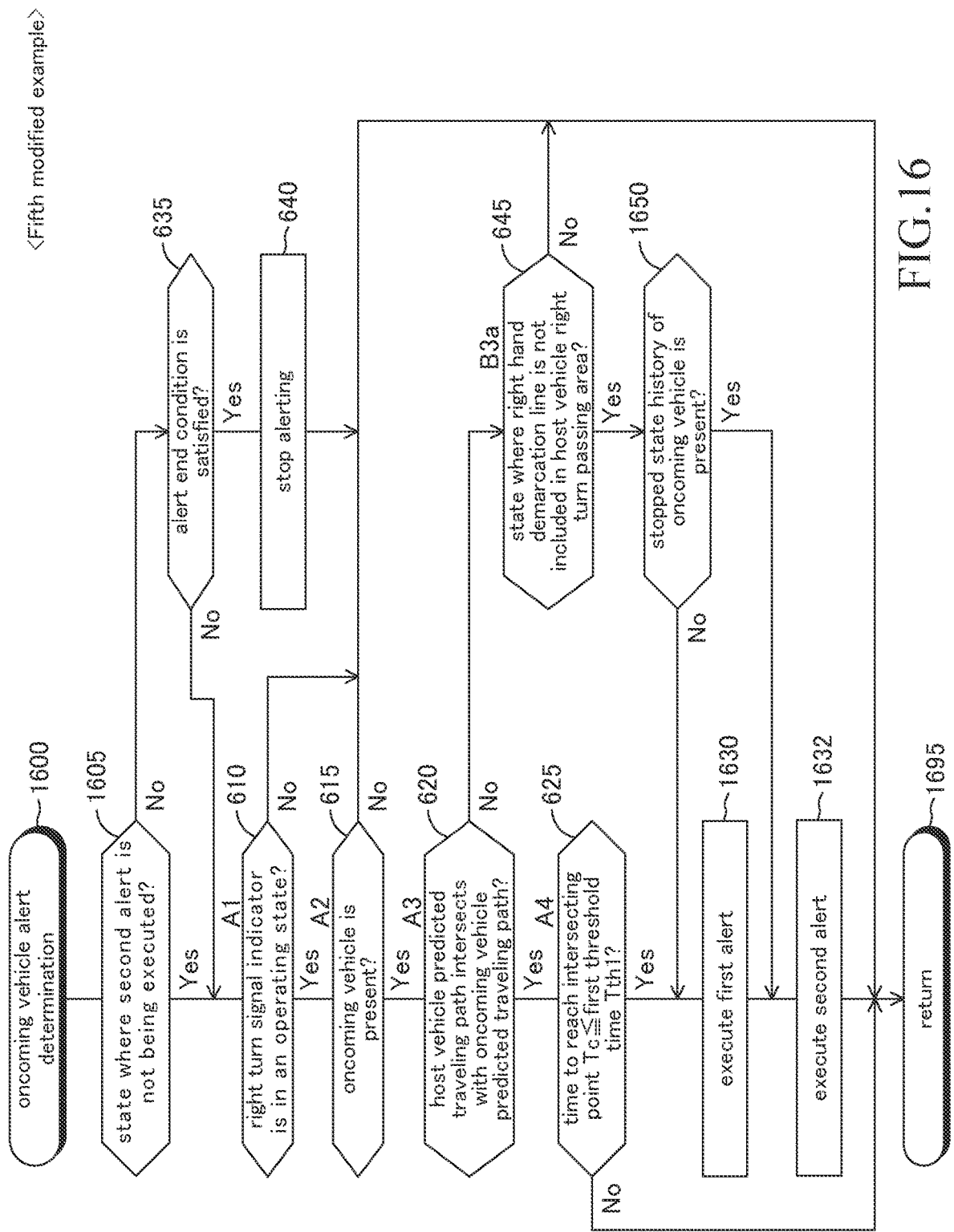
FIG. 16 is a flowchart showing an oncoming vehicle alert determination routine executed by the fifth modified apparatus.

Therefore, when an appropriate time comes, the CPU starts processing from step 1600 shown in FIG. 16, and proceeds to step 1605. At step 1605, the CPU determines whether or not a present state is a state in which the second alert is not being executed. The CPU makes a "No" determination at step 1605 so as to proceed step 635, when both of the first alert and the second alert are being performed or when only of the second alert is being performed.

When the condition used at step 635 is not satisfied (i.e. when the alert end condition is not satisfied), the CPU makes a "No" determination at step 635, and proceeds to step 610.

If the second alert is not being executed when the CPU proceeds to step 1605, the CPU makes a "Yes" determination at step 1605, and proceeds to step 610.

When the CPU makes a "Yes" determination at step 625 (i.e., when the traveling path intersect alert condition is satisfied), the CPU proceeds to step 1630 so as to execute the first alert. More specifically, the CPU starts the first alert by making the display 46 display the oncoming vehicle alert symbol when the first alert is not being executed (i.e., when the first alert has not yet started). Whereas, the CPU continues performing the first alert, when the first alert is being executed at the time point at which the CPU proceeds to step 1630.

Subsequently, the CPU proceeds to step 1632 so as to execute the second alert. More specifically, the CPU starts the second alert by making the speaker 47 generate the oncoming vehicle alert sound when the second alert is not being executed (i.e., when the second alert has not yet started). Whereas, the CPU continues performing the second alert, when the second alert is being executed at the time point at which the CPU proceeds to step 1632. Thereafter, the CPU proceeds to step 1695 so as to terminate the present routine.

When the CPU makes a "Yes" determination at step 645 (i.e., when the condition (B3a) becomes satisfied so that the first preceding alert condition is satisfied, although the traveling path intersect alert condition is not satisfied), the CPU proceeds to step 1650. At step 1650, the determines whether or not the stopped state history regarding the oncoming vehicle has been retained (or is present).

When the stopped state history regarding the oncoming vehicle has been retained (or is present), the CPU makes a "Yes" determination at step 1650 and proceeds to step 1632. At step 1632, the CPU executes the second alert as the oncoming vehicle alert. Whereas, when the stopped state history regarding the oncoming vehicle has not been retained (or is not present), the CPU makes a "No" determination at step 1650 and proceeds to step 1630 and step 1632. As a result, the first alert and the second alert are both executed, as the oncoming vehicle alert.

As has been described, the fifth modified apparatus determines whether or not the prohibition condition is satisfied based on whether or not the stopped state history regarding the oncoming vehicle is present. Therefore, the fifth modified apparatus can avoid the unnecessary first alert.

In addition, the fifth modified apparatus execute the first alert only without executing the second alert when the prohibition condition is satisfied. Therefore, the fifth modified apparatus can reduce a possibility that the driver feels bothered due to the oncoming vehicle alert that includes both of the first alert and the second alert.

It should be noted that a condition that is satisfied when the stopped state history regarding the oncoming vehicle has been retained (is present) is referred to as a "prohibition condition or a stopped state history prohibition condition", for convenience sake. Furthermore, a modified example of the fifth modified apparatus may be configured to prohibit not only the first alert but also the second alert, when stopped state history prohibition condition is satisfied. In other words, when the CPU makes a "Yes" determination at step 1650 shown in FIG. 16, the CPU may directly proceed to step 1695 without proceeding to step 1632.

(Sixth Modified Example of the Present Alert Apparatus)

A sixth modified example (hereinafter, sometimes referred to as a "sixth modified apparatus") of the present alert apparatus performs the oncoming vehicle alert, when at least one of the traveling path intersect alert condition, an eighth preceding alert condition, and a ninth preceding alert condition becomes satisfied.

<<The Eighth Preceding Alert Condition>>

The eighth preceding alert condition is a condition to be satisfied when the "above-described conditions (A1), (A2), and (B3a)" are satisfied and "conditions (H4a) and (H5a)" described below are satisfied. Namely, the eighth preceding alert condition becomes satisfied, when all of the following conditions are satisfied.

Condition (A1): to be satisfied when the right turn signal indicator 43R is in the operating state (is blinking).

Condition (A2): to be satisfied when the oncoming vehicle is present.

Condition (B3a): to be satisfied when the right hand demarcation line is not included in the "host vehicle right turn passing area" of the vehicle 10.

Condition (H4a): to be satisfied when the vehicle speed Vs of the vehicle 10 is equal to or lower than a predetermined fourth threshold speed Vth4 (i.e., Vs≤Vth4).

Condition (H5a): to be satisfied when the magnitude (lateral distance |Dx|) of the lateral position Dx of the oncoming vehicle is smaller/shorter than a predetermined third threshold distance Dth3 (i.e., |Dx|<Dth3). The third threshold distance Dth3 has been set in advance at a value in the vicinity of a maximum value among magnitudes (lateral distances |Dx|) when the oncoming vehicle is traveling in an adjacent right hand lane that is a lane adjacent to the traveling lane (of the host vehicle).

<<The Ninth Preceding Alert Condition>>

The ninth preceding alert condition is a condition to be satisfied when the "above-described conditions (A1), (A2), and (B3a)" are satisfied and "conditions (H4b) and (H5b)" described below are satisfied. Namely, the ninth preceding alert condition becomes satisfied, when all of the following conditions are satisfied.

Condition (A1): to be satisfied when the right turn signal indicator 43R is in the operating state (is blinking).

Condition (A2): to be satisfied when the oncoming vehicle is present.

Condition (B3a): to be satisfied when the right hand demarcation line is not included in the "host vehicle right turn passing area" of the vehicle 10.

Condition (H4b): to be satisfied when the vehicle speed Vs of the vehicle 10 is higher than the fourth threshold speed Vth4 (i.e., Vs>Vth4).

Condition (H5b): to be satisfied when the magnitude (lateral distance |Dx|) of the lateral position Dx of the oncoming vehicle is smaller/shorter than a predetermined fourth threshold distance Dth4 (i.e., |Dx|<Dth4). The fourth threshold distance Dth4 is greater than the third threshold distance Dth3 (i.e., Dth3<Dth4) and has been set in advance at a value in the vicinity of a maximum value among magnitudes (lateral distances |x|) when the oncoming vehicle is traveling in a lane adjacent to the adjacent right hand lane on the right side of the adjacent right hand lane with respect to the vehicle 10.

It should be noted a combination of "the condition (H4a) and the condition (H5a)" included in the eighth preceding alert condition and "the condition (H4b) and the condition (H5b)" included in the ninth preceding alert condition can be integrated into a condition (H6) described below.

Condition (H6): to be satisfied when the magnitude (lateral distance |Dx|) of the lateral position Dx of the oncoming vehicle is smaller/shorter than a lateral threshold distance Dxyth that becomes greater as the vehicle speed Vs of the vehicle 10 becomes higher.

Figure 17:
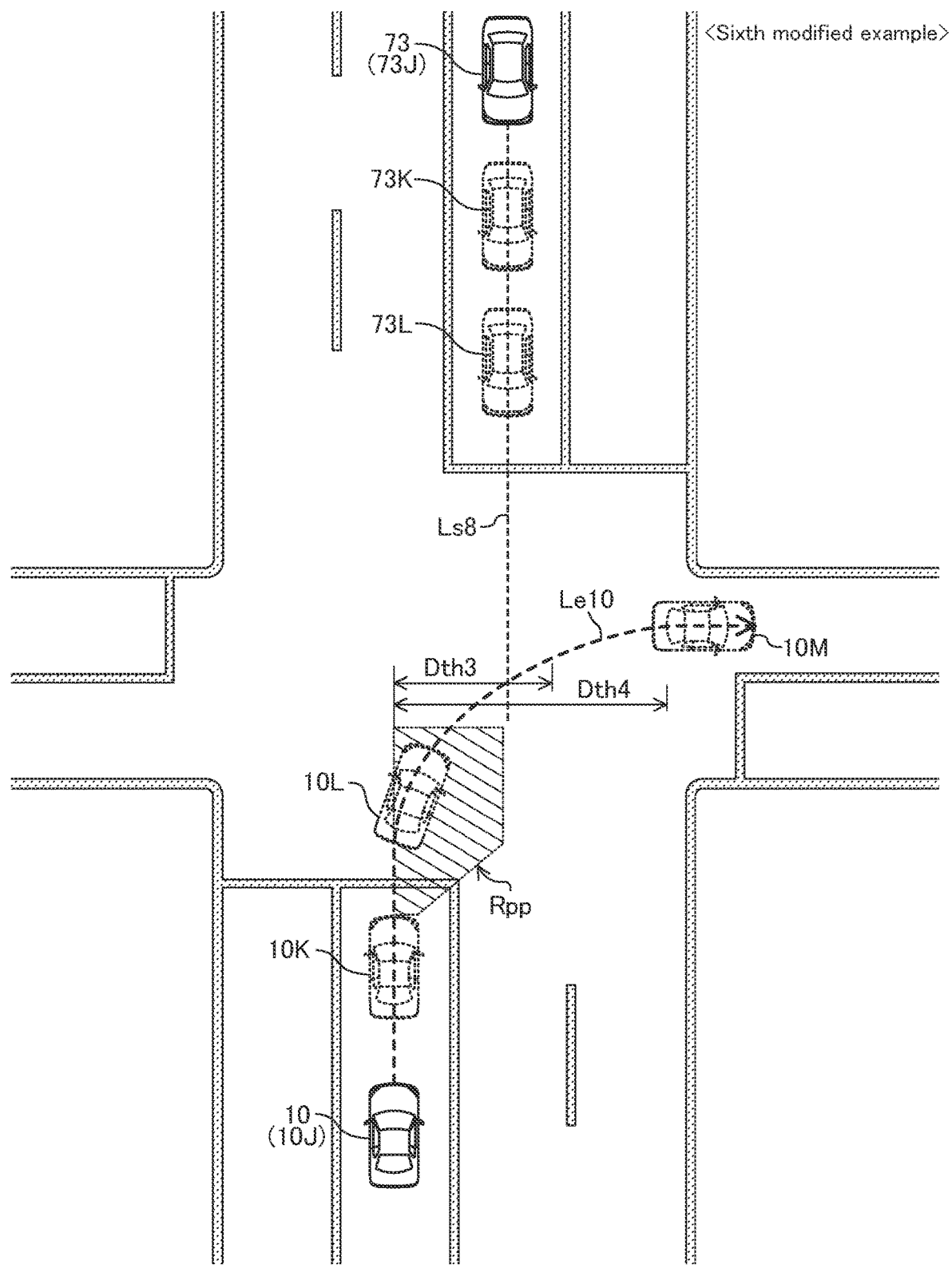
FIG. 17 is a plan view of an intersection in a case where an oncoming vehicle alert is performed/executed by an alert apparatus (sixth modified apparatus) according to a sixth modified example of the present alert apparatus, based on an eighth preceding alert condition.

The eighth preceding alert condition will next be described in detail with reference to FIG. 17. In FIG. 17, a current/present position of the vehicle 10 is represented by a vehicle position 10J. In this example, the driver of the vehicle 10 is about to (or intends to) make a right turn at an intersection. More specifically, the driver intends to move the vehicle 10 from the vehicle position 10J to a vehicle position 10M through a vehicle position 10K and a vehicle position 10L. The broken line Le10 represents a traveling path of the vehicle 10 intended by the driver.

An other vehicle 73 shown in FIG. 17 is an other vehicle detected based on the frontward image (that is, a camera detected object whose object type is a "vehicle"). A position of the other vehicle 73 at the time point at which the vehicle 10 is at the vehicle position 10J is represented by an other vehicle position 73J. A position of the other vehicle 73 at the time point at which the vehicle 10 is at the vehicle position 10K is represented by an other vehicle position 73K. A position of the other vehicle 73 at the time point at which the vehicle 10 is at the vehicle position 10L is represented by an other vehicle position 73L.

An oncoming vehicle predicted traveling path predicted when the other vehicle 73 is at the other vehicle position 73J is represented by a broken line Ls8. In the present example, the other vehicle 73 is running straight.

The driver of the vehicle 10 starts operating (blinking) the right turn signal indicator 43R when the vehicle 10 reaches the vehicle position 10J. Thus, the condition (A1) becomes satisfied when the vehicle 10 reaches the vehicle position 10J.

Although a detailed description is omitted, at least in a period in which the vehicle 10 moves from the vehicle position 10J to the vehicle position 10L, the other vehicle 73 satisfies the condition for being an oncoming vehicle (namely, the conditions (a) to (e)), and thus, the condition (A2) is satisfied. Whereas, at a time point at which the vehicle 10 reaches at the vehicle position 10K, neither the condition (A3) nor the condition (A4) is satisfied. It should be noted that, after the vehicle 10 passes the vehicle position 10L, the condition (A3) and the condition (A4) become satisfied, and thus, the traveling path intersect alert condition becomes satisfied.

When and after the vehicle 10 reaches the vehicle position 10K, a right hand demarcation line is no longer included in an area Rpp that is the host vehicle right turn passing area of the vehicle 10. Therefore, the condition (B3a) becomes satisfied at the time point at which the vehicle 10 reaches the vehicle position 10K.

In the present example shown in FIG. 17, the vehicle speed Vs is equal to or lower than the fourth threshold speed Vth4, at the time point at which the vehicle 10 reaches the vehicle position 10K. Thus, at this time point, the condition (H4a) is satisfied. Furthermore, as understood from FIG. 17, at the time point at which the vehicle 10 reaches the vehicle position 10K, the magnitude |Dx| of the lateral position Dx of the other vehicle 73 is smaller than the third threshold distance Dth3. Thus, at this time point, the condition (H5a) is satisfied. Consequently, the eighth preceding alert condition becomes satisfied at the time point at which the vehicle 10 reaches the vehicle position 10K.

Figure 18:
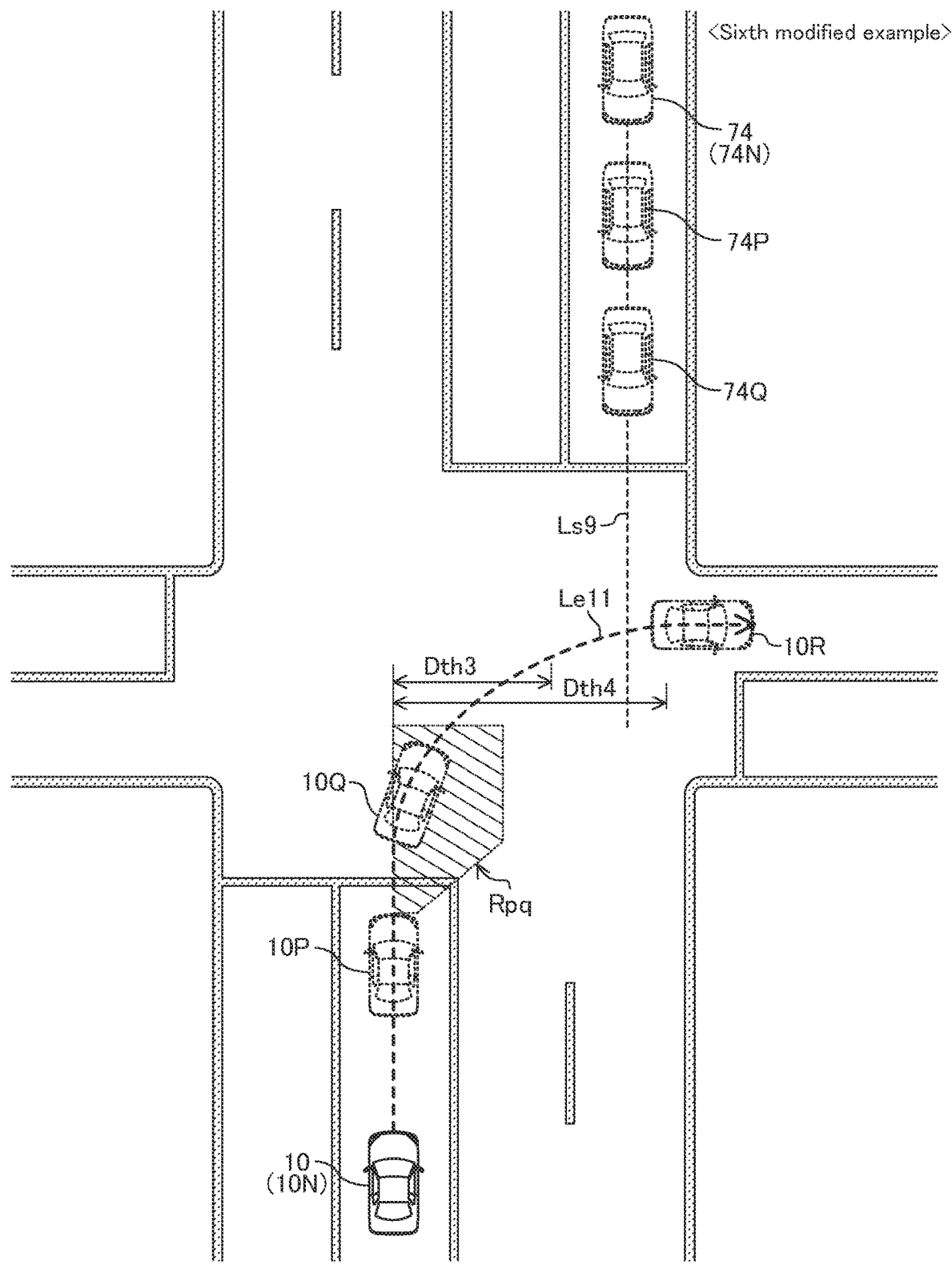
FIG. 18 is a plan view of an intersection in a case where an oncoming vehicle alert is performed/executed by the sixth modified apparatus, based on a ninth preceding alert condition.

The ninth preceding alert condition will next be described in detail with reference to FIG. 18. In FIG. 18, a current/present position of the vehicle 10 is represented by a vehicle position 10N. In this example, the driver of the vehicle 10 is about to (or intends to) make a right turn at an intersection. More specifically, the driver intends to move the vehicle 10 from the vehicle position 10N to a vehicle position 10R through a vehicle position 10P and a vehicle position 10Q. The broken line Le11 represents a traveling path of the vehicle 10 intended by the driver.

An other vehicle 74 shown in FIG. 18 is an other vehicle detected based on the frontward image (that is, a camera detected object whose object type is a "vehicle"). A position of the other vehicle 74 at the time point at which the vehicle 10 is at the vehicle position 10N is represented by an other vehicle position 74N. A position of the other vehicle 74 at the time point at which the vehicle 10 is at the vehicle position 10P is represented by an other vehicle position 74P. A position of the other vehicle 74 at the time point at which the vehicle 10 is at the vehicle position 10Q is represented by an other vehicle position 74Q.

An oncoming vehicle predicted traveling path predicted when the other vehicle 74 is at the other vehicle position 74N is represented by a broken line Ls9. In the present example, the other vehicle 74 is running straight.

The driver of the vehicle 10 starts operating (blinking) the right turn signal indicator 43R when the vehicle 10 reaches the vehicle position 10N. Thus, the condition (A1) becomes satisfied when the vehicle 10 reaches the vehicle position 10N.

Although a detailed description is omitted, at least in a period in which the vehicle 10 moves from the vehicle position 10N to the vehicle position 10Q, the other vehicle 74 satisfies the condition for being an oncoming vehicle (namely, the conditions (a) to (e)), and thus, the condition (A2) is satisfied. Whereas, at a time point at which the vehicle 10 reaches at the vehicle position 10P, neither the condition (A3) nor the condition (A4) is satisfied. It should be noted that, after the vehicle 10 passes the vehicle position 10Q, the condition (A3) and the condition (A4) become satisfied, and thus, the traveling path intersect alert condition becomes satisfied.

When and after the vehicle 10 reaches the vehicle position 10P, a right hand demarcation line is no longer included in an area Rpq that is the host vehicle right turn passing area of the vehicle 10. Therefore, the condition (B3a) becomes satisfied at the time point at which the vehicle 10 reaches the vehicle position 10P.

In the present example shown in FIG. 18, at the time point at which the vehicle 10 reaches the vehicle position 10P, the vehicle speed Vs is higher than the fourth threshold speed Vth4, and thus, the condition (H4b) is satisfied. Furthermore, as understood from FIG. 18, at the time point at which the vehicle 10 reaches the vehicle position 10P, the magnitude |Dx| of the lateral position Dx of the other vehicle 74 is smaller than the fourth threshold distance Dth4. Thus, at this time point, the condition (H5b) is satisfied. Consequently, the ninth preceding alert condition becomes satisfied at the time point at which the vehicle 10 reaches the vehicle position 10P.

<Specific Operation of the Sixth Modified Apparatus>

The CPU 31 (hereinafter, also simply referred to as the "CPU") of the ECU 27 of the sixth modified apparatus executes an "oncoming vehicle alert determination routine" shown by a flowchart of FIG. 19 in place of the "oncoming vehicle alert determination routine" shown by the flowchart of FIG. 6, every time a predetermined time elapses.

Figure 19:
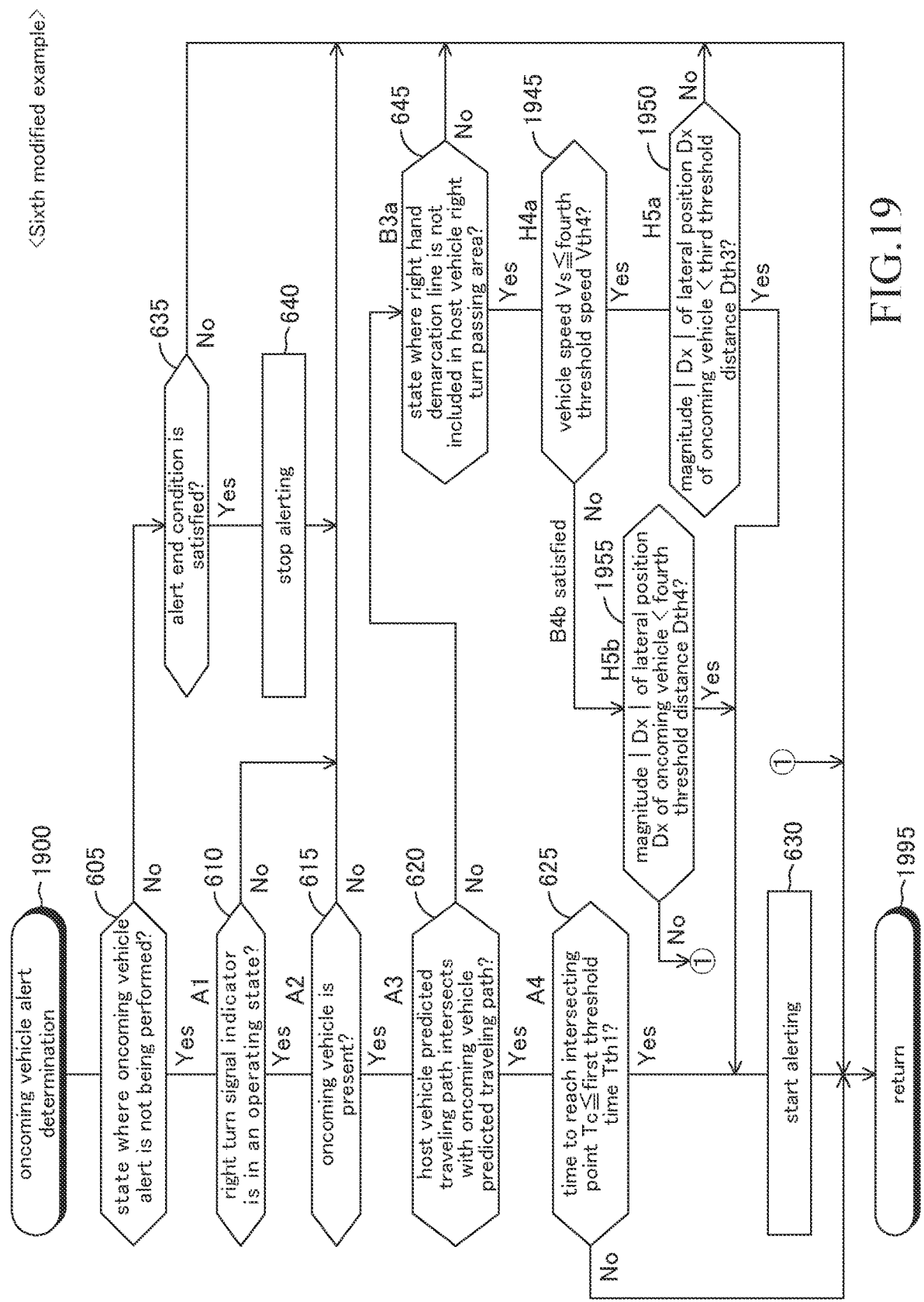
FIG. 19 is a flowchart showing an oncoming vehicle alert determination routine executed by the sixth modified apparatus.

Therefore, when an appropriate time comes, the CPU starts processing from step 1900 shown in FIG. 19, and executes processes of steps following step 605. When the CPU makes a "Yes" determination at step 645 (i.e., when the conditions (A1), (A2) and (B3a) are satisfied), the CPU proceed to step 1945 so as to determine whether or not the vehicle speed Vs is equal to or lower than the fourth threshold speed Vth4. Namely, the CPU determines whether or not the condition (H4a) is satisfied.

If the vehicle speed Vs is equal to or lower than the fourth threshold speed Vth4, the CPU makes a "Yes" determination at step 1945, and proceeds to step 1950. At step 1950, the CPU determines whether or not the magnitude |Dx| of the lateral position Dx of the oncoming vehicle is smaller than the third threshold distance Dth3. Namely, the CPU determines whether or not the condition (H5a) is satisfied.

If the magnitude |Dx| of the lateral position Dx of the oncoming vehicle is smaller than the third threshold distance Dth3, the CPU makes a "Yes" determination at step 1950, and proceeds to step 630. Namely, in this case, since the eighth preceding alert condition is satisfied, the CPU starts performing the alert.

Whereas, if the vehicle speed Vs is higher than the fourth threshold speed Vth4 (i.e., if the condition (H4b) is satisfied), the CPU makes a "No" determination at step 1945, and proceeds to step 1955. At step 1955, the CPU determines whether or not the magnitude |Dx| of the lateral position Dx of the oncoming vehicle is smaller than the fourth threshold distance Dth4. Namely, the CPU determines whether or not the condition (H5b) is satisfied.

If the magnitude |Dx| of the lateral position Dx of the oncoming vehicle is smaller than the fourth threshold distance Dth4, the CPU makes a "Yes" determination at step 1955, and proceeds to step 630. Namely, in this case, since the ninth preceding alert condition is satisfied, the CPU starts performing the alert. Whereas, if the magnitude |Dx| of the lateral position Dx of the oncoming vehicle is equal to or greater than the fourth threshold distance Dth4, the CPU makes a "No" determination at step 1955, and directly proceeds to step 1995.

It should be noted that, when the condition used at step 1950 is not satisfied (i.e. when the magnitude |Dx| of the lateral position Dx of the oncoming vehicle is equal to or greater than the third threshold distance Dth3), the CPU makes a "No" determination at step 1950, and directly proceeds to step 1995.

As has been described above, the sixth modified apparatus can perform the oncoming vehicle alert at an appropriate time point in the case where the oncoming vehicle is traveling in the adjacent right hand lane as well as in the case where the oncoming vehicle is traveling in the lane adjacent to the adjacent right hand lane on the right side of the adjacent right hand lane (with respect to the host vehicle).

(Seventh Modified Example of the Present Alert Apparatus)

A seventh modified example (hereinafter, sometimes referred to as a "seventh modified apparatus") of the present alert apparatus performs the oncoming vehicle alert, when at least one of the traveling path intersect alert condition and a tenth preceding alert condition becomes satisfied.

<<The Tenth Preceding Alert Condition>>

The tenth preceding alert condition is a condition to be satisfied when the "above-described conditions (A1), (A2), and (B3a)" are satisfied and a condition (J4) described below is satisfied. Namely, the tenth preceding alert condition becomes satisfied, when all of the following conditions are satisfied.

Condition (A1): to be satisfied when the right turn signal indicator 43R is in the operating state (is blinking).

Condition (A2): to be satisfied when the oncoming vehicle is present.

Condition (B3a): to be satisfied when the right hand demarcation line is not included in the "host vehicle right turn passing area" of the vehicle 10.

Condition (J4): to be satisfied when a "prohibition condition (specific prohibition condition)" is not satisfied.

The "prohibition condition (specific prohibition condition)" of the condition (J4) becomes satisfied, when all of the following conditions (j), (k) and (m) are satisfied.

<<<Specific Prohibition Condition>>>

Condition (j): to be satisfied when the steering angle θs is smaller than a predetermined threshold angle θth which is positive (i.e., 0<θth, and θs<θth). In other words, the condition (j) is satisfied when the steering angle θs is a value that causes the vehicle 10 to turn in such a manner that the vehicle 10 crosses the oncoming lane, and a magnitude (|θs| of the steering angle θs is smaller than the threshold angle θth (i.e., |θs|<θth).

Condition (k): to be satisfied when the brake pedal operation amount Bp is greater than a predetermined operation amount threshold Bth (i.e., Bp>Bth). In other words, the condition (k) is satisfied when the brake is being operated.

Condition (m): to be satisfied when the vehicle speed Vs of the vehicle 10 is equal to or lower than a predetermined fifth threshold speed Vth5 (i.e., Vs≤Vth5).

In the present example, the operation amount threshold Bth is set at zero ("0"). The fifth threshold speed Vth5 may sometimes be referred to as a "specific speed", for convenience sake.

<Specific Operation of the Seventh Modified Apparatus>

The CPU 31 (hereinafter, also simply referred to as the "CPU") of the ECU 28 of the seventh modified apparatus executes an "oncoming vehicle alert determination routine" shown by a flowchart of FIG. 20 in place of the "oncoming vehicle alert determination routine" shown by the flowchart of FIG. 6, every time a predetermined time elapses.

Figure 20:
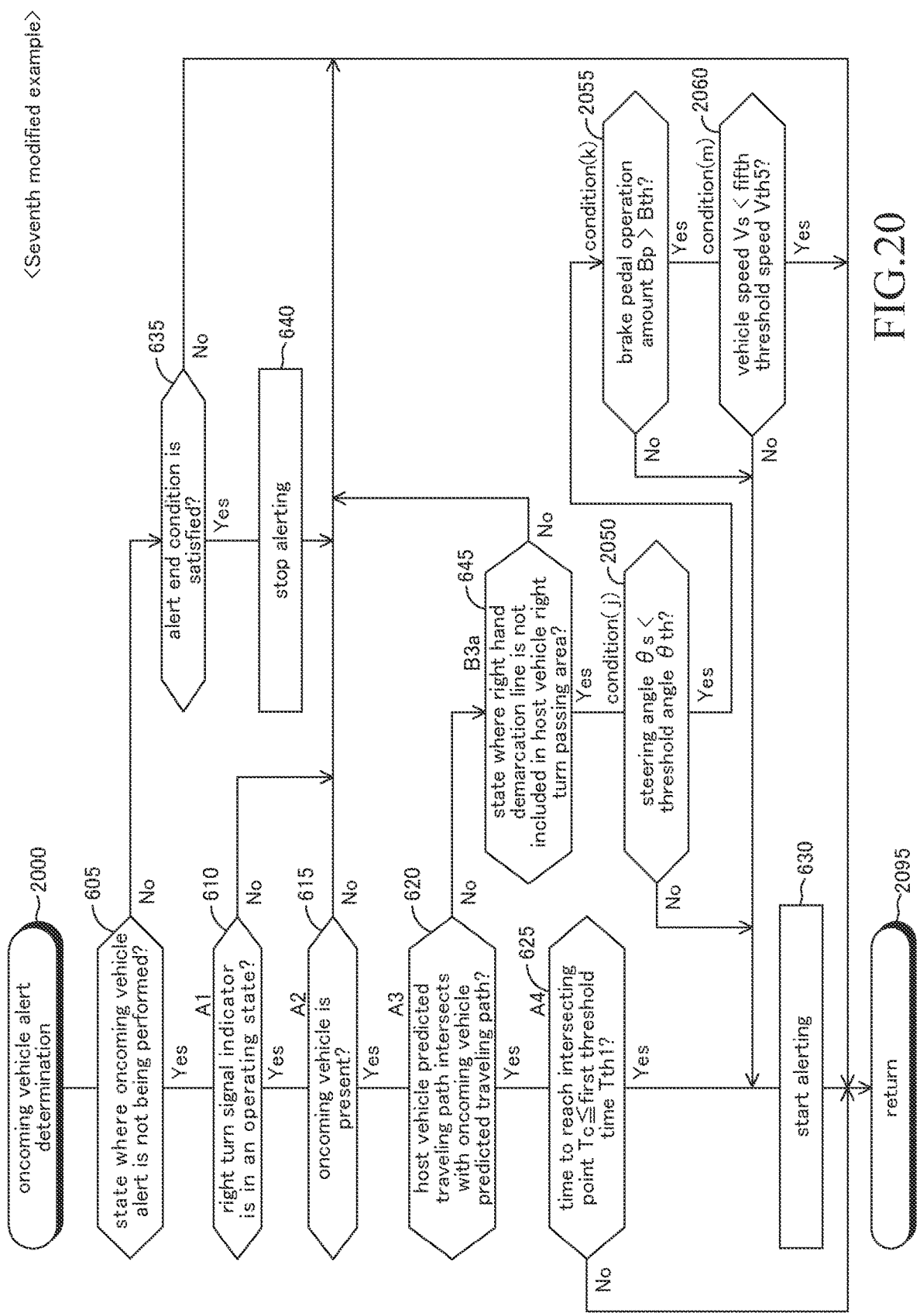
FIG. 20 is a flowchart showing an oncoming vehicle alert determination routine executed by an alert apparatus (seventh modified apparatus) according to a seventh modified example of the present alert apparatus.

Therefore, when an appropriate time comes, the CPU starts processing from step 2000 shown in FIG. 20, and executes processes of steps following step 605. When the CPU makes a "Yes" determination at step 645 (i.e., when the conditions (A1), (A2) and (B3a) are satisfied), the CPU proceed to step 2050 so as to determine whether or not the steering angle θs is smaller than the threshold angle θth. Namely, the CPU determines whether or not the condition ( ) is satisfied.

If the steering angle θs is equal to or greater than the threshold angle θth (i.e., if the condition (j) is not satisfied, and thus, the prohibition condition (specific prohibition condition) is not satisfied), the CPU makes a "No" determination at step 2050, and proceeds to step 630. Namely, in this case, since the tenth preceding alert condition is satisfied, the CPU starts performing the alert. Thereafter, the CPU proceeds to step 2095 so as to terminate the present routine.

Whereas, if the steering angle θs is smaller than the threshold angle θth, the CPU makes a "Yes" determination at step 2050, and proceeds to step 2055. At step 2055, the CPU determines whether or not the brake pedal operation amount Bp is greater than the operation amount threshold Bth. Namely, the CPU determines whether or not the condition (k) is satisfied. If the brake pedal operation amount Bp is equal to or smaller than the operation amount threshold Bth (i.e., if the condition (k) is not satisfied, and thus, the prohibition condition (specific prohibition condition) is not satisfied), the CPU makes a "No" determination at step 2055, and proceeds to step 630 so as to start performing the alert.

Whereas, if the brake pedal operation amount Bp is greater than the operation amount threshold Bth, the CPU makes a "Yes" determination at step 2055, and proceeds to step 2060. At step 2060, the CPU determines whether or not the vehicle speed Vs is lower than the fifth threshold speed Vth5. Namely, the CPU determines whether or not the condition (m) is satisfied. If the vehicle speed Vs is equal to or higher than the fifth threshold speed Vth5 (i.e., if the condition (m) is not satisfied, and thus, the prohibition condition (specific prohibition condition) is not satisfied), the CPU makes a "No" determination at step 2060, and proceeds to step 630 so as to start performing the alert.

Whereas, if the vehicle speed Vs is lower than the fifth threshold speed Vth5, the CPU makes a "Yes" determination at step 2060, and directly proceeds to step 2095.

As has been described above, the seventh modified apparatus determines whether or not the prohibition condition is satisfied based on the steering angle θs, the brake pedal operation amount Bp, and the vehicle speed Vs. Therefore, the seventh modified apparatus can avoid the unnecessary oncoming vehicle alert.

(Eighth Modified Example of the Present Alert Apparatus)

An eighth modified example (hereinafter, sometimes referred to as an "eighth modified apparatus") of the present alert apparatus will next be described. The above-described present alert apparatus and the above-described modified apparatuses end/finish the alert when at least one of the conditions (C1), (C2), and (C3) is satisfied. In contrast, the eighth modified apparatus end/finish the alert at a first end time point or a second time end point, whichever comes earlier. The first end time point is a time point at which a "first alert end condition" described later becomes satisfied. The "second end time point" is a time point that comes when a state in which a "second alert end condition" described later is satisfied continues for a predetermined third threshold time Tth3. The eighth modified apparatus will next be described in more detail.

Whether or not the first alert end condition is satisfied is determined based on a driving operation state of the driver. More specifically, the first alert end condition is a condition to be satisfied when it is determined/inferred that there is a high probability that the driver of the vehicle 10 has been recognizing the presence of the oncoming vehicle.

<<First Alert End Condition>>

The first alert end condition of the present modified example is satisfied when an end condition (END11) and an end condition (END12) are both satisfied.

End condition (END11): to be satisfied when steering angle rate Ws that is a change amount of the steering angle θs per unit time is negative (i.e., Ws<0). That is, the end condition (END11) is satisfied when the steering wheel 51 is being turned counterclockwise.

End condition (END12): to be satisfied when a magnitude (an absolute value) |Ws| of the steering angle rate Ws is greater than a predetermined threshold angle rate Wth (i.e., |Ws|>Wth>0). The threshold angle rate Wth has been set in advance at a value in the vicinity of a minimum value among magnitudes of the steering angle rate Ws observed when the driver turns the steering wheel counterclockwise in a case where the driver has noticed the presence of the oncoming vehicle after the driver started having the vehicle 10 turn to the right. In the present modified example, the steering angle sensor 45 may be referred to as "a driving state sensor or a driving operating state sensor", for convenience sake.

<<Second Alert End Condition>>

Whether or not the second alert end condition is satisfied is determined based on at least the vehicle speed Vs of the vehicle 10 and surrounding information. More specifically, the second alert end condition is a condition to be satisfied when it is determined that there is not a possibility that vehicle 10 collides with the oncoming vehicle any longer. In the present modified example, the second alert end condition becomes satisfied when the condition (C2) becomes satisfied (i.e., when the oncoming vehicle has disappeared).

<Specific Operation of the Eighth Modified Apparatus>

The CPU 31 (hereinafter, also simply referred to as the "CPU") of the ECU 29 of the eighth modified apparatus executes an "oncoming vehicle alert determination routine" shown by a flowchart of FIG. 21 in place of the "oncoming vehicle alert determination routine" shown by the flowchart of FIG. 6, every time a predetermined time elapses. The routine shown in FIG. 21 is the same routine as the routine shown in FIG. 6 from which step 635 and step 640 are deleted.

Figure 22:
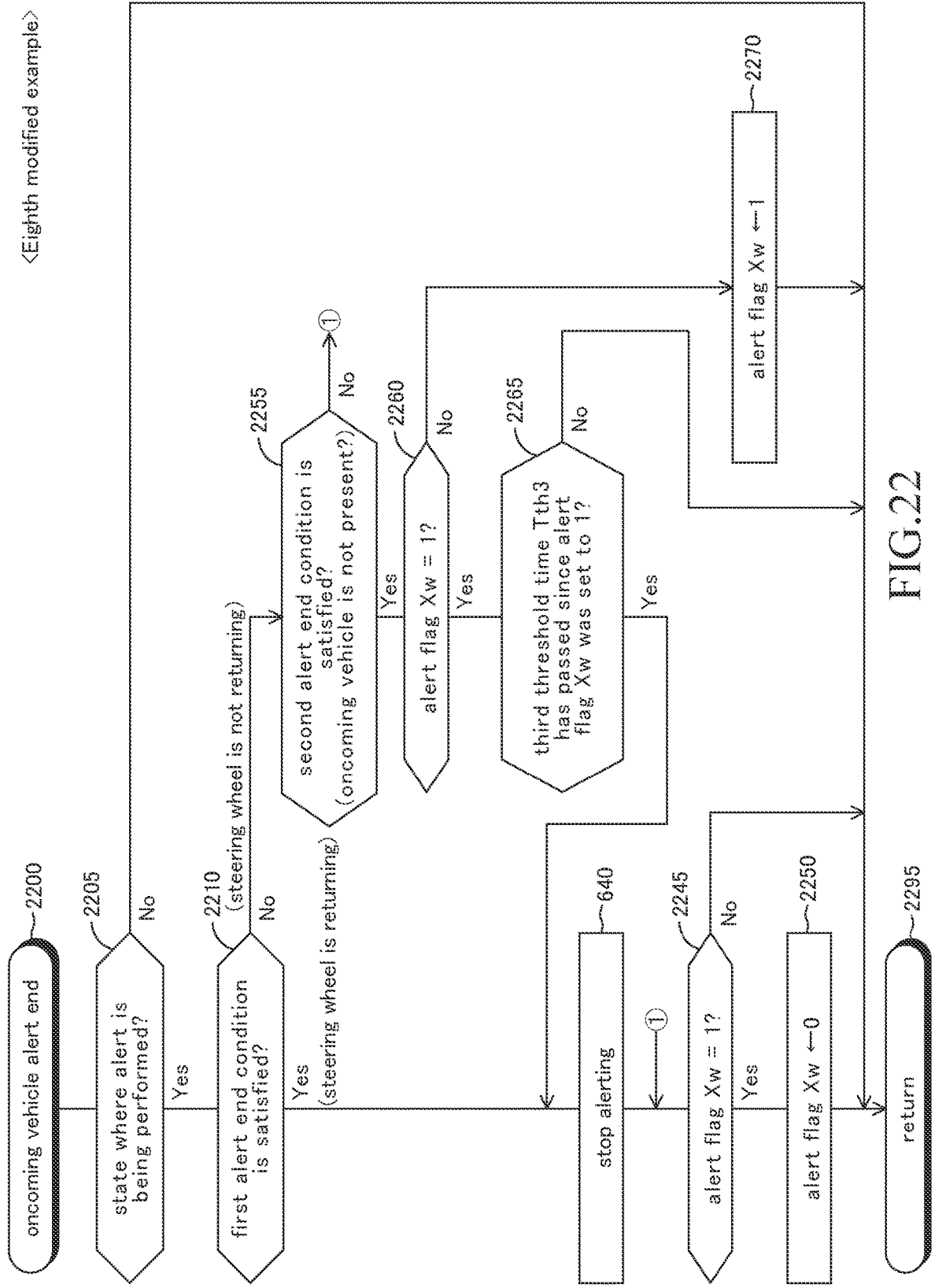
FIG. 22 is a flowchart showing an oncoming vehicle alert determination routine executed by the eighth modified apparatus.

In addition, the CPU executes an "oncoming vehicle alert end routine" shown by a flowchart of FIG. 22 every time a predetermined time shorter than the third threshold time Tth3 elapses.

It should be noted that a value of an "alert flag Xw" used in the routine shown in FIG. 22 is set to zero ("0") through an unillustrated initialization routine executed by the CPU when an unillustrated ignition key switch is turned on.

Figure 21:
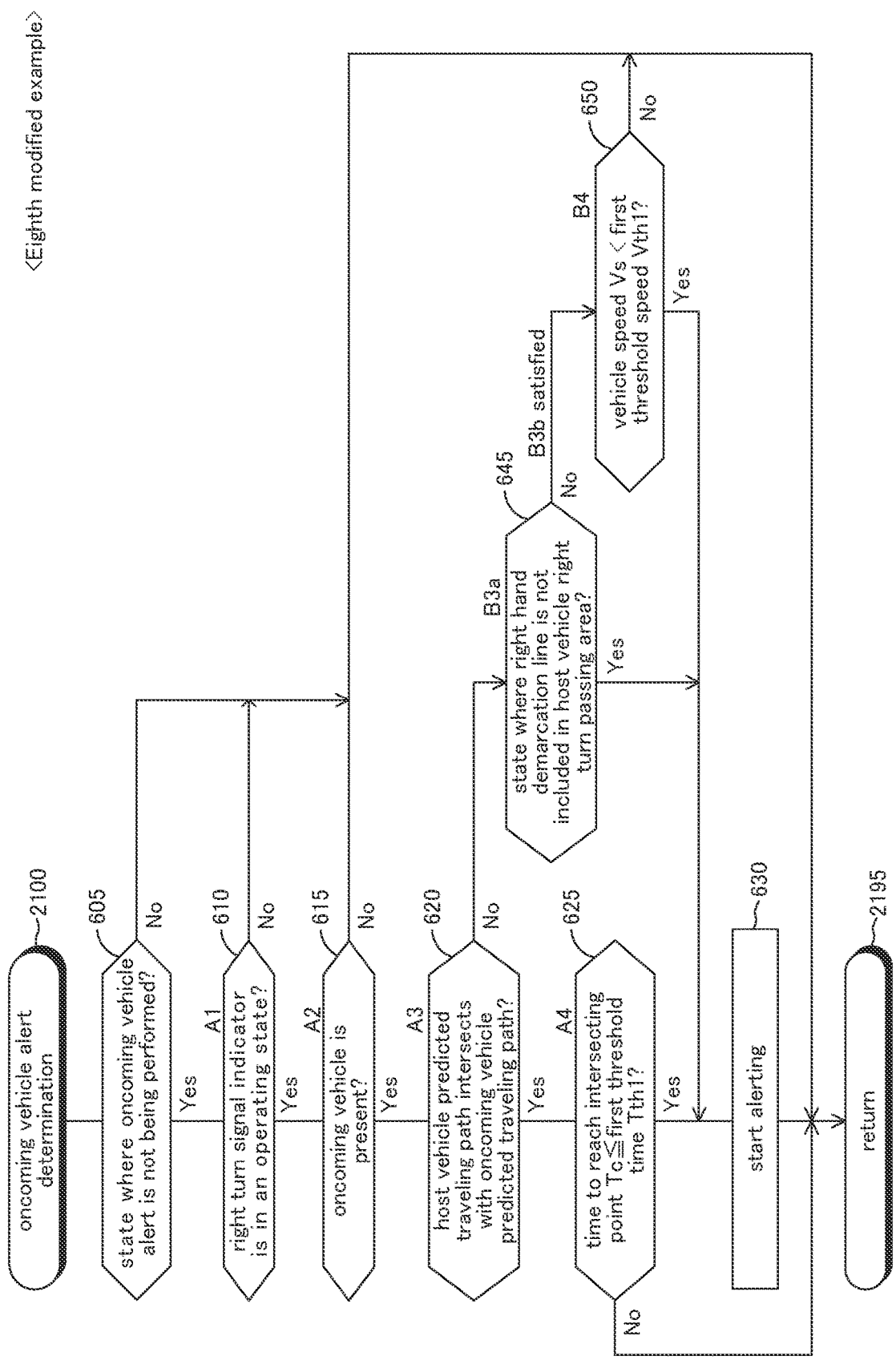
FIG. 21 is a flowchart showing an oncoming vehicle alert determination routine executed by an alert apparatus (eighth modified apparatus) according to an eighth modified example of the present alert apparatus.

When an appropriate time comes, the CPU starts processing from step 2100 shown in FIG. 21, and proceeds to step 605. When the CPU makes a "No" determination at step 605, the CPU directly proceeds to step 2195 so as to end the resent routine. Whereas, when the CPU makes a "Yes" determination at step 605, the CPU executes processes of steps following step 610. Accordingly, when at least one of the traveling path intersect alert condition, the first preceding alert condition, and the second preceding alert condition becomes satisfied, the alert is started (refer to step 630).

When an appropriate time comes, the CPU starts processing from step 2200 shown in FIG. 22, and proceeds to step 2205 so as to determine whether or not a present state is a state in which the alert is being performed. When the present state is not the state in which the alert is being performed, the CPU makes a "No" determination at step 2205, and proceeds to step 2295 so as to terminate the present routine.

Whereas, when the present state is the state in which the alert is being performed, the CPU makes a "Yes" determination at step 2205, and proceeds to step 2210. At step 2210, the CPU determines whether or not the above-described first alert end condition is satisfied. Namely, the CPU determines whether or not the driver is turning the steering wheel 51 counterclockwise in the case where the driver has noticed the presence of the oncoming vehicle after the driver started having the vehicle 10 turn to the right. More specifically, at step 2210, the CPU determines whether or not both of the end condition (END11) and the end condition (END12) are satisfied. When the first alert end condition is satisfied, the CPU makes a "Yes" determination at step 2210, and proceeds to step 640 so as to end the alert.

Subsequently, the CPU proceeds to step 2245 so as to determine whether or not the value of the alert flag Xw is "1". As described later, the value of the alert flag Xw is set to "1", when the second alert end condition becomes satisfied while the alert is being performed (refer to step 2270). If the value of the alert flag Xw is "1" when the CPU proceeds to step 2245, the CPU makes a "Yes" determination at step 2245, and proceeds to step 2250. At step 2250, the CPU sets the value of the alert flag Xw to "0". Thereafter, the CPU proceeds to step 2295.

Whereas, if the value of the alert flag Xw is not "1" (i.e., if the value of the alert flag Xw is "0") when the CPU proceeds to step 2245, the CPU makes a "No" determination at step 2245, and directly proceeds to step 2295.

If the first alert end condition is not satisfied when the CPU proceeds to step 2210, the CPU makes a "No" determination at step 2210, and proceeds to step 2255. At step 2255, the CPU determines whether or not the second alert end condition is satisfied. Namely, the CPU determines whether or not the oncoming vehicle is no longer present.

When the second alert end condition is satisfied, the CPU makes a "Yes" determination at step 2255, and proceeds to step 2260 so as to determine whether or not the value of the alert flag Xw is "1". When the value of the alert flag Xw is "0", the CPU makes a "No" determination at step 2260, and proceeds to step 2270 to set the value of the alert flag Xw to "1". In addition, the CPU stores a time (referred to as a "flag change time") at which the value of the alert flag Xw is set to "1" in the RAM 33. Thereafter, the CPU proceeds to step 2295.

When the CPU executes the present routine next time, the CPU proceeds to step 2260 through step 2205, step 2210 and step 2255, if the first alert end condition is not satisfied, and the state in which the second alert end condition is satisfied continues. In this case, the CPU makes a "Yes" determination at step 2260, and proceeds to step 2265.

At step 2265, the CPU determines whether or not the third threshold time Tth3 has passed since the value of the alert flag Xw was set (was changed from "0") to "1". More specifically, the CPU determines whether or not the present time point is a time point after a time length equal to the third threshold time Tth3 has passed since the flag change time stored in the RAM 33.

If the third threshold time Tth3 has not passed since the value of the alert flag Xw was set to "1", the CPU makes a "No" determination at step 2265, and directly proceeds to step 2295. Whereas, if the third threshold time Tth3 has already passed since the value of the alert flag Xw was set to "1", the CPU makes a "Yes" determination at step 2265, and proceeds to step 640. In this case, the alert is stopped/ended owing to the process of step 640, and the value of the alert flag Xw is set to "0" owing to the process of step 2250.

It should be noted that, if the determination condition used in step 2255 is not satisfied (i.e., if the second alert end condition is not satisfied) at the time point at which the CPU proceeds to step 2255, the CPU makes a "No" determination at step 2255, and proceeds to step 2245. Alternatively, the CPU may directly proceed to step 2295.

As has been described above, the eighth modified apparatus ends/finishes the alert immediately after the first alert end condition becomes satisfied (i.e., when it is determined/inferred that the driver of the vehicle 10 has noticed the presence of the oncoming vehicle). Furthermore, the eighth modified apparatus ends/finishes the alert when the state in which the second alert end condition is satisfied (i.e., the oncoming vehicle is no longer present) has continued for the third threshold time Tth3. Accordingly, the eighth modified apparatus can ends/finishes the alert when a safer situation is confirmed.

The embodiment and the modified embodiments of the alert apparatus according to the present disclosure have been described. However, the present disclosure is not limited to them, but may employ various modifications within the scope of the present disclosure. For example, the specific direction of the embodiment and the modified embodiments is rightward, however, the specific direction may be leftward if the vehicle 10 is traveling in a region (i.e., right-side driving region) where there is a traffic regulation to have a driver drive on the right side of the road.

In addition, in some of the embodiments described above, the host vehicle right turn passing area is the area determined based on the fixed values (more specifically, the distances Dx1, Dy1, and Dy2, and the vehicle width Wd), however, the host vehicle right turn passing area may be differently defined. For example, the host vehicle right turn passing area may be defined in such a manner that a length in the X axis direction of the host vehicle right turn passing area becomes longer as the width of the traveling lane (i.e., a distance between the right hand demarcation line and the left hand demarcation line) becomes greater.

Furthermore, each of the ECUs 21-29 of the embodiments determines that the oncoming vehicle is present when all of the above-described conditions (a)-(e) are satisfied. However, each of the ECUs 21-29 of the embodiments may differently determine whether or not the oncoming vehicle is present.

For instance, each of the ECUs 21-29 may be configured to determine that the condition (b) is satisfied, when the longitudinal position Dy of the camera detected object is positive and is smaller/shorter than a predetermined fifth threshold distance Dth5 (i.e., 0<Dy<Dth5).

Each of the ECUs 21-29 may also be configured to determine that the oncoming vehicle is present when all of the above-described conditions (a)-(e) are satisfied and a condition (n) described below is satisfied.

Condition (n): to be satisfied when a magnitude of a reference time length Tt that is obtained by dividing the longitudinal position Dy of the camera detected object by the relative longitudinal speed Vy of the camera detected object is smaller/shorter than a predetermined standard time Ts (i.e., |Tt|<Ts). In this case, an other vehicle that is relatively far from the vehicle 10 is not determined to be the oncoming vehicle, and/or an other vehicle that needs to take a long time to be close to (in the vicinity of) the vehicle 10 is not determined to be the oncoming vehicle.

In addition, one of the ECU 22, the ECU 23, and the like predicts/obtains the straight line or the curved line as the host vehicle predicted traveling path, and determines whether or not the condition (g) is satisfied based on the positional relationship between the host vehicle predicted traveling path and the left end position of the other vehicle as well as the positional relationship between the host vehicle predicted traveling path and the right end position of the other vehicle. However, the condition (g) may be different from this condition. For instance, one of the ECU 22, the ECU 23, and the like may be configured to determine that the condition (g) is satisfied, when a part or all of the camera detected object (i.e., the other vehicle) is included in a "host vehicle predicted traveling area". In this case, one of the ECU 22, the ECU 23, and the like predicts/obtains, as the host vehicle predicted traveling area, a belt-like area that has the host vehicle predicted traveling path as its center line and has a length (e.g., a half of the vehicle width Wd/2 or a value ($\alpha$+Wd/2) of a sum of the vehicle width Wd/2 and a predetermined margin a) from the center line in the right and left directions. In other words, the host vehicle predicted traveling area is an area through which the vehicle 10 will pass when traveling and has the width roughly equal to the vehicle width Wd.

The condition (B3b) is determined to be satisfied, when the right hand demarcation line (e.g., the road marking represented by a continuous line or a broken line) is included in the host vehicle right turn passing area in the above embodiments. However, in addition to that, the condition (B3b) may also be determined to be satisfied, when a center divider of a road is included in the host vehicle right turn passing area.

The ECU 22 of the embodiments determines that the third preceding alert condition is satisfied when all of the conditions (A1), (A2), and (D3) are satisfied. However, the ECU 22 may be configured to determine that the third preceding alert condition is satisfied when not only all of the conditions (A1), (A2), and (D3) but also a condition (D4) described below are satisfied.

Condition (D4): to be satisfied when a right turn signal indicator of the preceding vehicle is operating (blinking), and a left turn signal indicator of the preceding vehicle is not operating (blinking).

In this case, the ECU is configured to determine whether or not the right turn signal indicator of the preceding vehicle is operating (blinking) and whether or not the left turn signal indicator of the preceding vehicle is operating (blinking), based on a history of the frontward image (i.e., a plurality of the frontward images taken in a predetermined period)

The ECU 25 described above determines that the camera detected object is the crossing-vehicle, when the camera object satisfies all of the condition (a), (h), and (i). However, the ECU 25 may be configured to determine that the camera detected object is the crossing-vehicle, when the camera object satisfies not only all of the condition (a), (h), and (i) but also condition (p) described below. Alternatively, the condition (h) can be replaced with the condition (p). In other words, the ECU 25 may be configured to determine that the camera detected object is the crossing-vehicle, when the camera object satisfies the conditions (a), (i), and (p).

Condition (p): to be satisfied when the camera object is different than the oncoming vehicle, and the "crossing-vehicle predicted traveling path" of that camera object and the host vehicle predicted traveling path intersect with each other.

The ECU 26 described above determines that the oncoming vehicle has stopped moving, when the object moving speed Vc of the oncoming vehicle is equal to or lower than the third threshold speed Vth3 while the longitudinal position Dy of that oncoming vehicle is smaller than the threshold distance Dth2. However, the ECU 26 may be configured to determine that the oncoming vehicle has stopped moving, when the object moving speed Vc of that oncoming vehicle detected based on the frontward image has become equal to or lower than the third threshold speed Vth3 irrespective of the longitudinal position Dy of that oncoming vehicle.

The ECU 29 described above determines whether or not the first alert end condition is satisfied based on the steering angle rate Ws. However, the ECU 29 may be configured to determine that the first alert end condition is satisfied, when the steering angle $\theta$s is smaller than a predetermined negative threshold angle $\theta$th in the left-side driving region. The ECU 29 may be configured to determine that the first alert end condition is satisfied, when the steering angle $\theta$s is greater than a predetermined positive threshold angle $\theta$th in the right-side driving region. Furthermore, the ECU 29 may be configured to determine that the first alert end condition is satisfied based on a change in a yaw rate of the vehicle 10. The ECU 29 described above determines that the second alert end condition becomes satisfied, when the oncoming vehicle is no longer present. However, the ECU 29 may be configured to determine that the second alert end condition is satisfied, when the vehicle speed Vs is higher than a predetermined threshold speed. Alternatively, the ECU 29 may be configured to determine whether or not a turn signal indicator of the oncoming vehicle is operating (blinking) based on the frontward image, and to determine that the second alert end condition is satisfied when it is determined that the turn signal indicator of the oncoming vehicle is operating (blinking).

Each of the third threshold speed Vth3 and the operation amount threshold Bth is zero ("0"), however, at least one of them may be set at a value (e.g., a minute value) greater than zero ("0").

In the above-described embodiment and modified embodiments, the oncoming vehicle and the preceding vehicle are detected based on the frontward image. In other words, the oncoming vehicle and the preceding vehicle are detected using the front camera 41. However, at least one of the oncoming vehicle and the preceding vehicle may be detected using a sensor different from the front camera 41. For example, at least one of the oncoming vehicle and the preceding vehicle may be detected by a LiDAR (Laser Imaging Detection and Rnging) or a millimeter wave radar device.

Furthermore, the functions implemented by each of the ECUs 21-29 of the embodiments may be implemented by a plurality of ECUs. For example, the process for detecting the object based on the frontward image may be implemented by an ECU that is included (installed) in the front camera 41.

What is claimed is:

1. An alert apparatus for a host vehicle comprising:
a surrounding sensor configured to acquire surrounding information including information on an object that is present in a frontward area of said host vehicle and information on demarcation line on a road on which said host vehicle is traveling;
turn signal indicators, each of which state being changed from an operation stopped state to an operating state by a predetermined operation of a driver of said host vehicle;
an alerting device configured to alert said driver of a presence of another vehicle said driver should be cautious of; and
a control unit for controlling said alerting device configured to:
determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and
cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side,
wherein,
said control unit is configured to:
determine whether or not a specific area condition is satisfied based on said surrounding information, wherein said specific area condition is a condition to be satisfied when a specific demarcation line is not included in a specific area, said specific demarcation line is a demarcation line on said specific direction side among a pair of demarcation lines that define said traveling lane, and said specific area is a part of an area through which said host vehicle passes when said host vehicle makes said turn to said specific direction side and has been determined in advance with respect to said host vehicle; and
determine that said specific condition becomes satisfied when it is determined that said specific area condition is satisfied.

2. The alert apparatus according to claim 1,
wherein,
said control unit is configured to:
determine whether or not a lateral distance that is a distance in a host vehicle width direction between said host vehicle and said oncoming vehicle is equal to or greater than a lateral threshold distance that becomes greater as a speed of said host vehicle becomes higher, based on said surrounding information; and
prohibit said alert when it is determined that a prohibition condition is satisfied, wherein said prohibition condition includes a condition to be satisfied when it is determined that said lateral distance is equal to or greater than said lateral threshold distance.

3. The alert apparatus according to claim 1,
wherein,
said control unit is configured to:
determine whether or not a lateral distance that is a distance in a host vehicle width direction between said host vehicle and said oncoming vehicle is equal to or greater than a third threshold distance based on said surrounding information, when a speed of said host vehicle is equal to or lower than a fourth threshold speed; and
prohibit said alert when it is determined that a prohibition condition is satisfied, wherein said prohibition condition includes a condition to be satisfied when it is determined that said lateral distance is equal to or greater than said third threshold distance in a case where said speed of said host vehicle is equal to or lower than said fourth threshold speed.

4. The alert apparatus according to claim 3,
wherein,
said control unit is configured to:
determine whether or not said lateral distance is equal to or greater than a fourth threshold distance that is greater than said third threshold distance, based on said surrounding information, when said speed of said host vehicle is higher than said fourth threshold speed; and
prohibit said alert when it is determined that a prohibition condition is satisfied, wherein said prohibition condition includes a condition to be satisfied when it is determined that said lateral distance is equal to or greater than said fourth threshold distance in a case where said speed of said host vehicle is higher than said fourth threshold speed.

5. The alert apparatus according to claim 1, further comprising:
a steering angle sensor configured to detect a steering angle of a steering wheel of said host vehicle; and
a brake pedal operation state sensor configured to detect a brake pedal operation state of a brake pedal of said host vehicle;
wherein,
said control unit is configured to:
determine whether or not a prohibition condition is satisfied, wherein said prohibition condition includes a condition to be satisfied, when;
said detected steering angle is a value that causes said host vehicle to turn to a first direction opposite to a direction for said host vehicle to cross said oncoming lane, or said detected steering angle is a value that causes said host vehicle to turn to a second direction for said host vehicle to cross said oncoming lane and a magnitude of said detected steering angle is smaller than a threshold angle;
said detected brake pedal operation state indicates that said brake pedal is operated; and
a speed of said host vehicle is equal to or lower than a fifth threshold speed; and
prohibit said alert when it is determined that said prohibition condition is satisfied.

6. The alert apparatus according to claim 1, wherein, said alert device includes a speaker configured to generate a sound and a display configured to display a figure; and said control unit is configured to:
- determine that a vehicle that has been determined to be said oncoming vehicle has stopped moving, when a longitudinal distance between said host vehicle and said vehicle that has been determined to be said oncoming vehicle is shorter than a predetermined second threshold distance and when an object moving speed of said vehicle that has been determined to be said oncoming vehicle is equal to or lower than a predetermined third threshold speed;
- retain a stopped state history indicating that it is determined that said vehicle that has been determined to be said oncoming vehicle has stopped moving, when it is determined that said vehicle that has been determined to be said oncoming vehicle has stopped moving;
- cause both of said speaker and said display to operate to start alerting, if said stopped state history has not been retained when it is determined that said specific condition becomes satisfied; and
- cause said speaker to operate, without causing said display to operate, to start alerting if said stopped state history has been retained when it is determined that said specific condition becomes satisfied.

7. The alert apparatus according to claim 1, wherein, said control unit is configured to:
- determine that a vehicle that has been determined to be said oncoming vehicle has stopped moving, when a longitudinal distance between said host vehicle and said vehicle that has been determined to be said oncoming vehicle is shorter than a predetermined second threshold distance and when an object moving speed of said vehicle that has been determined to be said oncoming vehicle is equal to or lower than a predetermined third threshold speed;
- retain a stopped state history indicating that it is determined that said vehicle that has been determined to be said oncoming vehicle has stopped moving, when it is determined that said vehicle that has been determined to be said oncoming vehicle has stopped moving;
- cause said alerting device to start alerting if said stopped state history has not been retained when it is determined that said specific condition becomes satisfied; and
- prohibit said alerting device from starting alerting if said stopped state history has been retained when it is determined that said specific condition becomes satisfied.

8. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:
- determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and
- cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:
- determine whether or not a ready-to-turn condition is satisfied based on said surrounding information, wherein said ready-to-turn condition is a condition to be satisfied when a specific demarcation line is included in a specific area and a speed of said host vehicle is lower than a predetermined first threshold speed, said specific demarcation line is a demarcation line on said specific direction side among a pair of demarcation lines that define said traveling lane, and said specific area is a part of an area through which said host vehicle passes when said host vehicle makes said turn to said specific direction side and has been determined in advance with respect to said host vehicle; and
- determine that said specific condition becomes satisfied when it is determined that said ready-to-turn condition is satisfied.

9. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:
- determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:

determine whether or not a preceding vehicle is present based on said surrounding information, wherein said preceding vehicle is another vehicle present immediately ahead of said host vehicle;

determine whether or not a speed of said preceding vehicle is higher than a predetermined preceding vehicle turning threshold speed, when it is determined that said preceding vehicle is present; and determine that said specific condition becomes satisfied when it is determined that said speed of said preceding vehicle is higher than said preceding vehicle turning threshold speed.

10. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:

determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:

determine whether or not a preceding vehicle is present based on said surrounding information, wherein said preceding vehicle is another vehicle present immediately ahead of said host vehicle;

determine whether or not said preceding vehicle has started making a turn to said specific direction side based on said surrounding information, when it is determined that said preceding vehicle is present; and determine that said specific condition becomes satisfied when it is determined that said preceding vehicle has started making said turn to said specific direction side.

11. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:

determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:

determine whether or not said oncoming lane in which said oncoming vehicle is traveling and said traveling lane in which said host vehicle is traveling are adjacent to each other, based on said surrounding information; and determine that said specific condition becomes satisfied when it is determined that said oncoming lane and said traveling lane are adjacent to each other.

12. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:

determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:

determine whether or not a lateral distance that is a distance in a host vehicle width direction between said host vehicle and said oncoming vehicle is smaller than a predetermined first threshold distance, based on said surrounding information; and determine that said specific condition becomes satisfied when it is determined that said lateral distance is smaller than said first threshold distance.

13. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:

determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:

determine whether or not a crossing-vehicle is present based on said surrounding information, wherein said crossing-vehicle is another vehicle which is different from said oncoming vehicle and whose predicted traveling path is predicted to intersect with said predicted path of said oncoming vehicle; and prohibit said alert when it is determined that a prohibition condition is satisfied, wherein said prohibition condition includes a condition to be satisfied when it is determined that said crossing-vehicle is present.

14. An alert apparatus for a host vehicle comprising:

a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:

determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to:
determine whether or not a crossing-vehicle is present based on said surrounding information, wherein said crossing-vehicle is another vehicle which is different from said oncoming vehicle and whose predicted traveling path is predicted to intersect with said predicted path of said host vehicle; and prohibit said alert when it is determined that a prohibition condition is satisfied, wherein said prohibition condition includes a condition to be satisfied when it is determined that said crossing-vehicle is present.

15. An alert apparatus for a host vehicle comprising:
a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:
determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, further comprising:

a steering angle sensor configured to detect a steering angle of a steering wheel of said host vehicle;

wherein, said control unit is configured to:
determine whether or not a predetermined first alert end condition is satisfied based on a parameter varying depending on said detected steering angle, wherein said first alert end condition is a condition to be satisfied when there is a high possibility that said host vehicle has stopped turning to said specific direction side; and cause said alerting device to stop alerting when it is determined that said first alert end condition is satisfied while said alert is being performed.

16. An alert apparatus for a host vehicle comprising:
a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:
determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to cause said alerting device to stop alerting when a state in which it is determined that said oncoming vehicle is not present continues for a predetermined third threshold time while said alert is being performed.

17. An alert apparatus for a host vehicle comprising:
a surrounding sensor configured to acquire surrounding information including information on an object that is present in a frontward area of said host vehicle and information on demarcation line on a road on which said host vehicle is traveling;

turn signal indicators, each of which state being changed from an operation stopped state to an operating state by a predetermined operation of a driver of said host vehicle;

an alerting device configured to alert said driver of a presence of another vehicle said driver should be cautious of; and a control unit for controlling said alerting device configured to:

determine whether an oncoming vehicle is present based on said surrounding information, wherein said oncoming vehicle is another vehicle that is traveling in an oncoming lane with respect to a traveling lane in which said host vehicle is traveling so as to approach said host vehicle from a position ahead of said host vehicle and whose predicted traveling path is predicted to pass through on a specific direction side which is one of a rightward direction side with respect to a current position of said host vehicle and a leftward direction side with respect to said current position of said host vehicle; and cause said alerting device to start alerting when it is determined that a specific condition becomes satisfied, wherein said specific condition is a condition to be satisfied when one of said turn signal indicators corresponding to said specific direction side are in said operating state, it is determined that said oncoming vehicle is present, and when it is predicted that said host vehicle is likely to start making a turn to said specific direction side or when it is determined that said driver of said host vehicle should notice a presence of said oncoming vehicle before said host vehicle starts making a turn to said specific direction side, wherein, said control unit is configured to cause said alerting device to stop alerting, in at least one of a first case and a second case, wherein, said first case is a case where said turn signal indicator corresponding to said specific direction side of said host vehicle has changed its state from said operating state to said operation stopped state while said alert is being performed; and said second case is a case where said host vehicle has stopped moving while said alert is being performed.

* * * * *